US010666922B2

(12) United States Patent
Hwang et al.

(10) Patent No.: US 10,666,922 B2
(45) Date of Patent: May 26, 2020

(54) METHOD OF TRANSMITTING 360-DEGREE VIDEO, METHOD OF RECEIVING 360-DEGREE VIDEO, DEVICE FOR TRANSMITTING 360-DEGREE VIDEO, AND DEVICE FOR RECEIVING 360-DEGREE VIDEO

(71) Applicant: LG ELECTRONICS INC., Seoul (KR)

(72) Inventors: Soojin Hwang, Seoul (KR); Sejin Oh, Seoul (KR); Tung Chin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/454,540

(22) Filed: Jun. 27, 2019

(65) Prior Publication Data

US 2019/0320157 A1    Oct. 17, 2019

Related U.S. Application Data

(63) Continuation of application No. 15/680,901, filed on Aug. 18, 2017, now Pat. No. 10,375,375.

(Continued)

(51) Int. Cl.
*H04N 7/18* (2006.01)
*H04N 13/183* (2018.01)
*H04N 21/845* (2011.01)
*H04N 21/488* (2011.01)
*H04N 19/70* (2014.01)
(Continued)

(52) U.S. Cl.
CPC ......... *H04N 13/183* (2018.05); *H04N 13/128* (2018.05); *H04N 13/156* (2018.05); *H04N 13/161* (2018.05); *H04N 13/178* (2018.05); *H04N 13/194* (2018.05); *H04N 19/70* (2014.11); *H04N 19/88* (2014.11);
(Continued)

(58) Field of Classification Search
CPC .... H04N 13/183; H04N 21/816; H04N 19/88; H04N 13/128; H04N 13/178; H04N 13/194; H04N 13/161; H04N 13/156; H04N 19/70; H04N 21/4884; H04N 21/8451
USPC ......................................................... 348/36
See application file for complete search history.

(56) References Cited

U.S. PATENT DOCUMENTS 8,427,525 B2   4/2013   Funabiki et al.
8,436,894 B2   5/2013   Chen
(Continued)

OTHER PUBLICATIONS

Ribeiro et al., A System for 3D Teleconference Over IP Network, 2015.
(Continued)

*Primary Examiner* — Shan E Elahi
(74) *Attorney, Agent, or Firm* — Dentons US LLP

(57) ABSTRACT

The present invention suggests a method of providing subtitles for a 360 content, the method comprising: generating 360 video data captured by at least one camera; stitching the 360 video data; projecting the 360 video data to a 2D image; encoding the 2D image into a video stream; generating a 360 subtitle Supplemental Enhancement Information (SEI) message for signaling a subtitle for the 360 content; inserting the 360 subtitle SEI message into the video stream; and generating a broadcast signal including the video stream, and transmitting the broadcast signal.

20 Claims, 51 Drawing Sheets

Related U.S. Application Data

(60) Provisional application No. 62/506,515, filed on May 15, 2017.

(51) Int. Cl.
*H04N 13/156* (2018.01)
*H04N 13/161* (2018.01)
*H04N 13/194* (2018.01)
*H04N 13/178* (2018.01)
*H04N 13/128* (2018.01)
*H04N 19/88* (2014.01)
*H04N 21/81* (2011.01)

(52) U.S. Cl.
CPC ....... *H04N 21/4884* (2013.01); *H04N 21/816* (2013.01); *H04N 21/8451* (2013.01)

(56) References Cited

U.S. PATENT DOCUMENTS

| | | |
|---|---|---|
| 8,854,434 B2 | 10/2014 | Saito et al. |
| 9,285,599 B2 | 3/2016 | Imai et al. |
| 9,363,569 B1 | 6/2016 | Van Hoff et al. |
| 9,525,887 B2 | 12/2016 | Ma |
| 9,851,793 B1 | 12/2017 | Van Hoff et al. |
| 10,002,337 B2 | 6/2018 | Siddique et al. |
| 2008/0253467 A1 | 10/2008 | Wang et al. |
| 2010/0030578 A1 | 2/2010 | Siddique et al. |
| 2010/0289872 A1 | 11/2010 | Funabiki et al. |
| 2011/0063409 A1 | 3/2011 | Hannuksela |
| 2011/0141236 A1 | 6/2011 | Mitani et al. |
| 2011/0157310 A1 | 6/2011 | Mitani et al. |
| 2011/0157315 A1 | 6/2011 | Bennett et al. |
| 2011/0193947 A1 | 8/2011 | Chen |
| 2011/0228048 A1 | 9/2011 | Wei et al. |
| 2011/0267442 A1 | 11/2011 | Imai et al. |
| 2012/0007948 A1 | 1/2012 | Suh et al. |
| 2012/0019619 A1 | 1/2012 | Suh et al. |
| 2012/0050473 A1 | 3/2012 | Suh et al. |
| 2012/0257015 A1 | 10/2012 | Kim et al. |
| 2013/0066750 A1 | 3/2013 | Siddique et al. |
| 2013/0169753 A1 | 7/2013 | Lee et al. |
| 2013/0215116 A1 | 8/2013 | Siddique et al. |
| 2013/0215219 A1* | 8/2013 | Hefeeda ............. H04L 65/4076 348/42 |
| 2014/0307050 A1 | 10/2014 | Suh et al. |
| 2015/0042754 A1 | 2/2015 | Suh et al. |
| 2015/0055700 A1 | 2/2015 | Ma |
| 2015/0229900 A1 | 8/2015 | Suh et al. |
| 2016/0191815 A1 | 6/2016 | Annau et al. |
| 2016/0210602 A1 | 7/2016 | Siddique et al. |
| 2016/0269711 A1 | 9/2016 | Hwang et al. |
| 2017/0188058 A1* | 6/2017 | Nakashima ........ H04N 21/2387 |
| 2017/0237965 A1 | 8/2017 | Wang et al. |
| 2017/0316606 A1 | 11/2017 | Khalid et al. |
| 2017/0339392 A1 | 11/2017 | Forutanpour et al. |
| 2018/0061002 A1 | 3/2018 | Lee et al. |
| 2018/0160160 A1 | 6/2018 | Swaminathan et al. |

OTHER PUBLICATIONS

S. Prince, et al., "3D Live: Real Time Captured Content for Mixed Reality", IEEE Computer Society (Year: 2002).

* cited by examiner

FIG. 7
(a) 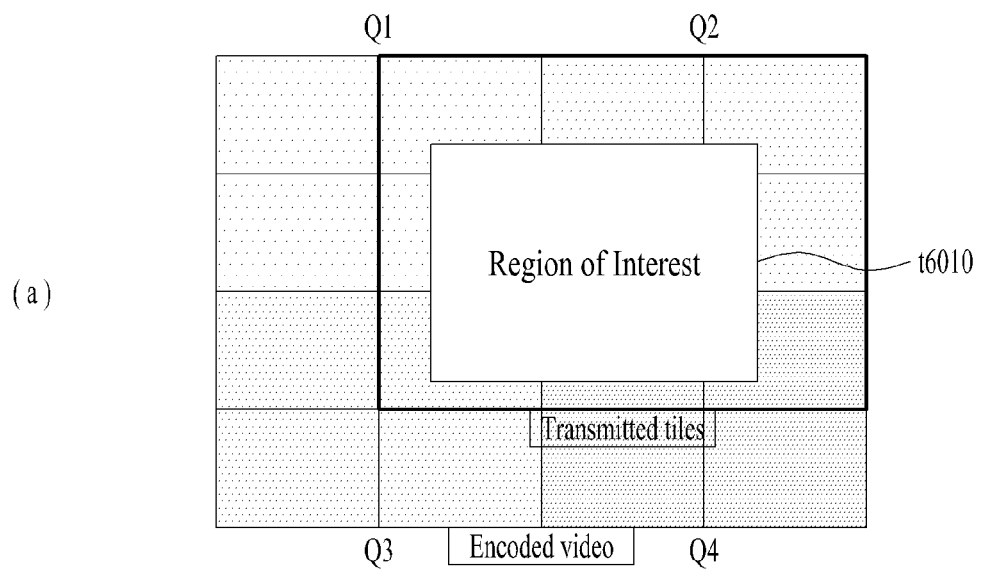
(b) 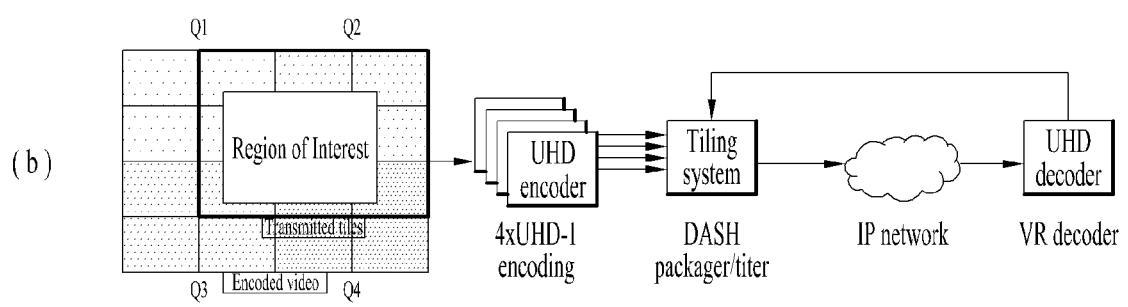

FIG. 8

```
.....
        <Basic metadata>
unsigned    int(8)           vr_geometry;
unsigned    int(8)           projection_schme;
        <Stereoscopic related metadata>
unsigned    int(1)           is_stereoscopic;
unsigned    int(3)           stereo_mode;
        <Initial View related metadata>
signed      int(8)           initial_view_yaw_degree;
signed      int(8)           initial_view_pitch_degree;
signed      int(8)           initial_view_roll_degree;
        <ROI related metadata>
unsigned int(1)              2d_roi_range_flag;
unsigned int(1)              3d_roi_range_flag;
if (2d_roi_region_flag ==1) {
   unsigned int(16) min_top_left_x;
   unsigned int(16) max_top_left_x;
   unsigned int(16) min_top_left_y;
   unsigned int(16) max_top_left_y;
   unsigned int(16) min_width;
   unsigned int(16) max_width;
   unsigned int(16) min_height;
   unsigned int(16) max_height;
   unsigned int(16) min_x;
   unsigned int(16) max_x;
   unsigned int(16) min_y;
   unsigned int(16) max_y;
}
if (3d_roi_region_flag ==1) {
   unsigned int(16) min_yaw;
   unsigned int(16) max_yaw;
   unsigned int(16) min_pitch;
   unsigned int(16) max_pitch;
   unsigned int(16) min_roll;
   unsigned int(16) max_roll;
   unsigned int(16) min_field_of_view;
   unsigned int(16) max_field_of_view;
}
        <Field Of View related metadata>
unsigned int(1)              content_fov_flag;
if (content_fov_flag == 1)  {
   unsigned int(16)          content_fov;
}
        <Cropped Region related metadata>
unsigned int(1)              is_cropped_region;
if(is_cropped_region == 1)  {
   unsigned int(16)          cr_region_left_top_x;
   unsigned int(16)          cr_region_left_top_y;
   unsigned int(16)          cr_region_width;
   unsigned int(16)          cr_region_height;
}
.....
```

FIG. 11
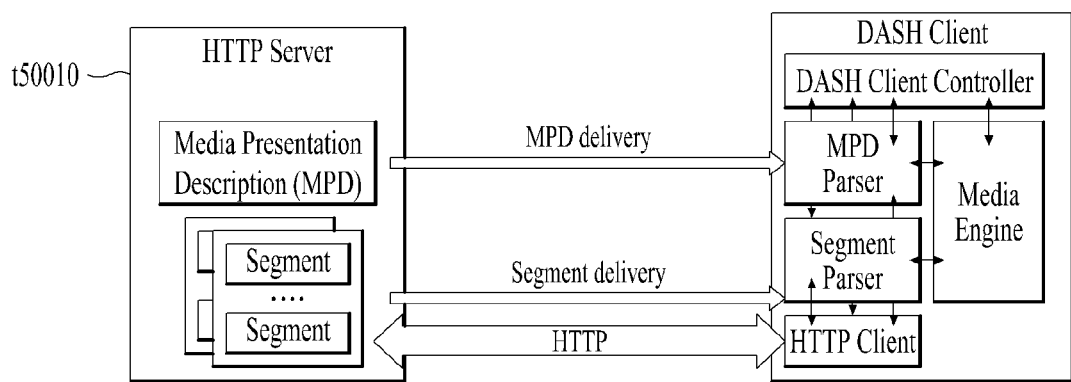
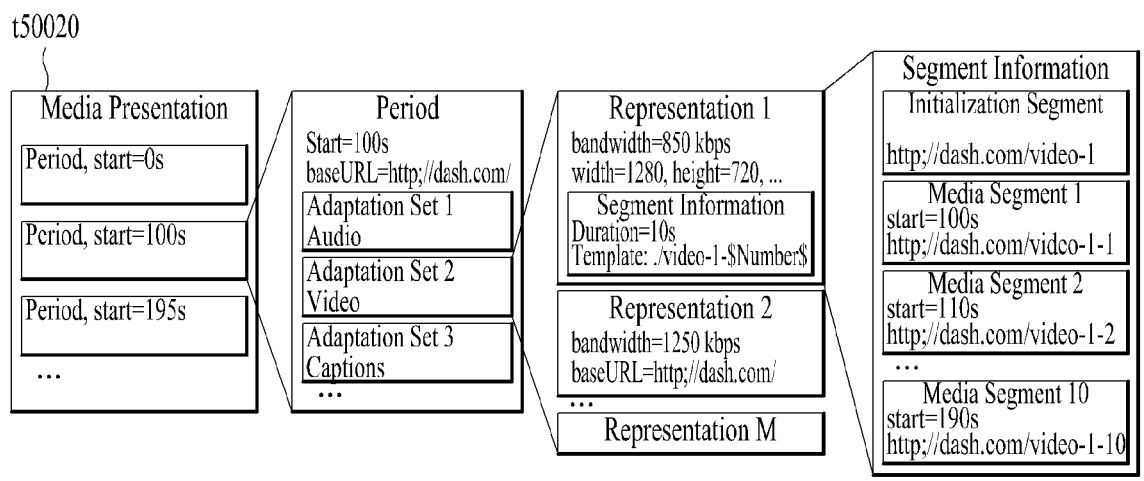

FIG. 12
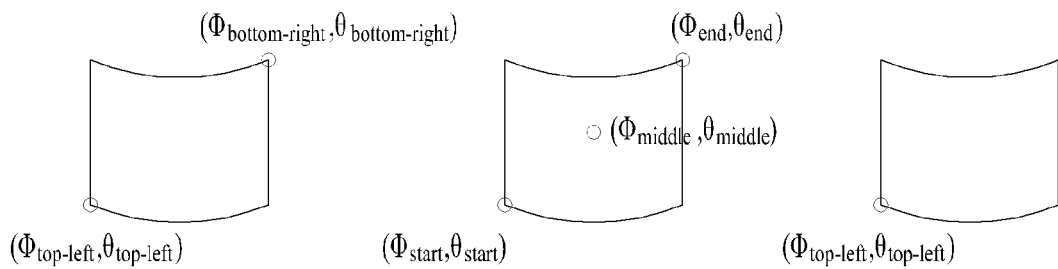
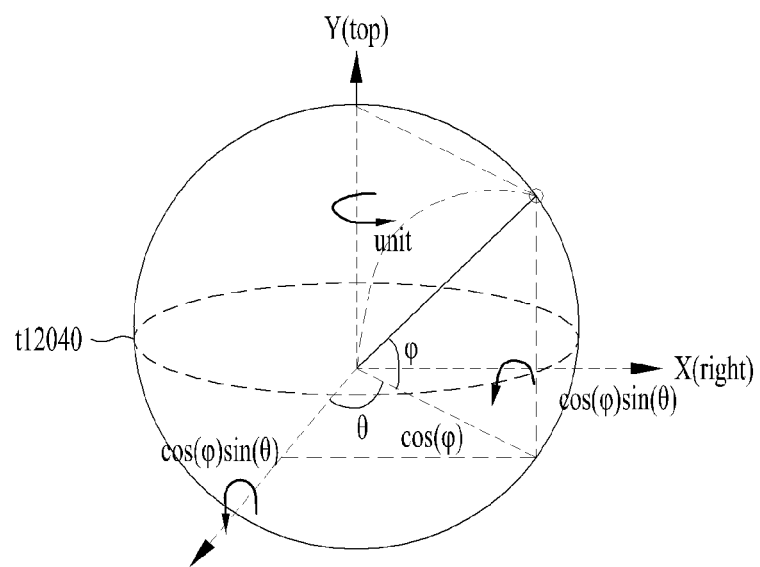
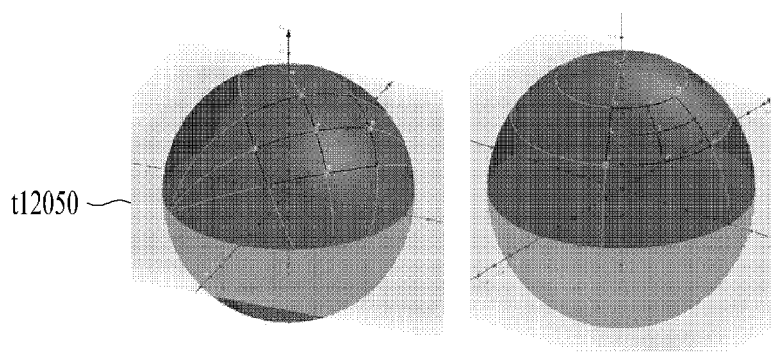
shape_type 0 (4-great circle)   shape_type 1 (2-great circle, 2-small circle)

FIG. 13

| subtitle_overlay_info_1 ( ) { | Descriptor |
|---|---|
| cancel_subtitle_overlay_info_1_flag | u(1) |
| if(cancel_subtitle_overlay_info_1_flag==0){ | |
| cancel_flag | u(1) |
| if(cancle_flag==1) | |
| cancel_region_id | u(8) |
| subtitle_region_info_flag | u(1) |
| if(subtitle_region_info_flag==1){ | |
| shape_type | u(8) |
| subtitle_id | u(8) |
| region_id | u(8) |
| theta_value_for_point_1 | u(32) |
| phi_value_for_point_1 | u(32) |
| theta_value_for_point_2 | u(32) |
| phi_value_for_point_2 | u(32) |
| timed_text() | |
| } | |
| } | |
| } | |

FIG. 14

| subtitle_overlay_info_1_1 ( ) { | Descriptor |
|---|---|
| cancel_subtitle_overlay_info_1_1_flag | u(1) |
| if(cancel_subtitle_overlay_info_1_1_flag==0){ | |
| cancel_flag | u(1) |
| if(cancle_flag==1) | |
| cancel_region_id | u(8) |
| subtitle_region_info_flag | u(1) |
| if(subtitle_region_info_flag==1){ | |
| shape_type | u(8) |
| subtitle_id | u(8) |
| num_of_rendering_positions | u(8) |
| for(i=0; i<num_of_rendering_positions;i++){ | |
| rendering_position_id | u(8) |
| theta_value_for_point_1 | u(32) |
| phi_value_for_point_1 | u(32) |
| theta_value_for_point_2 | u(32) |
| phi_value_for_point_2 | u(32) |
| } | |
| timed_text() | |
| } | |
| } | |
| } | |

FIG. 15

```
class RegionOnSphereSampleEntry(type) extends MetaDataSampleEntry(type) {
                RegionOnSphereConfigBox(); // mandatory
                SubtitleOverlayConfigBoxA(); // optional
                Box[] other_boxes; // optional
} class SubtitleOverlayConfigBoxA extends FullBox('soca', version = 0, flags) {
                unsigned int(8) shape_type;
                bit(7) reserved = 0;
                unsigned int(1) dynamic_flag;
                if(dynamic_flag==0) {
                    unsigned int(8) subtitle_id;
                    unsigned int(8) num_of_rendering_postions;
                    for(int i=0; i<num_of_rendering_postions; i++){
                                unsigned int(8) rendering_position_id;
                                unsigned int(32) theta_value_for_point_1;
                                unsigned int(32) phi_value_for_point_1;
                                unsigned int(32) theta_value_for_point_2;
                                unsigned int(32) phi_value_for_point_2;
                    }
                }
                else {
                                unsigned int(32) min_theta_value;
                                unsigned int(32) min_phi_value;
                                unsigned int(32) max_theta_value;
                                unsigned int(32) max_phi_value;
                }
}
```
— t15010

```
aligned(8) SubtitleOverlayInfoA(dynamic_flag) {
                unsigned int(8) rendering_position_id;.
                unsigned int(32) theta_value_for_point_1;
                unsigned int(32) phi_value_for_point_1;
                unsigned int(32) theta_value_for_point_2;
                unsigned int(32) phi_value_for_point_2;
} aligned(8) RegionOnSphereSample() {
                for (i = 0; i < num_regions; i++)
                                RegionOnSphereStruct(dynamic_range_flag)
                unsigned int(8) subtitle_id;
                unsigned int(8) num_of_rendering_positions;
                for (i = 0; i < num_rendering_positions; i++)
                                SubtitleOverlayInfoA()
                timed_text();
}
```
— t15020

FIG. 16

| @value | Use |
|---|---|
| shape_type | M |
| region_id | O |
| subtitle_id | O |
| num_of_rendering_positions | M |
| rendering_position_id | 0...n |
| theta_value_for_point_1 | 0...n |
| phi_value_for_point_1 | 0...n |
| theta_value_for_point_2 | 0...n |
| phi_value_for_point_2 | 0...n |
| Legend: For attributes: M=Mandatory, O=Optional, OD=Optional with Default Value, CM=Conditionally Mandatory. | |

FIG. 17
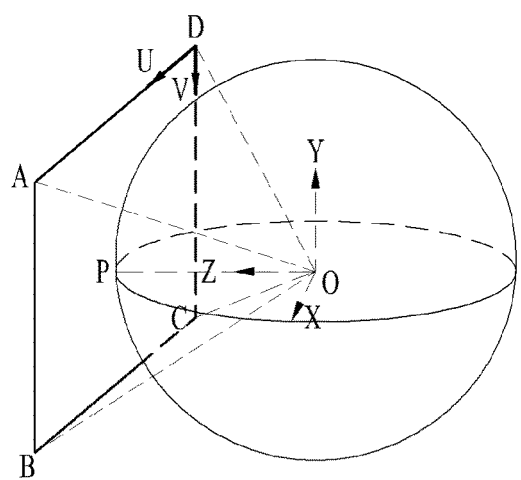
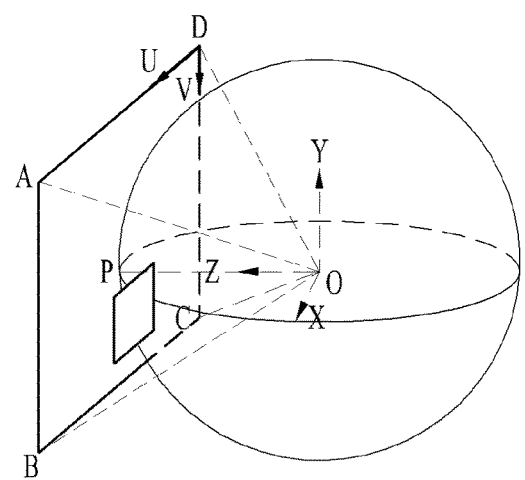
Viewport generation with rectilinear projection for video rendering
Viewport generation with rectilinear projection for video and subtitle rendering (e.g. including subtitle rendering region)

FIG. 18

| subtitle_overlay_info_2 ( ) { | Descriptor | |
|---|---|---|
|    cancel_subtitle_overlay_info_2_flag | u(1) | |
|    if(cancel_subtitle_overlay_info_2_flag==0){ | | |
|      cancel_flag | u(1) | |
|      if(cancle_flag==1) | | |
|        cancel_region_id | u(8) | |
|      subtitle_region_info_flag | u(1) | |
|      if(subtitle_region_info_flag==1){ | | |
|        shape_type | u(8) | |
|        subtitle_id | u(8) | |
|        region_id | u(8) | ─ t18010 |
|        yaw_pitch_roll_center_range_value_types | u(8) | |
|        yaw_center_offset_for_subtitle_rendering_region | u(32) | |
|        pitch_center_offset_for_subtitle_rendering_region | u(32) | |
|        roll_center_offset_for_subtitle_rendering_region | u(32) | |
|        horizontal_range_for_subtitle_rendering_region | u(32) | |
|        vertical_range_for_subtitle_rendering_region | u(32) | |
|        timed_text( ) | | |
|      } | | |
|    } | | |
| } | | |

| subtitle_overlay_info_2_1 ( ) { | Descriptor | |
|---|---|---|
|    cancel_subtitle_overlay_info_2_flag | u(1) | |
|    if(cancel_subtitle_overlay_info_2_flag==0){ | | |
|      cancel_flag | u(1) | |
|      if(cancle_flag==1) | | |
|        cancel_region_id | u(8) | |
|      subtitle_region_info_flag | u(1) | |
|      if(subtitle_region_info_flag==1){ | | |
|        shape_type | u(8) | |
|        subtitle_id | u(8) | |
|        yaw_pitch_roll_center_range_value_types | u(8) | |
|        num_of_rendering_positions | u(8) | ─ t18020 |
|        for(i=0; i<num_of_rendering_positions;i++){ | | |
|          rendering_position_id | u(8) | |
|          yaw_center_offset_for_subtitle_rendering_region | u(32) | |
|          pitch_center_offset_for_subtitle_rendering_region | u(32) | |
|          roll_center_offset_for_subtitle_rendering_region | u(32) | |
|          horizontal_range_for_subtitle_rendering_region | u(32) | |
|          vertical_range_for_subtitle_rendering_region | u(32) | |
|        } | | |
|        timed_text() | | |
|      } | | |
|    } | | |
| } | | |

FIG. 19

| subtitle_overlay_info_2_2 ( ) { | Descriptor |
|---|---|
|    cancel_subtitle_overlay_info_2_flag | u(1) |
|    if(cancel_subtitle_overlay_info_2_flag==0){ | |
|       cancel_flag | u(1) |
|       if(cancle_flag==1) | |
|          cancel_region_id | u(8) |
|       subtitle_region_info_flag | u(1) |
|       if(subtitle_region_info_flag==1){ | |
|          shape_type | u(8) |
|          subtitle_id | u(8) |
|          yaw_pitch_roll_center_range_value_types | u(8) |
|          num_of_rendering_positions | u(8) |
|          for(i=0; i<num_of_rendering_positions;i++){ | |
|             rendering_position_id | u(8) |
|             yaw_center_for_subtitle_rendering_region | u(32) |
|             pitch_center_for_subtitle_rendering_region | u(32) |
|             roll_center_for_subtitle_rendering_region | u(32) |
|             horizontal_range_for_subtitle_rendering_region | u(32) |
|             vertical_range_for_subtitle_rendering_region | u(32) |
|          } | |
|          timed_text() | |
|       } | |
|    } | |
| } | |

FIG. 20

```
class RegionOnSphereSampleEntry(type) extends MetaDataSampleEntry(type) {
            RegionOnSphereConfigBox(); // mandatory
            SubtitleOverlayConfigBoxB(); // optional
            Box[] other_boxes; // optional
}
class SubtitleOverlayConfigBoxB extends FullBox('socb', version = 0, flags) {
            unsigned int(8) shape_type;
            bit(7) reserved = 0;
            unsigned int(1) dynamic_flag;
            if(dynamic_flag==0) {
                unsigned int(8) subtitle_id;
                unsigned int(8) num_of_rendering_positions;
                for(int i=0; i<num_of_rendering_positions; i++){
                    unsigned int(8) rendering_position_id;
                    unsigned int(32) yaw_center_offset_for_subtitle_rendering_region;
                    unsigned int(32) pitch_center_offset_for_subtitle_rendering_region;
                    unsigned int(32) roll_center_offset_for_subtitle_rendering_region;
                    unsigned int(32) horizontal_range_for_subtitle_rendering_region;
                    unsigned int(32) vertical_range_for_subtitle_rendering_region;
                }
            }
            else {
                    unsigned int(32) yaw_center_offset_for_representative_value;
                    unsigned int(32) pitch_center_offset_for_representative_value;
                    unsigned int(32) roll_center_offset_for_representative_value;
                    unsigned int(32) horizontal_range_for_representative_value;
                    unsigned int(32) vertical_range_for_representative_value;
            }
}
```
— t20010

```
aligned(8) SubtitleOverlayInfoB(dynamic_flag) {
            unsigned int(8) rendering_position_id;
            unsigned int(32) yaw_center_offset_for_subtitle_rendering_region;
            unsigned int(32) pitch_center_offset_for_subtitle_rendering_region;
            unsigned int(32) roll_center_offset_for_subtitle_rendering_region;
            unsigned int(32) horizontal_range_for_subtitle_rendering_region;
            unsigned int(32) vertical_range_for_subtitle_rendering_region
} aligned(8) RegionOnSphereSample() {
            for (i = 0; i < num_regions; i++)
                        RegionOnSphereStruct(dynamic_range_flag)
            unsigned int(8) subtitle_id;
            unsigned int(8) num_of_rendering_positions;
            for (i = 0; i < num_of_rendering_positions; i++)
                        SubtitleOverlayInfoB()
            timed_text();
}
```
— t20020

FIG. 21

```
class RegionOnSphereSampleEntry(type) extends MetaDataSampleEntry(type) {
            RegionOnSphereConfigBox(); // mandatory
            SubtitleOverlayConfigBoxP(); // optional
            Box[] other_boxes; // optional
}
class SubtitleOverlayConfigBoxP extends FullBox('socb', version = 0, flags) {
            unsigned int(8) shape_type;
            bit(7) reserved = 0;
            unsigned int(1) dynamic_flag;
            if(dynamic_flag==0) {
                  unsigned int(8) subtitle_id;
                  unsigned int(8) num_of_rendering_positions;
                  for(int i=0; i<num_of_rendering_positions; i++){
                        unsigned int(8) rendering_position_id;
                        unsigned int(32) yaw_center_for_subtitle_rendering_region;
                        unsigned int(32) pitch_center_for_subtitle_rendering_region;
                        unsigned int(32) roll_center_for_subtitle_rendering_region;
                        unsigned int(32) horizontal_range_for_subtitle_rendering_region;
                        unsigned int(32) vertical_range_for_subtitle_rendering_region;
                  }
            }
            else {
                  unsigned int(32) yaw_center_for_representative_value;
                  unsigned int(32) pitch_center_for_representative_value;
                  unsigned int(32) roll_center_for_representative_value;
                  unsigned int(32) horizontal_range_for_representative_value;
                  unsigned int(32) vertical_range_for_representative_value;
            }
}
```
~t21010

```
aligned(8) SubtitleOverlayInfoP(dynamic_flag) {
            unsigned int(8) rendering_position_id;
            unsigned int(32) yaw_center_for_subtitle_rendering_region;
            unsigned int(32) pitch_center_for_subtitle_rendering_region;
            unsigned int(32) roll_center_for_subtitle_rendering_region;
            unsigned int(32) horizontal_range_for_subtitle_rendering_region;
            unsigned int(32) vertical_range_for_subtitle_rendering_region
} aligned(8) RegionOnSphereSample() {
            unsigned int(8) subtitle_id;
            unsigned int(8) num_of_rendering_positions;
            for (i = 0; i < num_of_rendering_positions; i++)
                              SubtitleOverlayInfoP()
            timed_text();

| @value | Use |
|---|---|
| shape_type | M |
| region_id | M |
| num_of_rendering_positions | M |
| rendering_position_id | 0...n |
| yaw_pitch_roll_center_range_value_types | 0...n |
| yaw_center_offset_for_subtitle_rendering_region | 0...n |
| pitch_center_offset_for_subtitle_rendering_region | 0...n |
| roll_center_offset_for_subtitle_rendering_region | 0...n |
| horizontal_range_for_subtitle_rendering_region | 0...n |
| vertical_range_for_subtitle_rendering_region | 0...n |
| fixed_position_yaw_center_for_subtitle_rendering_region | 0...n |
| fixed_position_pitch_center_for_subtitle_rendering_region | 0...n |
| fixed_position_roll_center_for_subtitle_rendering_region | 0...n |
| fixed_position_horizontal_range_for_subtitle_rendering_region | 0...n |
| fixed_position_vertical_range_for_subtitle_rendering_region | 0...n |
| Legend:<br>For attributes: M=Mandatory, O=Optional, OD=Optional with Default Value, CM=Conditionally Mandatory. | |

FIG. 23

TTML content authored in 16:9 root container for 16:9 video with 14:9 Safe Crop Area
Safe crop area origin (6.25%, 0%), extent (87.5%, 100%)

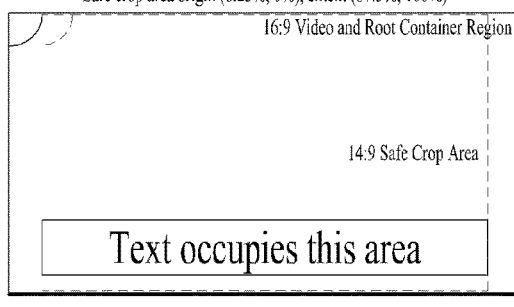

Presentation system needs to dispay this content on a 4:3 window or display

1. Fill display ignoring Safe Crop Area
(not conformant with this proposal)

or

2. Fill display within Safe Crop Area linits

Root container region is cropped to 4:3 using centre cut, maintaining video alignment
Visible Rendering Region is central 4:3 rectangle origin (12.5% 0%), extent (75% 100%)

Root container region is scaled to display central 14:9 area using centre cut
with black bars, maintaining video alignment.
Visible Rendering Region is central 14:9 rectangle origin (6.25% 0%), extent (87.5% 100%)

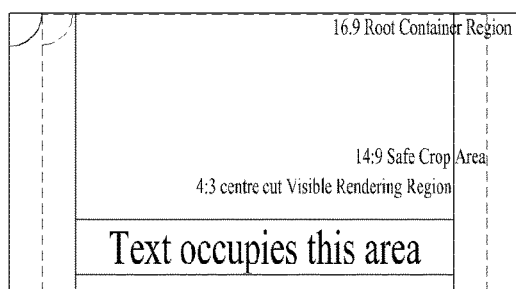 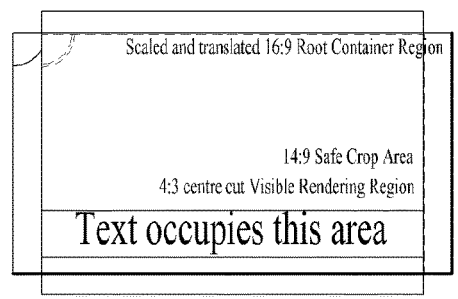

FIG. 25

| subtitle_overlay_info_3() { | Descriptor |
|---|---|
|   cancel_subtitle_overlay_info_3_flag | u(1) |
|   if(cancel_subtitle_overlay_info_3_flag==0){ | |
|     window_flag | u(1) |
|     if(window_flag){ | |
|       window_unit | u(4) |
|       window_aspect_ratio | u(4) |
|       window_horizontal_position_min | u(16) |
|       window_horizontal_position_max | u(16) |
|       window_vertical_position_min | u(16) |
|       window_vertical_position_max | u(16) |
|     } | |
|     subtitle_region_info_flag | |
|     if(subtitle_region_info_flag==1){ | |
|       num_of_regions | |
|       for(i=0;i<num_of_regions;i++){ | |
|         region_id | u(8) |
|         subtitle_region_unit | u(4) |
|         subtitle_region_aspect_ratio | u(4) |
|         subtitle_region_horizontal_position_min | u(16) |
|         subtitle_region_horizontal_position_max | u(16) |
|         subtitle_region_vertical_position_min | u(16) |
|         subtitle_region_vertical_position_max | u(16) |
|         timed_text() | |
|       } | |
|     } | |
|   } | |
| } | | t25010: Defining 'Window' t25020: Subtitle Regions to be included in 'Window'

FIG. 26

```
class RegionOnSphereSampleEntry(type) extends MetaDataSampleEntry(type) {
            RegionOnSphereConfigBox(); // mandatory
            Box[] other_boxes; // optional
}
class SubtitleOverlayConfigBoxC extends FullBox('socc', version = 0, flags) {
            unsigned int(1) dynamic_flag;
            unsigned int(1) window_flag;
            if(dynamic_flag==0) {
                if(window_flag==1){
                    unsigned int(8) window_unit;
                    unsigned int(8) window_aspect_ratio;
                    unsigned int(8) window_horizontal_position_min;
                    unsigned int(8) window_horizontal_position_max;
                    unsigned int(8) window_vertical_position_min;
                    unsigned int(8) window_vertical_position_max;
                }
                unsigned int(1) subtitle_region_info_flag;
                if(subtitle_region_info_flag==1) {
                    unsigned int(8) num_of_regions;
                    for(int i=0; i<num_of_regions; i++){
                            unsigned int(8) region_id;
                            unsigned int(8) subtitle_region_unit;
                            unsigned int(8) subtitle_region_aspect_ratio;
                            unsigned int(8) subtitle_region_horizontal_position_min;
                            unsigned int(8) subtitle_region_horizontal_position_max;
                            unsigned int(8) subtitle_region_vertical_position_max;
                            unsigned int(8) subtitle_region_vertical_position_max;
                    }
                }
            }
            else{
                if(window_flag==1){
                    unsigned int(8) window_horizontal_min_for_representative_value;
                    unsigned int(8) window_horizontal_max_for_representative_value;
                    unsigned int(8) window_vertical_position_min_for_representative_value;
                    unsigned int(8) window_vertical_position_max_for_representative_value;
                }
                if(subtitle_region_info_flag==1) {
                    unsigned int(8) subtitle_region_horizontal_min_for_representative_value;
                    unsigned int(8) subtitle_region_horizontal_max_for_representative_value;
                    unsigned int(8) subtitle_region_vertical_max_for_representative_value;
                    unsigned int(8) subtitle_region_vertical_max_for_representative_value;
                }
            }
}
```

FIG. 27

```
aligned(8) SubtitleOverlayInfoC(dynamic_flag) {
            unsigned int(1) window_flag;
            if(window_flag==1){
                        unsigned int(8) window_unit;
                        unsigned int(8) window_aspect_ratio;
                        unsigned int(8) window_horizontal_position_min;
                        unsigned int(8) window_horizontal_position_max;
                        unsigned int(8) window_vertical_position_min;
                        unsigned int(8) window_vertical_position_max;
            }
            unsigned int(1) subtitle_region_info_flag;
            if(subtitle_region_info_flag==1) {
                        unsigned int(8) num_of_regions;
                        for(int i=0; i<num_of_regions; i++){
                                    unsigned int(8) region_id;
                                    unsigned int(8) subtitle_region_unit;
                                    unsigned int(8) subtitle_region_aspect_ratio;
                                    unsigned int(8) subtitle_region_horizontal_position_min;
                                    unsigned int(8) subtitle_region_horizontal_position_max;
                                    unsigned int(8) subtitle_region_vertical_position_max
                                    unsigned int(8) subtitle_region_vertical_position_max;
                                    timed_text();
                        }
            }
} aligned(8) RegionOnSphereSample() {
            for (i = 0; i < num_regions; i++)
                        RegionOnSphereStruct(dynamic_range_flag)
            SubtitleOverlayInfoC()
}
```

FIG. 28

| @value | Use |
|---|---|
| window_unit | O |
| window_aspect_ratio | O |
| window_horizontal_position_min | O |
| window_horizontal_position_max | O |
| window_vertical_position_min | O |
| window_vertical_position_max | O |
| num_of_regions | O |
| region_id | 0...n |
| subtitle_region_unit | 0...n |
| subtitle_region_aspect_ratio | 0...n |
| subtitle_region_horizontal_position_min | 0...n |
| subtitle_region_horizontal_position_max | 0...n |
| subtitle_region_vertical_position_min | 0...n |
| subtitle_region_vertical_position_max | 0...n |
| Legend: For attributes: M=Mandatory, O=Optional, OD=Optional with Default Value, CM=Conditionally Mandatory. | |

FIG. 30

| subtitle_overlay_info_4 ( ) { | Descriptor |
|---|---|
| subtitle_type | u(8) |
| region_id | u(8) |
| num_of_objects | u(8) |
| for(i=0; i<num_of_objects; i++){ | |
| audio_object_id | u(8) |
| audio_object_priority | u(8) |
| subtitle_id | u(8) |
| subtitle_position_info( ) | |
| font_size | u(8) |
| font_style | u(8) |
| font_weight | u(8) |
| background_color | u(8) |
| text_color | u(8) |
| including_brackets_flag | u(1) |
| timed_text( ) | |
| } | |
| } | |

FIG. 31

Table 229 - Syntax of mae_AudioSceneInfo()

| syntax | No. of bits | Mnemonic |
|---|---|---|
| mae_AudioSceneInfo() { | | |
|   mae_isMainStream; | 1 | bslbf |
|   if (mae_isMainStream) { | | |
|     mae_audioSceneInfoIDPresent; | 1 | bslbf |
|     if (mae_audioSceneInfoIDPresent) { | | |
|       mae_audioSceneInfoID; | 8 | uimsbf |
|     } | | |
|     mae_numGroups; | 7 | uimsbf |
|     mae_GroupDefinition( mae_numGroups ); | | |
|     mae_numSwitchGroups; | 5 | uimsbf |
|     mae_SwitchGroupDefinition( mae_numSwitchGroups ); | | |
|     mae_numGroupPresets; | 5 | uimsbf |
|     mae_GroupPresetDefinition( mae_numGroupPresets ); | | |
|     mae_Data(); | | |
|     <span style="border:1px solid">mae_metaDataElementIDoffset = 0;</span> | | |
|     mae_metaDataElementIDmaxAvail; | 7 | uimsbf |
|   } | | |
|   else { | | |
|     <span style="border:1px solid">mae_bsMetaDataElementIDoffset;</span> | 7 | uimsbf |
|     mae_metaDataElementIDoffset = mae_bsmetaDataElementIDoffset +1; | | |
|     mae_metaDataElementIDmaxAvail; | 7 | uimsbf |
|   } | | |
| } | | |

FIG. 32

Table 137 - Syntax of Intracoded_object_metadata_efficient()

| syntax | No. of bits | Mnemonic |
|---|---|---|
| intracoded_object_metadata_efficient() | | |
| { | | |
|   ifperiod; | 6 | uimsbf |
|   if (num_objects>1) { | | |
|     common_azimuth; | 1 | bslbf |
|     if (common_azimuth) { | | |
|       default_azimuth; | 8 | tcimsdf |
|     } | | |
|     else { | | |
|       for (o = 0; o < num_objects; o++) { | | |
|         position_azimuth[o]; | 8 | tcimsdf |
|       } | | |
|     } | | |
|     common_elevation; | 1 | bslbf |
|     if (common_elevation) { | | |
|       default_elevation; | 6 | tcimsbf |
|     } | | |
|     else { | | |
|       for (o = 0; o < num_object; o++) { | | |
|         position_elevation[o]; | 6 | tcimsbf |
|       } | | |
|     } | | |
|     common_radius; | 1 | bslbf |
|     if (common_radius;) { | | |
|       default_radius; | 4 | uimsbf |
|     } | | |
|     else { | | |
|       for (o = 0; o < num_objects; o++) { | | |
|         position_radius[o]; | 4 | uimsbf |
|       } | | |
|     } | | |
|     common_gain; | 1 | bslbf |
|     if (common_gain;) { | | |
|       default_gain; | 7 | tcimsdf |
|     } | | |
|     else { | | |
|       for (o = 0; o < num_objects; o++) { | | |
|         gain_factor[o]; | 7 | tcimsdf |
|       } | | |
|     } | | |
|     common_spread; | 1 | bslbf |
|     if (common_spread) { | | |
|       if (hasUniformSpread) { | | |
|         default_spread; | 7 | uimsbf |
|       } | | |
|       else { | | |
|         default_spread; width; | 7 | uimsbf |
|         default_spread; height; | 5 | uimsbf |
|         default_spread; depth; | 4 | uimsbf |
|       } | | |
|     } | | |
|     else { | | |
|       for (o = 0; o < num_objects; o++) { | | |
|         if (hasUniformSpread) { | | |
|           spread[o]; | 7 | uimsbf |
|         } | | |
|         else { | | |
|           spread[o]_width[o]; | 7 | uimsbf |
|           spread[o]_height[o]; | 5 | uimsbf |
|           spread[o]_depth[o]; | 4 | uimsbf |
|         } | | |
|       } | | |
|     } | | |
|     if (hasDynamicObjectPriority) { | | |
|       common_dynamic_object_priority; | 1 | bslbf |
|       if (common_dynamic_object_priority) { | | |
|         defualt_dynamic_object_priority; | 3 | uimsbf |
|       } | | |
|       else { | | |
|         for (o = 0; o < num_objects; o++) { | | |
|           dynamic_object_priority[o]; | 3 | uimsbf |
|         } | | |
|       } | | |
|     } | | |
|   } | | |
|   else { | | |
|     position_azimuth; | 8 | tcimsbf |
|     position_elevation; | 6 | tcimsbf |
|     position_radius; | 4 | uimsbf |
|     gain_factor; | 7 | tcimsbf |
|     if (hasUniformSpread) { | | |
|       spread; | 7 | uimsbf |
|     } | | |
|     else { | | |
|       spread_width; | 7 | uimsbf |
|       spread_height; | 5 | uimsbf |
|       spread_depth; | 4 | uimsbf |
|     } | | |
|     if (hasDynamicObjectPriority) { | | |
|       dynamic_object_priority; | 3 | uimsbf |
|     } | | |
|   } | | |
| } | | |

Table 132 - Units of the decoded object metadata components

| component | unit | value range |
|---|---|---|
| azimuth | ° (degree) | -180; 180 |
| elevation | ° (degree) | -90; 90 |
| radius | m (meter) | 0.5; 16 |
| gain | none (linear) | 0.004; 5.957 |
| spread (uniform) | ° (degree) | 0; 180 |
| spread width | ° (degree) | 0; 180 |
| spread height | ° (degree) | 0; 90 |
| spread depth | m (meter) | 0; 15.5 |
| dynamic object priority | none | 0; 7 |

FIG. 33

Table 262 - Syntax of ei_GroupInteractivityStatus()

| syntax | No. of bits | Mnemonic |
|---|---|---|
| ei_GroupInteractivityStatus ( numGroups ) { | | |
|    for (grp = 0; grp < numGroups; grp++) { | 7 | uimsbf |
|       ei_groupID[grp]; | 1 | bslbf |
|       ei_onOff[grp]; | 1 | bslbf |
|       ei_routeToWIRE[grp]; | | |
|       if ( ei_routeToWIRE[grp] == 1 ) { | | |
|          routeToWireID[grp]; | 16 | uimsbf |
|       } | | |
|       if ( ei_onOff [grp] == 1 ) { | | |
|          ei_changePosition[grp]; /* position change */ | 1 | bslbf |
|          if ( ei_changePosition[grp] ) { | | |
|             ei_azOffset[grp]; | 8 | uimsbf |
|             ei_elOffset[grp]; | 6 | uimsbf |
|             ei_disFact[grp]; | 4 | uimsbf |
|          } | | |
|          ei_changeGain; /* gain change */ | 1 | bslbf |
|          if ( ei_changeGain ) { | | |
|             ei_gain; | 7 | uimsbf |
|          } | | |
|       } | | |
|    } | | |
| } | | |

| | |
|---|---|
| ei_changePosition | This flag defines if the position of the group elements has been changed (azimuth and/or elevation and/or distance have been modified by the user). |
| ei_azOffset | This change of azimuth is given as an offset. This field can take a values between AzOffset = 180° and AzOffset = 180 ° <br><br> AzOffset = 1.5 x (ei_azOffset_128) <br><br> AzOffset = min (max (AzOffset, -180), 180); |
| ei_elOffset | The change of azimuth is given as an offset. This field can take values between ElOffset=90° and ElOffset=90° <br><br> ElOffset = 3 x (ei_eloffset - 32) <br><br> ElOffset = min (max (ElOffset, -90, 90); |
| ei_disFact | The distance interactivity is given as a multiplication factor. The field can take values between 0 to 15 resulting in DistFactor between 0.00025 and 8; <br><br> DistFactor = $2^{(ei\_disFactor - 12)}$ <br><br> DistFactor = min( max (DistFactor, 0.00025), 8); |
| ei_changeGain | This flag defines if the gain/level of the group elements has been changed (the gain has been modified by the user) |
| ei_gain | This field defines an additional gain of the members of the current group. The field can take values between 0 and 127 representing gain values between <br> Gain = -63dB and Gain = 31 dB in 1 dB steps, with <br><br> Gain [dB] = ei_gain - 64 <br><br> Gain [dB] = min( max (Gain, -63), 31); <br><br> if ei_gain is set to 0, Gain shall be set to minus infinity dB. |

FIG. 34

```
class RegionOnSphereSampleEntry(type) extends MetaDataSampleEntry(type) {
        RegionOnSphereConfigBox(); // mandatory
        SubtitleOverlayConfigBoxD(); // optional
        Box[] other_boxes; // optional
}
class SubtitleOverlayConfigBoxD extends FullBox('socd', version = 0, flags) {
        unsigned int(1) dynamic_flag
        if(dynamic_flag==0){
                unsigned int(8) subtitle_type;
                unsigned int(8) region_id;
                unsigned int(8) num_of_objects;
                for(i=0; i<num_of_objects;i++){
                        unsigned int(8) audio_object_id;
                        unsigned int(8) audio_object_priority;
                        unsigned int(8) subtitle_id;
                        subtitle_position_info();
                        unsigned int(8) font_size;
                        unsigned int(8) font_style;
                        unsigned int(8) font_weight;
                        unsigned int(8) background_color;
                        unsigned int(8) text_color;
                }
        }
        else {
                unsigned int(8) min_font_size;
                unsigned int(8) max_font_size;
        }
}
```
⎯t13410

```
aligned(8) SubtitleOverlayInfoD(dynamic_flag) {
        unsigned int(8) subtitle_type;
        unsigned int(8) region_id;
        unsigned int(8) num_of_objects;
        for(i=0; i<num_of_objects;i++){
                unsigned int(8) audio_object_id;
                unsigned int(8) audio_object_priority;
                unsigned int(8) subtitle_id;
                subtitle_position_info();
                unsigned int(8) font_size;
                unsigned int(8) font_style;
                unsigned int(8) font_weight;
                unsigned int(8) background_color;
                unsigned int(8) text_color;
                timed_text( );
        }
}
aligned(8) RegionOnSphereSample() {
        for (i = 0; i < num_regions; i++)
                RegionOnSphereStruct(dynamic_range_flag)
        SubtitleOverlayInfoD()
}
```
⎯t13420

FIG. 35

| subtitle_overlay_info_4_1() { | Descriptor |
|---|---|
|    subtitle_type | u(8) |
|    region_id | u(8) |
|    num_of_objects | u(8) |
|    for(i=0; i<num_of_objects; i++){ | |
|       visual_object_id | u(8) |
|       visual_object_priority | u(8) |
|       subtitle_id | u(8) |
|       subtitle_position_info( ) | |
|       font_size | u(8) |
|       font_style | u(8) |
|       font_weight | u(8) |
|       background_color | u(8) |
|       text_color | u(8) |
|       timed_text( ) | |
|    } | |
| } | |

FIG. 36

```
class RegionOnSphereSampleEntry(type) extends MetaDataSampleEntry(type) {
                RegionOnSphereConfigBox(); // mandatory
                SubtitleOverlayConfigBoxE(); // optional
                Box[] other_boxes; // optional
}
class SubtitleOverlayConfigBoxE extends FullBox('socd', version = 0, flags) {
                unsigned int(1) dynamic_flag;
                if(dynamic_flag==0){
                                unsigned int(8) subtitle_type;
                                unsigned int(8) region_id;
                                unsigned int(8) num_of_objects;
                                for(i=0; i<num_of_objects;i++){
                                                unsigned int(8) visual_object_id;
                                                unsigned int(8) visual_object_priority;
                                                unsigned int(8) subtitle_id;
                                                SubtitlePositionConfigBox();
                                                unsigned int(8) font_size;
                                                unsigned int(8) font_style;
                                                unsigned int(8) font_weight;
                                                unsigned int(8) background_color;
                                                unsigned int(8) text_color;
                                }
                }
                unsigned int(8) min_font_size;
                unsigned int(8) max_font_size;
}
class SubtitlePositionConfigBox extends FullBox('spcb', version = 0, flags) {
                unsigned int(32) yaw_center;
                unsigned int(32) pitch_center;
                unsigned int(32) roll_center;
                unsigned int(32) horizontal_range;
                unsigned int(32) vertical_range;
}
```

FIG. 37

```
aligned(8) SubtitleOverlayInfoE(dynamic_flag) {
                unsigned int(8) subtitle_type;
                unsigned int(8) region_id;
                unsigned int(8) num_of_objects;
                for(i=0; i<num_of_objects;i++){
                                unsigned int(8) visual_object_id;
                                                unsigned int(8) visual_object_priority;
                                unsigned int(8) subtitle_id;
                                SubtitlePositionInfo();
                                unsigned int(8) font_size;
                                unsigned int(8) font_style;
                                unsigned int(8) font_weight;
                                unsigned int(8) background_color;
                                unsigned int(8) text_color;
                                timed_text( );
                }
}
aligned(8) SubtitlePositionInfo() {
                unsigned int(32) yaw_center;
                unsigned int(32) pitch_center;
                unsigned int(32) roll_center;
                unsigned int(32) horizontal_range;
                unsigned int(32) vertical_range;
}
aligned(8) RegionOnSphereSample() {
                for (i = 0; i < num_regions; i++)
                                RegionOnSphereStruct(dynamic_range_flag)
                SubtitleOverlayInfoE();
                SubtitlePositionInfo();
}
```

FIG. 38

| @value | Use |
|---|---|
| subtitle_type | M |
| region_id | M |
| num_of_objects | M |
| audio_object_id | 0...n |
| audio_object_priority | 0...n |
| visual_object_id | 0...n |
| visual_object_priority | 0...n |
| subtitle_id | 0...n |
| subtitle_position_info() | 0...n |
| font_size | 0...n |
| font_style | 0...n |
| font_weight | 0...n |
| background_color | 0...n |
| text_color | 0...n |
| Legend: For attributes: M=Mandatory, O=Optional, OD=Optional with Default Value, CM=Conditionally Mandatory. | |

FIG. 39

| subtitle_overlay_info_5 ( ) { | Descriptor |
|---|---|
| cancel_flag | u(1) |
| if(cancel_flag==0){ | |
| 3D_flag | u(1) |
| calibration_position_flag_for_3D | u(1) |
| if(3D_flag ==1) { | |
| target_view | u(1) |
| target_point_x | u(16) |
| target_point_y | u(16) |
| disparity_for_subtitle | u(32) |
| if(calibration_position_flag_for_3D) { | |
| x_sign | u(1) |
| y_sign | u(1) |
| x_offset | u(8) |
| y_offset | u(8) |
| } | |
| timed_text() | |
| } | |
| } | |
| } | |

FIG. 40

```
class RegionOnSphereSampleEntry(type) extends MetaDataSampleEntry(type) {
            RegionOnSphereConfigBox(); // mandatory
            SubtitleOverlayConfigBoxF(); // optional
            Box[] other_boxes; // optional
}
class SubtitleOverlayConfigBoxF extends FullBox('soce', version = 0, flags) {
            unsigned int(1) dynamic_flag;
            if(dynamic_flag==0){
                        unsigned int(1) 3D_flag;
                        unsigned int(1) calibration_position_flag_for_3D;
                        if(3D_flag ==1) {
                                    unsigned int(8) target_view;
                                    unsigned int(16) target_point_x;
                                    unsigned int(16) target_point_y;
                                    unsigned int(8) disparity_for_subtitle;
                                    if(calibration_position_flag_for_3D) {
                                                unsigned int(8) x_sign;
                                                unsigned int(8) y_sign;
                                                unsigned int(8) x_offset;
                                                unsigned int(8) y_offset;
                                    }
                        }
            }
            else {
                        unsigned int(8) x_offset_min;
                        unsigned int(8) y_offset_min;
                        unsigned int(8) x_offset_max;
                        unsigned int(8) y_offset_max;
            }
}
```
— t40010

```
aligned(8) SubtitleOverlayInfoF(dynamic_flag) {
            unsigned int(1) 3D_flag;
            unsigned int(1) calibration_position_flag_for_3D;
            if(3D_flag ==1) {
                        unsigned int(8) target_view;
                        unsigned int(16) target_point_x;
                        unsigned int(16) target_point_y;
                        unsigned int(8) disparity_for_subtitle;
                        if(calibration_position_flag_for_3D) {
                                    unsigned int(8) x_sign;
                                    unsigned int(8) y_sign;
                                    unsigned int(8) x_offset;
                                    unsigned int(8) y_offset;
                        }
                        timed_text();
            }
}
aligned(8) RegionOnSphereSample() {
            for (i = 0; i < num_regions; i++)
                        RegionOnSphereStruct(dynamic_range_flag)
            SubtitleOverlayInfoF();
}
```
— t40020

FIG. 41

| @value | Use |
|---|---|
| target_view | 0 |
| target_point_x | 0 |
| target_point_y | 0 |
| disparity_for_subtitle | 0 |
| x_sign | 0 |
| y_sign | 0 |
| x_offset | 0 |
| y_offset | 0 |

| subtitle_overlay_info_6 () { | Descriptor |
|---|---|
| cancel_flag | u(1) |
| if(cancel_flag==0){ | |
|     unit_basis_type | u(8) |
|     width_proj_frame | u(32) |
|     height_proj_frame | u(32) |
|     subtitle_off_region_info_flag | u(1) |
|     if(subtitle_off_region_info_flag==1){ | |
|         video_region_middle_point_x | u(32) |
|         video_region_middle_point_y | u(32) |
|         video_region_width_for_subtitle | u(32) |
|         video_region_height_for_subtitle | u(32) |
|     timed_text() | |
|     } | |
| } | |

```
class RegionOnSphereSampleEntry(type) extends MetaDataSampleEntry(type) {
            RegionOnSphereConfigBox(); // mandatory
            SubtitleOverlayConfigBoxG(); // optional
            Box[] other_boxes; // optional
}
class SubtitleOverlayConfigBoxG extends FullBox('socg', version = 0, flags) {
            unsigned int(1) dynamic_flag;
            if(dynamic_flag==0){
                        unsigned int(8) unit_basis_type;
                        unsigned int(32) width_proj_frame;
                        unsigned int(32) height_proj_frame;
                        unsigned int(1) subtitle_off_region_info_flag;
                        if(subtitle_off_region_info_flag==1){
                                    unsigned int(32) video_region_middle_point_x;
                                    unsigned int(32) video_region_middle_point_y;
                                    unsigned int(32) video_region_width_for_subtitle;
                                    unsigned int(32) video_region_height_for_subtitle;
                        }
            }
            else{
                        unsigned int(32) video_region_middle_point_x_for_representative_point;
                        unsigned int(32) video_region_middle_point_y_for_representative_point;
                        unsigned int(32) min_width_for_subtitle_for_representative_point;
                        unsigned int(32) min_height_for_subtitle_for_representative_point;
                        unsigned int(32) max_width_for_subtitle_for_representative_point;
                        unsigned int(32) max_height_for_subtitle_for_representative_point;
            }
}
```
— t43010

```
aligned(8) SubtitleOverlayInfoG(dynamic_flag) {
            unsigned int(8) unit_basis_type;
            unsigned int(1) subtitle_off_region_info_flag;
            if(subtitle_off_region_info_flag==1){
                        unsigned int(32) video_region_middle_point_x;
                        unsigned int(32) video_region_middle_point_y;
                        unsigned int(32) video_region_width_for_subtitle;
                        unsigned int(32) video_region_height_for_subtitle;
                        timed_text();
            }

}
aligned(8) RegionOnSphereSample() {
            for (i = 0; i < num_regions; i++)
                        RegionOnSphereStruct(dynamic_range_flag)
            SubtitleOverlayInfoG();
}
```
— t43020

FIG. 44

| @value | Use |
|---|---|
| unit_basis_type | M |
| width_proj_frame | M |
| height_proj_frame | M |
| video_region_middle_point_x, | O |
| video_region_middle_point_y, | O |
| video_region_width_for_subtitle, | O |
| video_region_height_for_subtitle | O |

FIG. 45
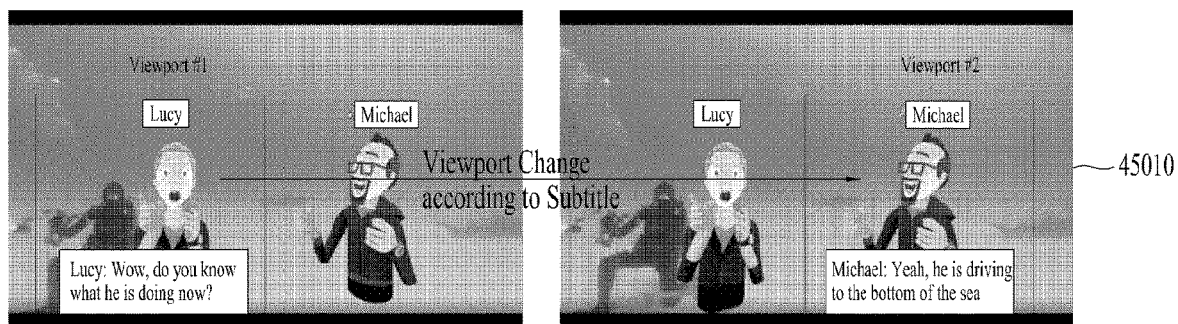
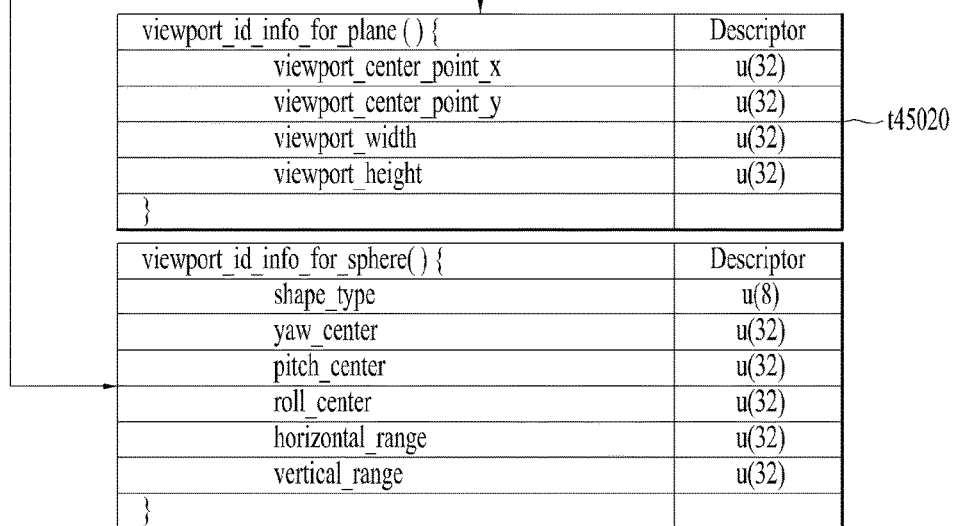

FIG. 46

```
class RegionOnSphereSampleEntry(type) extends MetaDataSampleEntry(type) {
                    RegionOnSphereConfigBox(); // mandatory
                    SubtitleOverlayConfigBoxH(); // optional
                    Box[] other_boxes; // optional
}
class SubtitleOverlayConfigBoxH extends FullBox('soch', version = 0, flags) {
                    unsigned int(1) dynamic_flag;
                    if(dynamic_flag==0){
                                    unsigned int(8) audio_object_id;
                                    unsigned int(8) subtitle_id;
                                    unsigned int(8) recommended_viewport_id;
                                    RecommendedViewportIDConfigBox();
                    }
                    else
                                    RecommendedViewportIDConfigBox();
}
class RecommendedViewportIDConfigBox extends FullBox('rvii', version=0, flags) {     ~t46010
                    unsigned int(1) sphere_flag;
                    if(sphere_flag==1){// In case of sphrere
                                    unsigned int(8) shape_type;
                                    unsigned int(32) yaw_center;
                                    unsigned int(32) pitch_center;
                                    unsigned int(32) roll_center;
                                    unsigned int(32) horizontal_range;
                                    unsigned int(32) vertical_range;
                    }
                    else if(sphere_flag==0){// In case of plane
                                    unsigned int(32) viewport_center_point_x;
                                    unsigned int(32) viewport_center_point_y;
                                    unsigned int(32) viewport_width;
                                    unsigned int(32) viewport_height;
                    }
}
```

```
aligned(8) SubtitleOverlayInfoH(dynamic_flag) {
                    unsigned int(8) audio_object_id;
                    unsigned int(8) subtitle_id;
                    unsigned int(8) recommended_viewport_id;
                    RecommendedViewportIDInfo();
                    }
}
aligned(8) RecommendedViewportIDInfo( ) {
                    unsigned int(1) sphere_flag;
                    if(sphere_flag==1){
                                    unsigned int(8) shape_type;
                                    unsigned int(32) yaw_center;
                                    unsigned int(32) pitch_center;
                                    unsigned int(32) roll_center;
                                    unsigned int(32) horizontal_range;       ~t46020
                                    unsigned int(32) vertical_range;
                    }
                    else if(sphere_flag==0){
                                    unsigned int(32) viewport_center_point_x;
                                    unsigned int(32) viewport_center_point_y;
                                    unsigned int(32) viewport_width;
                                    unsigned int(32) viewport_height;
                    }
}
aligned(8) RegionOnSphereSample() {
                    for (i = 0; i < num_regions; i++)
                                    RegionOnSphereStruct(dynamic_range_flag)
                    SubtitleOverlayInfoH();
}
```

FIG. 47

| @value | Use |
|---|---|
| audio_object_id | M |
| subtitle_id | M |
| recommended_viewport_id | M |
| viewport_center_point_x | O |
| viewport_center_point_y | O |
| viewport_width | O |
| viewport_height | O |
| shape_type | O |
| yaw_center | O |
| pitch_center | O |
| roll_center | O |
| horizontal_range | O |
| vertical_range | O |

FIG. 48

| | Descriptor |
|---|---|
| subtitle_overlay_info_8 ( ) { | |
|   3D_stereo_service_flag | u(1) |
|   adaptive_subtitle_overlay_flag | u(1) |
|   if(3D_stereo_service_flag == 1 && adaptive_subtitle_overlay_flag==1){ | |
|     cancel_flag | u(1) |
|     if(cancel_flag==0){ | |
|       subtitle_id | u(8) |
|       including_depth_map_flag | u(1) |
|       including_disparity_map_flag | u(1) |
|       if(including_depth_map_flag==1 \|\| including_disparity_map_flag==1) { | |
|         depth_or_disparity_map_id | u(8) |
|         depth_or_disparity_map_type | u(3) |
|         downsampling_flag | u(1) |
|         if(downsampling_flag==1){ | |
|           if(depth_or_disparity_map_type==0) { | |
|             shape_type | u(8) |
|             downsampling_point_for_yaw_center | u(32) |
|             downsampling_point_for_pitch_center | u(32) |
|             downsampling_point_for_roll_center | u(32) |
|             downsampling_rate_for_horizontal_range | u(32) |
|             downsampling_rate_for_vertical_range | u(32) |
|           } | |
|           else if(depth_or_disparity_map_type==1) { | |
|             downsampling_rate_for_width | u(8) |
|             downsampling_rate_for_height | u(8) |
|           } | |
|         } | |
|         if(including_depth_map_flag==1) | |
|           left_depth_map_flag | u(2) |
|         offset_unit | u(4) |
|         sign_of_offset_for_subtitle | u(1) |
|         offset_value_for_subtitle | u(16) |
|         font_size_unit | u(4) |
|         sign_font_size | u(1) |
|         font_size_offset | u(16) |
|         window_size_unit | u(4) |
|         sign_window_size | u(1) |
|         window_size_offset | u(16) |
|       } | |
|       else if(including_depth_map_flag==0 && including_disparity_map_flag==0){ | |
|         including_disparity_values | u(1) |
|         num_of_regions | u(8) |
|         for(i=0; i<num_of_regions; i++){ | |
|           region_id | u(8) |
|           region_info() | |
|           if(including_disparity_values==0) | |
|             left_flag | u(1) |
|             value_unit | u(4) |
|             target_point_yaw_center | u(32) |
|             target_point_pitch_center | u(32) |
|             target_point_roll_center | u(32) |
|             disparity_depth_value_of_target_point | se(v) |
|             min_value_in_region_of_video | se(v) |
|             max_value_in_region_of_video | se(v) |
|             font_size_unit_in_region | u(4) |
|             sign_font_size_in_region | u(1) |
|             font_size_offset_in_region | u(16) |
|             window_size_unit | u(4) |
|             sign_window_size_in_region | u(1) |
|             window_size_offset_in_region | u(16) |
|           } | |
|         } | |
|       timed_text() | |
|     } | |
|   } | |
| } | |

FIG. 49

```
aligned(8) RegionOnSphereSample() {
    for (i = 0; i < num_regions; i++)
        RegionOnSphereStruct(dynamic_range_flag)
    SubtitleOverlayInfoI();
}
aligned(8) SubtitleOverlayInfoI( ) {
    unsigned int(1) dynamic_flag;
    if(dynamic_flag==0){
        unsigned int(1) 3D_stereo_service_flag;
        if(3D_stereo_service_flag == 1){
            unsigned int(8) subtitle_id;
            unsigned int(1) including_depth_map_flag;
            unsigned int(1) including_disparity_map_flag;
            if(including_depth_map_flag==1 || including_disparity_map_flag==1) {
                unsigned int(8) depth_or_disparity_map_id;
                unsigned int(8) depth_or_disparity_map_type;
                unsigned int(8) downsampling_flag;
                if(downsampling_flag==1){
                    if(depth_or_disparity_map_type==0) {
                        unsigned int(8) shape_type;
                        unsigned int(32)downsampling_point_for_yaw_center;
                        unsigned int(32) downsampling_point_for_pitch_center;
                        unsigned int(32) downsampling_point_for_roll_center;
                        unsigned int(32) downsampling_rate_for_horizontal_range;
                        unsigned int(32) downsampling_rate_for_vertical_range;
                    }
                    else if(depth_or_disparity_map_type==1) {
                        unsigned int(8) downsampling_rate_for_width;
                        unsigned int(8) downsampling_rate_for_height;
                    }
                }
            }
            if(including_depth_map_flag==1)
                unsigned int(1) left_depth_map_flag;
            unsigned int(4) offset_unit;
            unsigned int(1) sign_of_offset_for_subtitle;
            unsigned int(16) offset_value_for_subtitle;
            unsigned int(4) font_size_unit;
            unsigned int(1) sign_font_size;
            unsigned int(16) font_size_offset;
            unsigned int(4) window_size_unit;
            unsigned int(1) sign_window_size;
            unsigned int(16) window_size_offset;
        }
        else if(including_depth_map_flag==0 && including_disparity_map_flag==0){
            unsigned int(1) including_disparity_values;
            unsigned int(8) num_of_regions;
            for(i=0; i<num_of_regions; i++){
                unsigned int(8) region_id;
                RecommendedViewportIDInfo();
                if(including_disparity_values==0)
                    unsigned int(1) left_flag;
                unsigned int(4) value_unit;
                unsigned int(32) target_point_yaw_center;
                unsigned int(32) target_point_pitch_center;
                unsigned int(32) target_point_roll_center;
                signed int exp-Golomb(v) disparity_depth_value_of_target_point;
                signed int exp-Golomb(v) min_value_in_region_of_video;
                signed int exp-Golomb(v) max_value_in_region_of_video;
                unsigned int(4) font_size_unit_in_region;
                unsigned int(1) sign_font_size_in_region;
                unsigned int(16) font_size_offset_in_region;
                unsigned int(4) window_size_unit;
                unsigned int(1) sign_window_size_in_region;
                unsigned int(16) window_size_offset_in_region;
            }
        }
        timed_text();
    }
}
```

FIG. 50

| @ value | Use |
|---|---|
| subtitle_id | 0 |
| depth_or_disparity_map_id | 0 |
| depth_or_disparity_map_type | 0 |
| shape_type | 0 |
| downsampling_point_for_yaw_center | 0 |
| downsampling_point_for_pitch_center | 0 |
| downsampling_rate_for_horizontal_range | 0 |
| downsampling_rate_for_vertical_range | 0 |
| downsampling_rate_for_width | 0 |
| downsampling_rate_for_height | 0 |
| offset_unit | 0 |
| sign_of_offset_for_subtitle | 0 |
| font_size_unit | 0 |
| sign_font_size | 0 |
| font_size_offset | 0 |
| window_size_unit | 0 |
| sign_window_size | 0 |
| window_size_offset | 0 |
| including_disparity_values | 0 |
| num_of_regions | 0 |
| region_id | 0 |
| region_info    () | 0 |
| left_flag | 0 |
| value_unit | 0 |
| target_point_yaw_center | 0 |
| target_point_pitch_center | 0 |
| target_point_roll_center | 0 |
| disparity_depth_value_of_target_point | 0 |
| min_value_in_region_of_video | 0 |
| max_value_in_region_of_video | 0 |
| font_size_offset_in_region | 0 |
| sign_font_size_in_region | 0 |
| window_size_unit | 0 |
| sign_window_size_in_region | 0 |
| window_size_offset_in_region | 0 |

… # METHOD OF TRANSMITTING 360-DEGREE VIDEO, METHOD OF RECEIVING 360-DEGREE VIDEO, DEVICE FOR TRANSMITTING 360-DEGREE VIDEO, AND DEVICE FOR RECEIVING 360-DEGREE VIDEO

This application is a continuation of application Ser. No. 15/680,901, filed on Aug. 18, 2017, which claims the benefit of U.S. Provisional Patent Application No. 62/506,515, filed on May 15, 2017, which is hereby incorporated by reference as if fully set forth herein.

BACKGROUND OF THE INVENTION

Field of the Invention

The present invention relates to a method of transmitting 360-degree video, a method of receiving 360-degree video, a device for transmitting 360-degree video and a device for receiving 360-degree video.

Discussion of the Related Art

A virtual reality (VR) system provides, to a user, the experience of being in an electronically projected environment. The VR system can be enhanced in order to provide images with higher definition and spatial sounds. The VR system can allow a user to interactively use VR content.

SUMMARY OF THE INVENTION

The VR system needs to be enhanced in order to more efficiently provide VR environments to users. To this end, it is necessary to provide data transmission efficiency for transmission of a large amount of data such as VR content, robustness between transmission and reception networks, network flexibility taking into consideration of a mobile receiver, efficient reproduction and a signaling method, etc.

In addition, since general timed text markup language (TTML) based subtitles or bitmap based subtitles are not created in consideration of 360-degree video, it is necessary to extend subtitle related features and subtitle related signaling information to be adapted to use cases of a VR service in order to provide subtitles suitable for 360-degree video.

Accordingly, the present invention is directed to an apparatus for providing subtitles for a 360 content at both the transmitting side and the receiving side, and methods for providing subtitles for a 360 content at both the transmitting side and the receiving side.

The method of providing subtitles for a 360 content, according to an aspect of the present invention, comprising: generating 360 video data captured by at least one camera; stitching the 360 video data; projecting the 360 video data to a 2D image; encoding the 2D image into a video stream; generating a 360 subtitle Supplemental Enhancement Information (SEI) message for signaling a subtitle for the 360 content; inserting the 360 subtitle SEI message into the video stream; and generating a broadcast signal including the video stream, and transmitting the broadcast signal, wherein the 360 subtitle SEI message includes a subtitle ID for identifying the subtitle, a region ID for identifying a subtitle region where the subtitle is overlayed in a 360 space, and subtitle region information for specifying the subtitle region in the 360 space, and wherein the subtitle region information is either fixed region information or offset region information, the fixed region information is for specifying the subtitle region fixed in the 360 space, and the offset region information is for specifying the subtitle region changing in the 360 space based on a viewport.

Preferably, the fixed region information includes first information indicating a top-left point of the subtitle region, and second information indicating a bottom-right point of the subtitle region in the 360 space.

Preferably, the fixed region information includes first information indicating a start point being an angular point of the subtitle region, second information indicating an end point being an other angular point of the subtitle region diagonally located from the angular point, and third information indicating a middle point for specifying a location of the subtitle region in the 360 space.

Preferably, the fixed region information includes center information indicating yaw, pitch and roll values of a center point of the subtitle region, and range information indicating horizontal and vertical ranges of the subtitle region from the center point.

Preferably, the offset region information includes offset center information indicating yaw, pitch and roll offsets for a center point of the subtitle region, range information indicating horizontal and vertical ranges of the subtitle region from the center point, and type information for indicating a type of the offset center information.

Preferably, when the type information indicates a first type, the offset center information indicates yaw, pitch and roll offsets between the center point of the subtitle region and a center point of the viewport currently being used.

Preferably, when the type information indicates a second type, the offset center information indicates yaw, pitch and roll offsets between the center point of the subtitle region and a center point of a previous subtitle region specified by a previous 360 subtitle SEI message.

Preferably, the 360 subtitle SEI message further includes number information for indicating the number of multiple subtitle regions where the same subtitle identified by the subtitle ID is overlayed, and multiple sets of region IDs and subtitle region information for identifying and specifying the multiple subtitle regions in the 360 space.

The apparatus for providing subtitles for a 360 content, according to other aspect of the present invention, comprising: a processor configured to generate 360 video data captured by at least one camera; a stitcher configured to stitch the 360 video data; a projection processor configured to project the 360 video data to a 2D image; a data encoder configured to encode the 2D image into a video stream; a metadata processor configured to generate a 360 subtitle Supplemental Enhancement Information (SEI) message for signaling a subtitle for the 360 content, wherein the data encoder is further configured to insert the 360 subtitle SEI message into the video stream; a transport processor configured to generate a broadcast signal including the video stream; and a transmitter configured to transmit the broadcast signal, wherein the 360 subtitle SEI message includes a subtitle ID for identifying the subtitle, a region ID for identifying a subtitle region where the subtitle is overlayed in a 360 space, and subtitle region information for specifying the subtitle region in the 360 space, and wherein the subtitle region information is either fixed region information or offset region information, the fixed region information is for specifying the subtitle region fixed in the 360 space, and the offset region information is for specifying the subtitle region changing in the 360 space based on a viewport.

Preferably, the fixed region information includes first information indicating a top-left point of the subtitle region, and second information indicating a bottom-right point of the subtitle region in the 360 space.

Preferably, the fixed region information includes first information indicating a start point being an angular point of the subtitle region, second information indicating an end point being an other angular point of the subtitle region diagonally located from the angular point, and third information indicating a middle point for specifying a location of the subtitle region in the 360 space.

Preferably, the fixed region information includes center information indicating yaw, pitch and roll values of a center point of the subtitle region, and range information indicating horizontal and vertical ranges of the subtitle region from the center point.

Preferably, the offset region information includes offset center information indicating yaw, pitch and roll offsets for a center point of the subtitle region, range information indicating horizontal and vertical ranges of the subtitle region from the center point, and type information for indicating a type of the offset center information.

Preferably, when the type information indicates a first type, the offset center information indicates yaw, pitch and roll offsets between the center point of the subtitle region and a center point of the viewport currently being used.

Preferably, when the type information indicates a second type, the offset center information indicates yaw, pitch and roll offsets between the center point of the subtitle region and a center point of a previous subtitle region specified by a previous 360 subtitle SEI message.

Preferably, the 360 subtitle SEI message further includes number information for indicating the number of multiple subtitle regions where the same subtitle identified by the subtitle ID is overlayed, and multiple sets of region IDs and subtitle region information for identifying and specifying the multiple subtitle regions in the 360 space.

The present invention can efficiently transmit 360-degree content in an environment in which next-generation hybrid broadcasting using terrestrial broadcast networks and the Internet is supported.

The present invention can provide a method for providing interactive experience when a user uses 360-degree content.

The present invention can propose a signaling method for correctly reflecting the intention of a 360-degree content producer in consumption of 360-degree content.

The present invention can propose a method for efficiently increasing transmission capacity and delivering necessary information in delivery of 360-degree content.

BRIEF DESCRIPTION OF THE DRAWINGS

FIG. 7 illustrates tiles according to one embodiment of the present invention.

FIG. 8 illustrates 360-degree video related metadata according to one embodiment of the present invention.

FIG. 11 illustrates overall operation of a DASH based adaptive streaming model according to one embodiment of the present invention.

FIG. 12 is a diagram for describing metadata related to 360-degree subtitles according to an embodiment of the present invention when subtitles are rendered at a fixed position on a sphere.

FIG. 13 shows 360-degree subtitle related metadata according to an embodiment of the present invention represented in the form of a supplemental enhancement information (SEI) message when subtitles are rendered at a fixed position on a sphere.

FIG. 14 shows 360-degree subtitle related metadata according to another embodiment of the present invention represented in the form of an SEI message when subtitles are rendered at a fixed position on a sphere.

FIG. 15 illustrates delivery of a SubtitleOverlayConfigBoxA class and 360-degree subtitle related metadata defined as the class in RegionOnSphereSampleEntry or RegionOnSphereSample( ).

FIG. 16 shows 360-degree subtitle related metadata according to an embodiment represented in the form of a DASH based descriptor when subtitles are rendered at a fixed position on a sphere.

FIG. 17 is a diagram for illustrating 360-degree subtitle related metadata according to an embodiment of the present invention when subtitles are rendered at a position varying according to viewports.

FIG. 18 shows the 360-degree subtitle related metadata according to an embodiment of the present invention represented in the form of an SEI message when subtitles are rendered at a position varying according to viewports.

FIG. 19 shows 360-degree subtitle related metadata according to another embodiment of the present invention represented in the form of an SEI message when subtitles are rendered at a fixed position on a sphere.

FIG. 20 illustrates delivery of a SubtitleOverlayConfigBoxB class and 360-degree subtitle related metadata defined as the class in RegionOnSphereSampleEntry or RegionOnSphereSample( ).

FIG. 21 illustrates delivery of a SubtitleOverlayConfigBoxP class and 360-degree subtitle related metadata defined as the class in RegionOnSphereSampleEntry or RegionOnSphereSample( ).

FIG. 22 shows 360-degree subtitle related metadata according to another embodiment of the present invention which is represented in the form of a DASH based descriptor.

FIG. 23 is a diagram for describing 360-degree subtitle related metadata according to an embodiment of the present invention when subtitles are rendered on the basis of an actual display screen.

FIG. 25 shows 360-degree subtitle related metadata according to an embodiment which is represented in the form of an SEI message when subtitles are rendered on the basis of an actual display screen.

FIG. 26 illustrates delivery of a SubtitleOverlayConfigBoxC class and 360-degree subtitle related metadata defined as the class in RegionOnSphereSampleEntry according to an embodiment.

FIG. 27 illustrates delivery of SubtitleOverlayInfoC( ) and 360-degree subtitle related metadata defined as SubtitleOverlayInfoC( ) in RegionOnSphereSample( ) according to an embodiment of the present invention.

FIG. 28 shows 360-degree subtitle related metadata according to an embodiment of the present invention which is represented in the form of a DASH based descriptor when subtitles are rendered on the basis of an actual display screen.

FIG. 30 shows 360-degree subtitle related metadata according to an embodiment of the present invention which is represented in the form of an SEI message when subtitles are rendered on the basis of an audio object.

FIGS. 31, 32 and 33 are diagrams for describing the audio_object_id field and the audio_object_priority field in 360-degree subtitle related metadata when subtitles are rendered on the basis of an audio object.

FIG. 34 shows a SubtitleOverlayConfigBoxD class delivered through RegionOnSphereSampleEntry and SubtitleOverlayInfoD delivered through RegionOnSphere Sample( ) according to an embodiment of the present invention.

FIG. 35 shows 360-degree subtitle related metadata according to an embodiment of the present invention which is represented in the form of an SEI message when subtitles are rendered on the basis of a video object.

FIG. 36 shows a SubtitleOverlayConfigBoxE class and a SubtitlePositionConfigBox class delivered through RegionOnSphereSampleEntry according to an embodiment of the present invention.

FIG. 37 shows SubtitlePositionInfo( ) and SubtitleOverlayInfoE( ) delivered through RegionOnSphereSample( ) according to an embodiment of the present invention.

FIG. 38 shows 360-degree subtitle related metadata according to an embodiment of the present invention which is represented in the form of a DASH based descriptor when subtitles are rendered on the basis of an audio object or a video object.

FIG. 39 shows 360-degree subtitle related metadata according to an embodiment of the present invention which is represented in the form of an SEI message in the case of stereoscopic subtitles.

FIG. 40 shows a SubtitleOverlayConfigBoxF class delivered through RegionOnSphereSampleEntry and SubtitleOverlayInfoF( ) delivered through RegionOnSphereSample( ) according to an embodiment of the present invention.

FIG. 41 shows 360-degree subtitle related metadata according to an embodiment of the present invention which is represented in the form of a DASH based descriptor.

FIG. 43 shows a SubtitleOverlayConfigBoxG class delivered through RegionOnSphereSampleEntry and SubtitleOverlayInfoG( ) delivered through RegionOnSphereSample( ) according to an embodiment of the present invention.

FIG. 44 shows 360-degree subtitle related metadata according to an embodiment of the present invention which is represented in the form of a DASH based descriptor in a case in which subtitle rendering is interrupted when video is zoomed in by a specific level or more.

FIG. 45 shows 360-degree subtitle related metadata according to an embodiment of the present invention which is represented in the form of an SEI message when a viewport recommended per subtitle or audio object is signaled.

FIG. 46 shows a SubtitleOverlayConfigBoxH class delivered through RegionOnSphereSampleEntry and SubtitleOverlayInfoH( ) delivered through RegionOnSphereSample( ) according to an embodiment of the present invention.

FIG. 47 shows 360-degree subtitle related metadata according to an embodiment of the present invention which is represented in the form of a DASH based descriptor when a viewport recommended per subtitle or audio object is signaled.

FIG. 48 shows 360-degree subtitle related metadata according to an embodiment of the present invention which is represented in the form of an SEI message when a depth or disparity value of subtitles is controlled depending on a depth or disparity value of a viewport.

FIG. 49 illustrates delivery of 360-degree subtitle related metadata defined as SubtitleOverlayInfoI through RegionOnSphereSample( ).

FIG. 50 shows 360-degree subtitle related metadata according to an embodiment of the present invention which is represented in the form of a DASH based descriptor when a depth or disparity value of subtitles is controlled according to a depth or disparity value of a viewport.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that may be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

Figure 1:
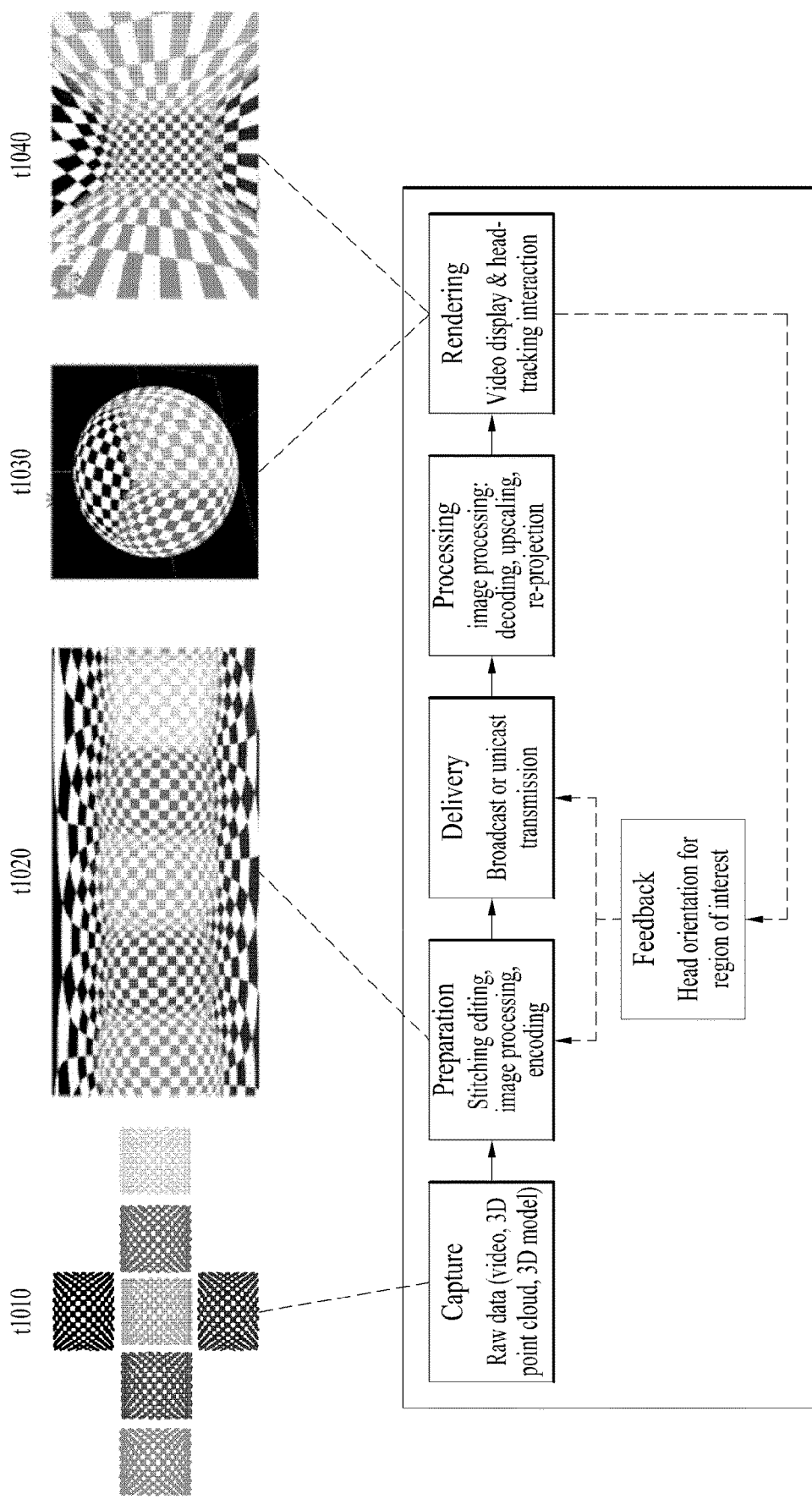
FIG. 1 illustrates architecture for providing 360-degree video according to the present invention.

FIG. 1 illustrates an architecture for providing 360 video according to the present invention. The present invention provides a method for providing 360 content to provide VR (Virtual Reality) to users. VR refers to a technique or an environment for replicating an actual or virtual environment. VR artificially provides sensuous experiences to users, and users can experience electronically projected environments.

360 content refers to convent for realizing and providing VR and may include 360 video and/or 360 audio. 360 video may refer to video or image content which is necessary to provide VR and is captured or reproduced in all directions (360 degrees). 360 video can refer to video or image represented on 3D spaces in various forms according to 3D models. For example, 360 video can be represented on a spherical plane. 360 audio is audio content for providing VR and can refer to spatial audio content which can be recognized as content having an audio generation source located on a specific space. 360 content can be generated, processed and transmitted to users, and users can consume VR experiences using the 360 content.

The present invention proposes a method for effectively providing 360 video. To provide 360 video, first, 360 video can be captured using one or more cameras. The captured 360 video is transmitted through a series of processes, and a receiving side can process received data into the original 360 video and render the 360 video. Accordingly, the 360 video can be provided to a user.

Specifically, a procedure for providing 360 video may include a capture process, a preparation process, a transmission process, a processing process, a rendering process and/or a feedback process.

The capture process may refer to a process of capturing images or videos for a plurality of views through one or more cameras. The shown image/video data t1010 can be generated through the capture process. Each plane of the shown image/video data t1010 can refer to an image/video for each view. The captured images/videos may be called raw data. In the capture process, metadata related to capture can be generated.

For capture, a special camera for VR may be used. When 360 video with respect to a virtual space generated using a computer is provided in an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, each image/video may pass through a stitching process. The stitching process may be a process of connecting captured images/videos to create a single panorama image/video or a spherical image/video.

Then, the stitched images/videos may pass through a projection process. In the projection process, the stitched images/videos can be projected on a 2D image. This 2D image may be called a 2D image frame. Projection on a 2D image may be represented as mapping to the 2D image. The projected image/video data can have a form of a 2D image t1020 as shown in the figure.

The video data projected on the 2D image can pass through a region-wise packing process in order to increase video coding efficiency. Region-wise packing may refer to a process of dividing video data projected on a 2D image into regions and processing the regions. Here, regions may refer to regions obtained by dividing a 2D image on which 360 video data is projected. Such regions can be obtained by dividing the 2D image equally or arbitrarily according to an embodiment. Regions may be divided according to a projection scheme according to an embodiment. The region-wise packing process is an optional process and thus may be omitted in the preparation process.

According to an embodiment, this process may include a process of rotating the regions or rearranging the regions on the 2D image in order to increase video coding efficiency. For example, the regions can be rotated such that specific sides of regions are positioned in proximity to each other to increase coding efficiency.

According to an embodiment, the this process may include a process of increasing or decreasing the resolution of a specific region in order to differentiate the resolution for regions of the 360 video. For example, the resolution of regions corresponding to a relatively important part of the 360 video can be increased to higher than other regions. The video data projected on the 2D image or the region-wise packed video data can pass through an encoding process using a video codec.

According to an embodiment, the preparation process may additionally include an editing process. In this editing process, the image/video data before or after projection may be edited. In the preparation process, metadata with respect to stitching/projection/encoding/editing may be generated. In addition, metadata with respect to the initial view or ROI (region of interest) of the video data projected on the 2D image may be generated.

The transmission process may be a process of processing and transmitting the image/video data and metadata which have pass through the preparation process. For transmission, processing according to an arbitrary transmission protocol may be performed. The data that has been processed for transmission can be delivered over a broadcast network and/or broadband. The data may be delivered to a receiving side in an on-demand manner. The receiving side can receive the data through various paths.

The processing process refers to a process of decoding the received data and re-projecting the projected image/video data on a 3D model. In this process, the image/video data projected on the 2D image can be re-projected on a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection can be edited. When the image/video data has been reduced, the size of the image/video data can be increased through up-scaling of samples in the up-scaling process. As necessary, the size may be decreased through down-scaling.

The rendering process may refer to a process of rendering and displaying the image/video data re-projected on the 3D space. Re-projection and rendering may be collectively represented as rendering on a 3D mode. The image/video re-projected (or rendered) on the 3D model may have a form t1030 as shown in the figure. The form t1030 corresponds to a case in which the image/video data is re-projected on a spherical 3D model. A user can view a region of the rendered image/video through a VR display or the like. Here, the region viewed by the user may have a form t1040 shown in the figure.

The feedback process may refer to a process of delivering various types of feedback information which can be acquired in the display process to a transmission side. Through the feedback process, interactivity in 360 video consumption can be provided. According to an embodiment, head orientation information, viewport information indicating a region currently viewed by a user, etc. can be delivered to the transmission side in the feedback process. According to an embodiment, a user can interact with content realized in a VR environment. In this case, information related to the interaction may be delivered to the transmission side or a service provider during the feedback process. According to an embodiment, the feedback process may not be performed.

The head orientation information may refer to information about the position, angle and motion of a user's head. On the basis of this information, information about a region of 360 video currently viewed by the user, that is, viewport information can be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the receiving side and the analysis result may be delivered to the transmission side through a feedback channel. An apparatus such as a VR display can extract a viewport region on the basis of the position/direction of a user's head, vertical or horizontal FOV supported by the apparatus, etc.

According to an embodiment, the aforementioned feedback information may be consumed at the receiving side as well as being delivered to the transmission side. That is, decoding, re-projection and rendering processes of the receiving side can be performed using the aforementioned feedback information. For example, only 360 video with respect to the region currently viewed by the user can be preferentially decoded and rendered using the head orientation information and/or the viewport information.

Here, a viewport or a viewport region can refer to a region of 360 video currently viewed by a user. A viewpoint is a point in 360 video which is viewed by the user and can refer to a center point of a viewport region. That is, a viewport is a region based on a view, and the size and form of the region can be determined by FOV (field of view) which will be described below.

In the above-described architecture for providing 360 video, image/video data which is subjected to a series of capture/projection/encoding/transmission/decoding/re-projection/rendering processes can be called 360 video data. The term "360 video data" may be used as the concept including metadata or signaling information related to such image/video data.

Figure 2:
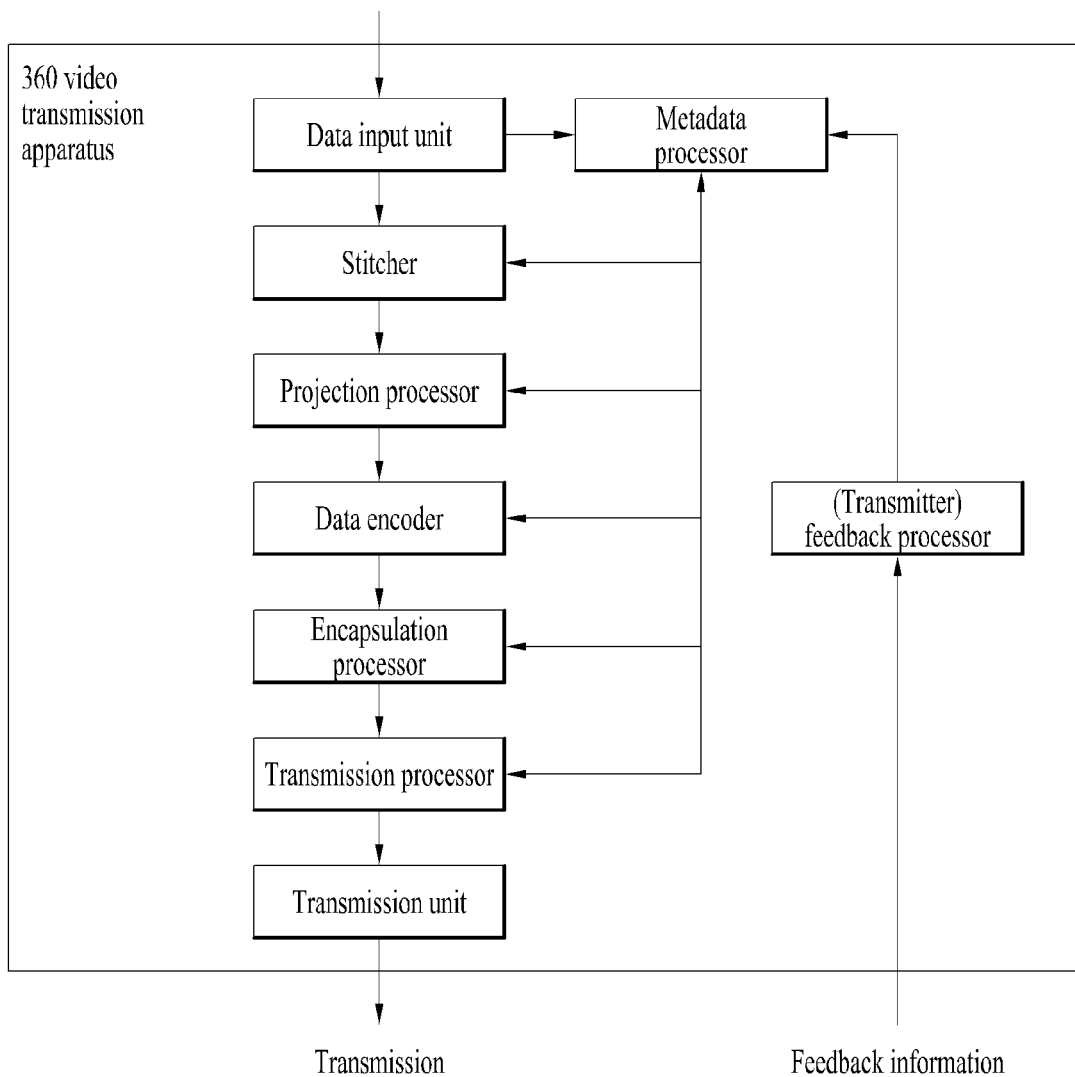
FIG. 2 illustrates a 360-degree video transmission device according to one aspect of the present invention.

FIG. 2 illustrates a 360 video transmission apparatus according to one aspect of the present invention.

According to one aspect, the present invention can relate to a 360 video transmission apparatus. The 360 video transmission apparatus according to the present invention can perform operations related to the above-described preparation process to the transmission process. The 360 video transmission apparatus according to the present invention may include a data input unit, a stitcher, a projection processor, a region-wise packing processor (not shown), a metadata processor, a transmitter feedback processor, a data encoder, an encapsulation processor, a transmission processor and/or a transmitter as internal/external elements.

The data input unit may receive captured images/videos for respective views. The images/videos for the views may be images/videos captured by one or more cameras. In addition, the data input unit may receive metadata generated in a capture process. The data input unit may deliver the received images/videos for the views to the stitcher and deliver the metadata generated in the capture process to a signaling processor.

The stitcher may stitch the captured images/videos for the views. The stitcher can deliver the stitched 360 video data to the projection processor. The stitcher may receive necessary metadata from the metadata processor and use the metadata for stitching operation. The stitcher may deliver the metadata generated in the stitching process to the metadata processor. The metadata in the stitching process may include information indicating whether stitching has been performed, a stitching type, etc.

The projection processor can project the stitched 360 video data on a 2D image. The projection processor can perform projection according to various schemes which will be described below. The projection processor can perform mapping in consideration of the depth of 360 video data for each view. The projection processor may receive metadata necessary for projection from the metadata processor and use the metadata for the projection operation as necessary. The projection processor may deliver metadata generated in a projection process to the metadata processor. The metadata of the projection process may include a projection scheme type.

The region-wise packing processor (not shown) can perform the aforementioned region-wise packing process. That is, the region-wise packing processor can perform a process of dividing the projected 360 video data into regions, rotating or rearranging the regions or changing the resolution of each region. As described above, the region-wise packing process is an optional process, and when region-wise packing is not performed, the region-wise packing processor can be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor can process metadata which can be generated in the capture process, the stitching process, the projection process, the region-wise packing process, the encoding process, the encapsulation process and/or the processing process for transmission. The metadata processor can generate 360 video related metadata using such metadata. According to an embodiment, the metadata processor may generate the 360 video related metadata in the form of a signaling table. The 360 video related metadata may be called metadata or 360 video related signaling information according to signaling context. Furthermore, the metadata processor can deliver acquired or generated metadata to internal elements of the 360 video transmission apparatus as necessary. The metadata processor may deliver the 360 video related metadata to the data encoder, the encapsulation processor and/or the transmission processor such that the metadata can be transmitted to the receiving side.

The data encoder can encode the 360 video data projected on the 2D image and/or the region-wise packed 360 video data. The 360 video data can be encoded in various formats.

The encapsulation processor can encapsulate the encoded 360 video data and/or 360 video related metadata into a file. Here, the 360 video related metadata may be delivered from the metadata processor. The encapsulation processor can encapsulate the data in a file format such as ISOBMFF, CFF or the like or process the data into a DASH segment. The encapsulation processor may include the 360 video related metadata in a file format according to an embodiment. For example, the 360 video related metadata can be included in boxes of various levels in an ISOBMFF file format or included as data in an additional track in a file. The encapsulation processor can encapsulate the 360 video related metadata into a file according to an embodiment. The transmission processor can perform processing for transmission on the 360 video data encapsulated in a file format. The transmission processor can process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmission unit can transmit the processed 360 video data and/or the 360 video related metadata over a broadcast network and/or broadband. The transmission unit can include an element for transmission over a broadcast network and an element for transmission over a broadband.

According to an embodiment of the 360 video transmission apparatus according to the present invention, the 360 video transmission apparatus may further include a data storage unit (not shown) as an internal/external element. The data storage unit may store the encoded 360 video data and/or 360 video related metadata before delivery thereof. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and transmitted.

According to another embodiment of the 360 video transmission apparatus according to the present invention, the 360 video transmission apparatus may further include a transmitter feedback processor and/or a network interface (not shown) as internal/external elements. The network interface can receive feedback information from a 360 video reception apparatus according to the present invention and deliver the feedback information to the transmitter feedback processor. The transmitter feedback processor can deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements can reflect the feedback information in 360 video data processing.

According to another embodiment of the 360 video transmission apparatus according to the present invention, the region-wise packing processor can rotate regions and map the regions on a 2D image. Here, the regions can be rotated in different directions at different angles and mapped on the 2D image. The regions can be rotated in consideration of neighboring parts and stitched parts of the 360 video data on the spherical plane before projection. Information about rotation of the regions, that is, rotation directions and angles can be signaled using 360 video related metadata. According to another embodiment of the 360 video transmission apparatus according to the present invention, the data encoder can perform encoding differently on respective regions. The data encoder can encode a specific region with high quality and encode other regions with low quality. The feedback processor at the transmission side can deliver the feedback information received from a 360 video reception apparatus to the data encoder such that the data encoder can use encoding methods differentiated for regions. For example, the transmitter feedback processor can deliver viewport information received from a receiving side to the data encoder. The data encoder can encode regions including a region indicated by the viewport information with higher quality (UHD) than other regions.

According to another embodiment of the 360 video transmission apparatus according to the present invention, the transmission processor can perform processing for transmission differently on respective regions. The transmission processor can apply different transmission parameters (modulation orders, code rates, etc.) to regions such that data delivered to the regions have different robustnesses.

Here, the transmitter feedback processor can deliver the feedback information received from the 360 video reception apparatus to the transmission processor such that the transmission processor can perform transmission processing differentiated for respective regions. For example, the transmitter feedback processor can deliver viewport information received from the receiving side to the transmission processor. The transmission processor can perform transmission processing on regions including a region indicated by the viewport information such that the regions have higher robustness than other regions.

The internal/external elements of the 360 video transmission apparatus according to the present invention may be hardware elements realized by hardware. According to an embodiment, the internal/external elements may be modified, omitted, replaced by other elements or integrated with other elements. According to an embodiment, additional elements may be added to the 360 video transmission apparatus.

Figure 3:
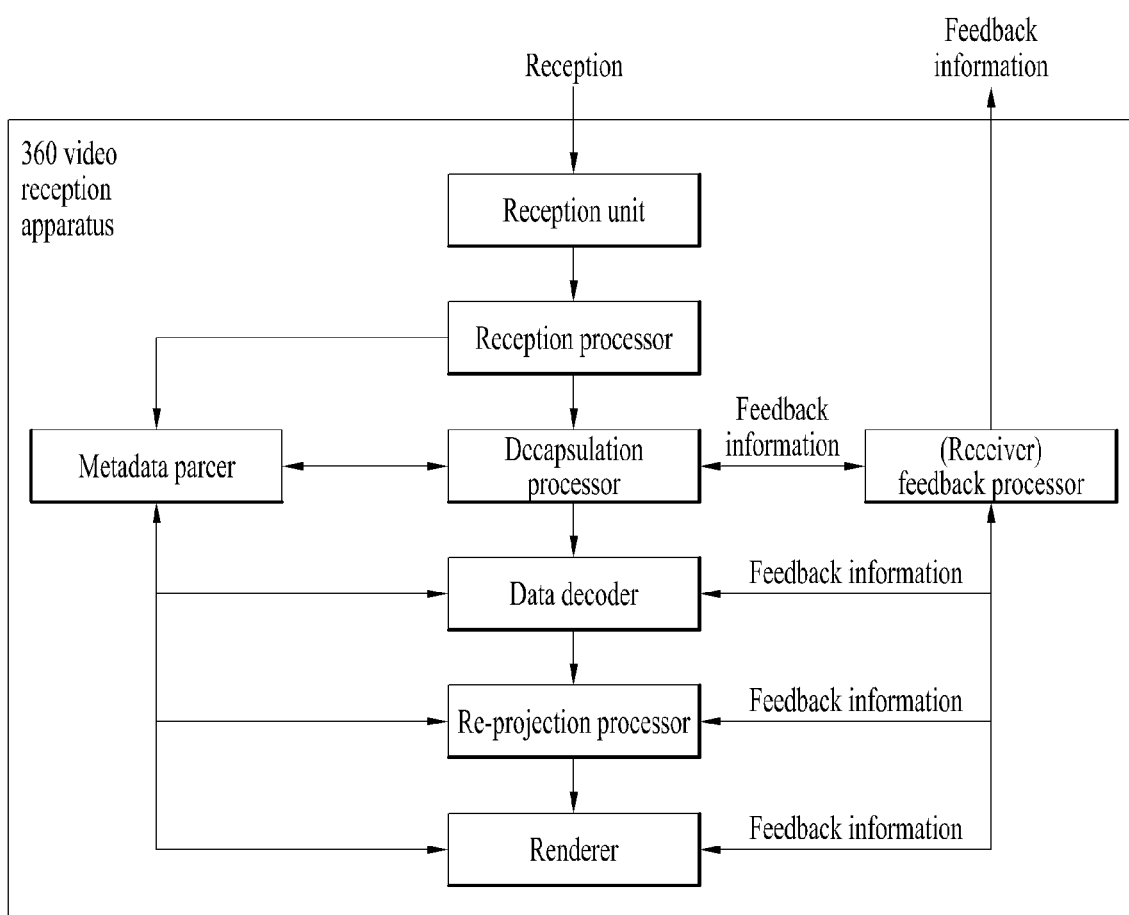
FIG. 3 illustrates a 360-degree video reception device according to another aspect of the present invention.

FIG. 3 illustrates a 360 video reception apparatus according to another aspect of the present invention.

According to another aspect, the present invention may relate to a 360 video reception apparatus. The 360 video reception apparatus according to the present invention can perform operations related to the above-described processing process and/or the rendering process. The 360 video reception apparatus according to the present invention may include a reception unit, a reception processor, a decapsulation processor, a data decoder, a metadata parser, a receiver feedback processor, a re-projection processor and/or a renderer as internal/external elements.

The reception unit can receive 360 video data transmitted from the 360 video transmission apparatus according to the present invention. The reception unit may receive the 360 video data through a broadcast network or a broadband according to a transmission channel.

The reception processor can perform processing according to a transmission protocol on the received 360 video data. The reception processor can perform a reverse of the process of the transmission processor. The reception processor can deliver the acquired 360 video data to the decapsulation processor and deliver acquired 360 video related metadata to the metadata parser. The 360 video related metadata acquired by the reception processor may have a form of a signaling table.

The decapsulation processor can decapsulate the 360 video data in a file format received from the reception processor. The decapsulation processor can decapsulate files in ISOBMFF to acquire 360 video data and 360 video related metadata. The acquired 360 video data can be delivered to the data decoder and the acquired 360 video related metadata can be delivered to the metadata parser. The 360 video related metadata acquired by the decapsulation processor may have a form of box or track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be delivered to the metadata parser.

The metadata parser can parse/decode the 360 video related metadata. The metadata parser can deliver the acquired metadata to the data decapsulation processor, the data decoder, the re-projection processor and/or the renderer.

The re-projection processor can re-project the decoded 360 video data. The re-projection processor can re-project the 360 video data on a 3D space. The 3D space may have different forms according to used 3D modes. The re-projection processor may receive metadata necessary for re-projection from the metadata parser. For example, the re-projection processor can receive information about the type of a used 3D model and detailed information thereof from the metadata parser. According to an embodiment, the re-projection processor may re-project only 360 video data corresponding to a specific region on the 3D space on the 3D space using the metadata necessary for re-projection.

The renderer can render the re-projected 360 video data. This may be represented as rendering of the 360 video data on a 3D space as described above. When two processes are simultaneously performed in this manner, the re-projection processor and the renderer can be integrated to perform both the processes in the renderer. According to an embodiment, the renderer may render only a region viewed by a user according to view information of the user.

A user can view part of the rendered 360 video through a VR display. The VR display is an apparatus for reproducing 360 video and may be included in the 360 video reception apparatus (tethered) or connected to the 360 video reception apparatus as a separate apparatus (un-tethered).

According to an embodiment of the 360 video reception apparatus according to the present invention, the 360 video reception apparatus may further include a (receiver) feedback processor and/or a network interface (not shown) as internal/external elements. The receiver feedback processor can acquire feedback information from the renderer, the re-projection processor, the data decoder, the decapsulation processor and/or the VR display and process the feedback information. The feedback information may include viewport information, head orientation information, gaze information, etc. The network interface can receive the feedback information from the receiver feedback processor and transmit the same to the 360 video transmission apparatus.

As described above, the feedback information may be used by the receiving side in addition to being delivered to the transmission side. The receiver feedback processor can deliver the acquired feedback information to internal elements of the 360 video reception apparatus such that the feedback information is reflected in a rendering process. The receiver feedback processor can deliver the feedback information to the renderer, the re-projection processor, the data decoder and/or the decapsulation processor. For example, the renderer can preferentially render a region viewed by a user using the feedback information. In addition, the decapsulation processor and the data decoder can preferentially decapsulate and decode a region viewed by the user or a region to be viewed by the user.

The internal/external elements of the 360 video reception apparatus according to the present invention may be hardware elements realized by hardware. According to an embodiment, the internal/external elements may be modified, omitted, replaced by other elements or integrated with other elements. According to an embodiment, additional elements may be added to the 360 video reception apparatus.

Another aspect of the present invention may relate to a method of transmitting 360 video and a method of receiving 360 video. The methods of transmitting/receiving 360 video according to the present invention can be performed by the above-described 360 video transmission/reception apparatuses or embodiments thereof.

The aforementioned embodiments of the 360 video transmission/reception apparatuses and embodiments of the internal/external elements thereof may be combined. For example, embodiments of the projection processor and embodiments of the data encoder can be combined to create as many embodiments of the 360 video transmission apparatus as the number of the embodiments. The combined embodiments are also included in the scope of the present invention.

Figure 4:
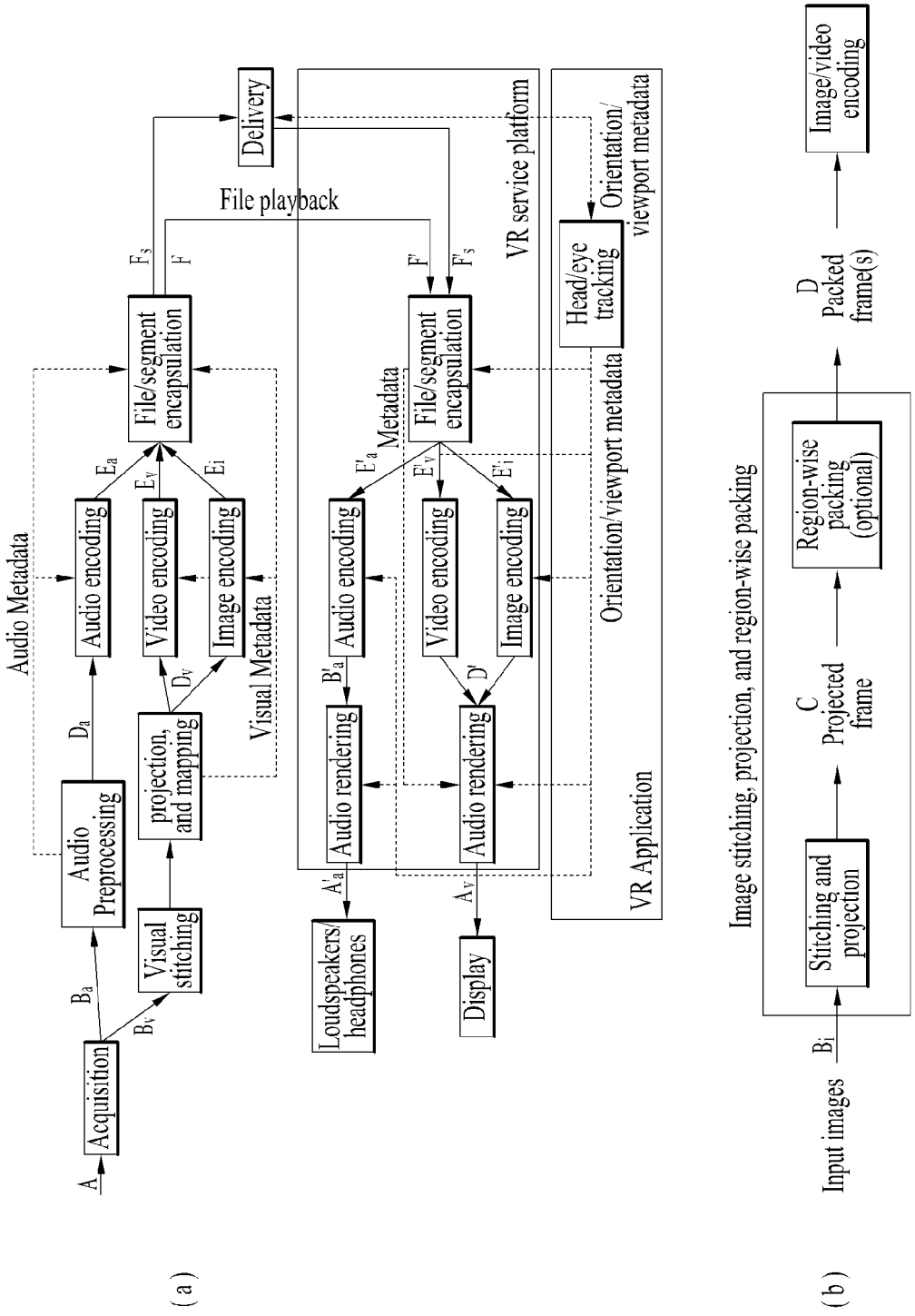
FIG. 4 illustrates a 360-degree video transmission device/ 360-degree video reception device according to another embodiment of the present invention.

FIG. 4 illustrates a 360 video transmission apparatus/360 video reception apparatus according to another embodiment of the present invention.

As described above, 360 content can be provided according to the architecture shown in (a). The 360 content can be provided in the form of a file or in the form of a segment based download or streaming service such as DASH. Here, the 360 content can be called VR content.

As described above, 360 video data and/or 360 audio data may be acquired.

The 360 audio data can be subjected to audio preprocessing and audio encoding. In these processes, audio related metadata can be generated, and the encoded audio and audio related metadata can be subjected to processing for transmission (file/segment encapsulation).

The 360 video data can pass through the aforementioned processes. The stitcher of the 360 video transmission apparatus can stitch the 360 video data (visual stitching). This process may be omitted and performed at the receiving side according to an embodiment. The projection processor of the 360 video transmission apparatus can project the 360 video data on a 2D image (projection and mapping (packing)).

The stitching and projection processes are shown in (b) in detail. In (b), when the 360 video data (input images) is delivered, stitching and projection can be performed thereon. The projection process can be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection at the receiving side.

The 2D image may also be called a projected frame (C). Region-wise packing may be optionally performed on the 2D image. When region-wise packing is performed, the positions, forms and sizes of regions can be indicated such that the regions on the 2D image can be mapped on a packed frame (D). When region-wise packing is not performed, the projected frame can be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data can be image-encoded or video-encoded. Since the same content can be present for different viewpoints, the same content can be encoded into different bit streams. The encoded 360 video data can be processed into a file format such as ISOBMFF according to the aforementioned encapsulation processor. Alternatively, the encapsulation processor can process the encoded 360 video data into segments. The segments may be included in an individual track for DASH based transmission.

Along with processing of the 360 video data, 360 video related metadata can be generated as described above. This metadata can be included in a video stream or a file format and delivered. The metadata may be used for encoding, file format encapsulation, processing for transmission, etc.

The 360 audio/video data can pass through processing for transmission according to the transmission protocol and then can be transmitted. The aforementioned 360 video reception apparatus can receive the 360 audio/video data over a broadcast network or broadband.

In (a), a VR service platform may correspond to an embodiment of the aforementioned 360 video reception apparatus. In (a), loudspeakers/headphones, display and head/eye tracking components are performed by an external apparatus or a VR application of the 360 video reception apparatus. According to an embodiment, the 360 video reception apparatus may include all of these components. According to an embodiment, the head/eye tracking component may correspond to the aforementioned receiver feedback processor.

The 360 video reception apparatus can perform processing for reception (file/segment decapsulation) on the 360 audio/video data. The 360 audio data can be subjected to audio decoding and audio rendering and provided to a user through a speaker/headphone.

The 360 video data can be subjected to image decoding or video decoding and visual rendering and provided to the user through a display. Here, the display may be a display supporting VR or a normal display.

As described above, the rendering process can be regarded as a process of re-projecting 360 video data on a 3D space and rendering the re-projected 360 video data. This may be represented as rendering of the 360 video data on the 3D space.

The head/eye tracking component can acquire and process head orientation information, gaze information and viewport information of a user. This has been described above.

A VR application which communicates with the aforementioned processes of the receiving side may be present at the receiving side.

Figure 5:
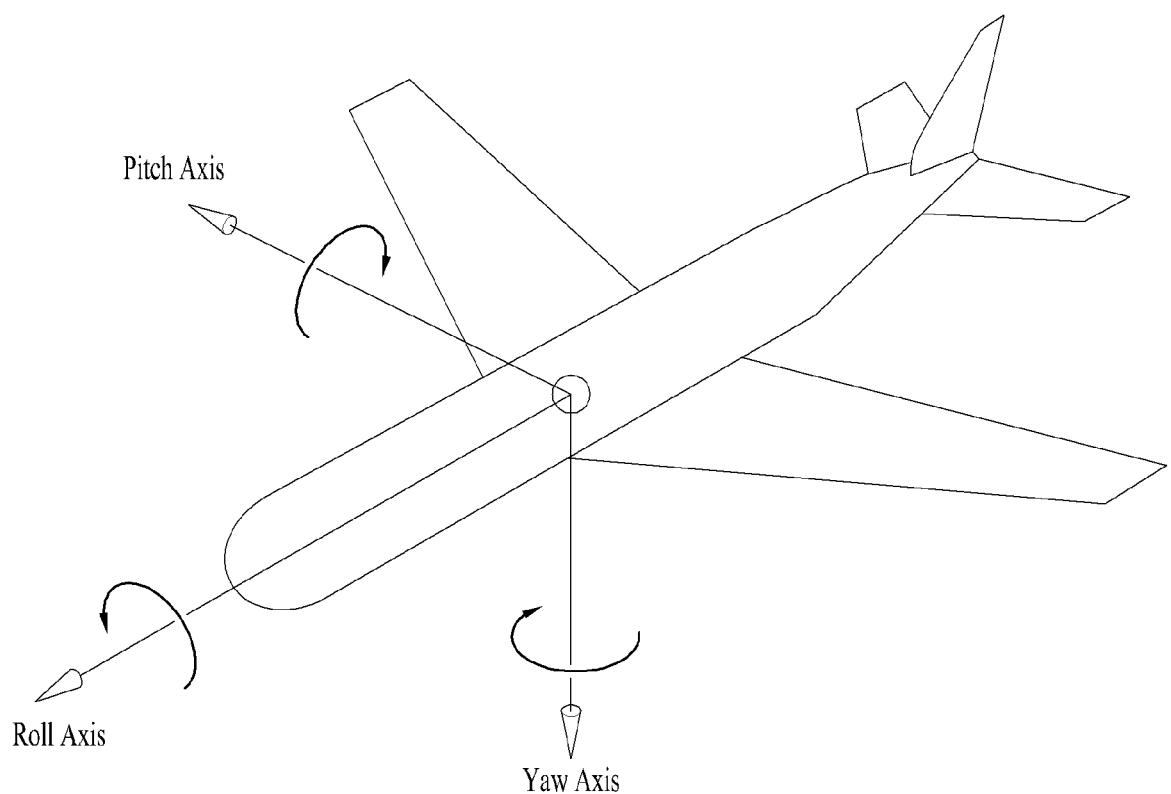
FIG. 5 illustrates the concept of aircraft principal axes for describing a 3D space according to the present invention.

FIG. 5 illustrates the concept of aircraft principal axes for describing a 3D space of the present invention.

In the present invention, the concept of aircraft principal axes can be used to represent a specific point, position, direction, spacing and region in a 3D space.

That is, the concept of aircraft principal axes can be used to describe a 3D space before projection or after re-projection and to signal the same. According to an embodiment, a method using X, Y and Z axes or a spherical coordinate system may be used.

An aircraft can feely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis can refer to an axis connected between wings of the aircraft.

The yaw axis may refer to a reference axis of a direction in which the front end of the aircraft rotates to the left/right. In the shown concept of aircraft principal axes, the yaw axis can refer to an axis connected from the top to the bottom of the aircraft.

The roll axis may refer to an axis connected from the front end to the tail of the aircraft in the shown concept of aircraft principal axes, and rotation in the roll direction can refer to rotation based on the roll axis.

As described above, a 3D space in the present invention can be described using the concept of the pitch, yaw and roll.

Figure 6:
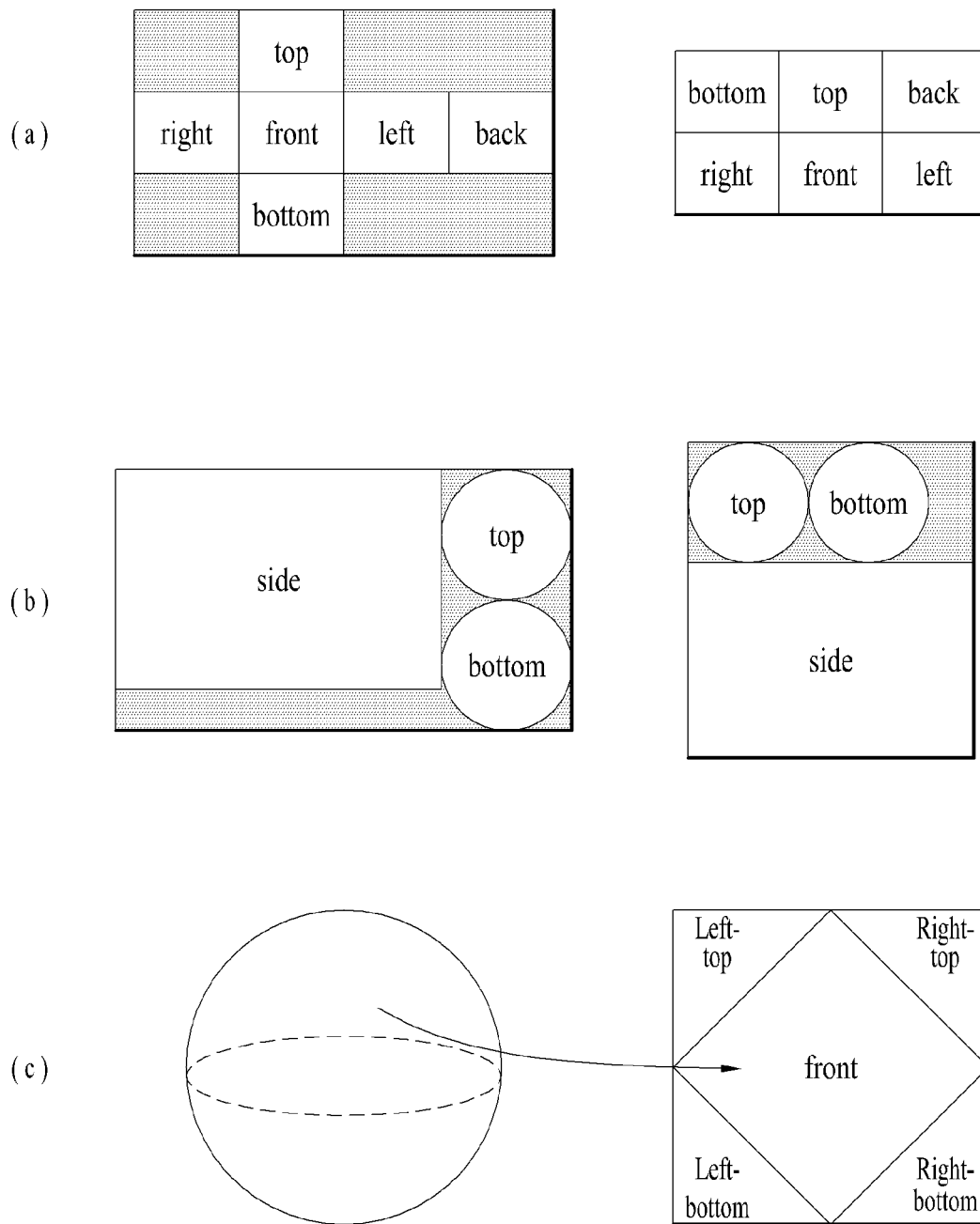
FIG. 6 illustrates projection schemes according to one embodiment of the present invention.

FIG. 6 illustrates projection schemes according to an embodiment of the present invention.

As described above, the projection processor of the 360 video transmission apparatus according to the present invention can project stitched 360 video data on a 2D image. In this process, various projection schemes can be used.

According to another embodiment of the 360 video transmission apparatus according to the present invention, the projection processor can perform projection using a cubic projection scheme. For example, stitched video data can be represented on a spherical plane. The projection processor can segment the 360 video data into a cube and project the same on the 2D image. The 360 video data on the spherical plane can correspond to planes of the cube and be projected on the 2D image as shown in (a).

According to another embodiment of the 360 video transmission apparatus according to the present invention, the projection processor can perform projection using a cylindrical projection scheme. Similarly, if stitched video data can be represented on a spherical plane, the projection processor can segment the 360 video data into a cylinder and project the same on the 2D image. The 360 video data on the spherical plane can correspond to the side, top and bottom of the cylinder and be projected on the 2D image as shown in (b).

According to another embodiment of the 360 video transmission apparatus according to the present invention, the projection processor can perform projection using a pyramid projection scheme. Similarly, if stitched video data can be represented on a spherical plane, the projection processor can regard the 360 video data as a pyramid form and project the same on the 2D image. The 360 video data on the spherical plane can correspond to the front, left top, left bottom, right top and right bottom of the pyramid and be projected on the 2D image as shown in (c).

According to an embodiment, the projection processor may perform projection using an equirectangular projection scheme and a panoramic projection scheme in addition to the aforementioned schemes.

As described above, regions can refer to regions obtained by dividing a 2D image on which 360 video data is projected. Such regions need not correspond to respective sides of the 2D image projected according to a projection scheme. However, regions may be divided such that the sides of the projected 2D image correspond to the regions and region-wise packing may be performed according to an embodiment. Regions may be divided such that a plurality of sides may correspond to one region or one side may correspond to a plurality of regions according to an embodiment. In this case, the regions may depend on projection schemes. For example, the top, bottom, front, left, right and back sides of the cube can be respective regions in (a). The side, top and bottom of the cylinder can be respective regions in (b). The front, left top, left bottom, right top and right bottom sides of the pyramid can be respective regions in (c).

FIG. 7 illustrates tiles according to an embodiment of the present invention.

360 video data projected on a 2D image or region-wise packed 360 video data can be divided into one or more tiles. (a) shows that one 2D image is divided into 16 tiles. Here, the 2D image may be the aforementioned projected frame or packed frame. According to another embodiment of the 360 video transmission apparatus according to the present invention, the data encoder can independently encode the tiles.

The aforementioned region-wise packing can be discriminated from tiling. The aforementioned region-wise packing may refer to a process of dividing 360 video data projected on a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted or consumed to or by a receiving side on a limited bandwidth. Through tiling, a limited bandwidth can be used more efficiently and the receiving side can reduce computational load compared to a case in which the entire 360 video data is processed simultaneously.

A region and a tile are discriminated from each other and thus they need not be identical. However, a region and a tile may refer to the same area according to an embodiment. Region-wise packing can be performed to tiles and thus regions can correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

ROI (Region of Interest) may refer to a region of interest of users, which is provided by a 360 content provider. When 360 video is produced, the 360 content provider can produce the 360 video in consideration of a specific region which is expected to be a region of interest of users. According to an embodiment, ROI may correspond to a region in which important content of the 360 video is reproduced.

According to another embodiment of the 360 video transmission/reception apparatuses according to the present invention, the receiver feedback processor can extract and collect viewport information and deliver the same to the transmitter feedback processor. In this process, the viewport information can be delivered using network interfaces of both sides. In the 2D image shown in (a), a viewport t6010 is displayed. Here, the viewport may be displayed over nine tiles of the 2D images.

In this case, the 360 video transmission apparatus may further include a tiling system. According to an embodiment, the tiling system may be located following the data encoder (b), may be included in the aforementioned data encoder or transmission processor, or may be included in the 360 video transmission apparatus as a separate internal/external element.

The tiling system may receive viewport information from the transmitter feedback processor. The tiling system can select only tiles included in a viewport region and transmit the same. In the 2D image shown in (a), only nine tiles including the viewport region t6010 among 16 tiles can be transmitted. Here, the tiling system can transmit tiles in a unicast manner over a broadband because the viewport region is different for users.

In this case, the transmitter feedback processor can deliver the viewport information to the data encoder. The data encoder can encode the tiles including the viewport region with higher quality than other tiles.

Furthermore, the transmitter feedback processor can deliver the viewport information to the metadata processor. The metadata processor can deliver metadata related to the viewport region to each internal element of the 360 video transmission apparatus or include the metadata in 360 video related metadata.

By using this tiling method, transmission bandwidths can be saved and processes differentiated for tiles can be performed to achieve efficient data processing/transmission.

The above-described embodiments related to the viewport region can be applied to specific regions other than the viewport region in a similar manner. For example, the aforementioned processes performed on the viewport region can be performed on a region determined to be a region in which users are interested through the aforementioned gaze analysis, ROI, and a region (initial view, initial viewpoint) initially reproduced when a user views 360 video through a VR display.

According to another embodiment of the 360 video transmission apparatus according to the present invention, the transmission processor may perform processing for transmission differently on tiles. The transmission processor can apply different transmission parameters (modulation orders, code rates, etc.) to tiles such that data delivered for the tiles has different robustnesses.

Here, the transmitter feedback processor can deliver feedback information received from the 360 video reception apparatus to the transmission processor such that the transmission processor can perform transmission processing differentiated for tiles. For example, the transmitter feedback processor can deliver the viewport information received from the receiving side to the transmission processor. The transmission processor can perform transmission processing such that tiles including the corresponding viewport region have higher robustness than other tiles.

FIG. 8 illustrates 360 video related metadata according to an embodiment of the present invention.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata can be included in various levels such as a file, fragment, track, sample entry, sample, etc. and can include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present invention may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present invention may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata can include a vr_geometry field, a projection_scheme field, etc. According to an embodiment, the basic metadata may further include additional information.

The vr_geometry field can indicate the type of a 3D model supported by the corresponding 360 video data. When the 360 video data is re-projected on a 3D space as described above, the 3D space can have a form according to a 3D model indicated by the vr_geometry field. According to an embodiment, a 3D model used for rendering may differ from the 3D model used for re-projection, indicated by the vr_geometry field. In this case, the basic metadata may further include a field which indicates the 3D model used for rendering. When the field has values of 0, 1, 2 and 3, the 3D space can conform to 3D models of a sphere, a cube, a cylinder and a pyramid. When the field has the remaining values, the field can be reserved for future use. According to an embodiment, the 360 video related metadata may further include detailed information about the 3D model indicated by the field. Here, the detailed information about the 3D model can refer to the radius of a sphere, the height of a cylinder, etc. for example. This field may be omitted.

The projection_scheme field can indicate a projection scheme used when the 360 video data is projected on a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected on the 2D image without stitching. When the field has the remaining values, the field can be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related properties of the 360 video data. The stereoscopic related metadata may include an is_stereoscopic field and/or a stereo_mode field. According to an embodiment, the stereoscopic related metadata may further include additional information.

The is_stereoscopic field can indicate whether the 360 video data supports 3D. When the field is 1, the 360 video data supports 3D. When the field is 0, the 360 video data does not support 3D. This field may be omitted.

The stereo_mode field can indicate 3D layout supported by the corresponding 360 video. Whether the 360 video supports 3D can be indicated only using this field. In this case, the is_stereoscopic field can be omitted. When the field is 0, the 360 video may be a mono mode. That is, the projected 2D image can include only one mono view. In this case, the 360 video may not support 3D.

When this field is 1 and 2, the 360 video can conform to left-right layout and top-bottom layout. The left-right layout and top-bottom layout may be called a side-by-side format and a top-bottom format. In the case of the left-right layout, 2D images on which left image/right image are projected can be positioned at the left/right on an image frame. In the case of the top-bottom layout, 2D images on which left image/right image are projected can be positioned at the top/bottom on an image frame. When the field has the remaining values, the field can be reserved for future use.

The initial view/initial viewpoint related metadata may include information about a view (initial view) which is viewed by a user when initially reproducing 360 video. The initial view/initial viewpoint related metadata may include an initial_view_yaw_degree field, an initial_view_pitch_degree field and/or an initial_view_roll_degree field. According to an embodiment, the initial view/initial viewpoint related metadata may further include additional information.

The initial_view_yaw_degree field, initial_view_pitch_degree field and initial_view_roll_degree field can indicate an initial view when the 360 video is reproduced. That is, the center point of a viewport which is initially viewed when the 360 video is reproduced can be indicated by these three fields. The fields can indicate the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view can be determined through FOV. That is, the 360 video reception apparatus can provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewport which is initially viewed by a user can change for each scene of the 360 video. In this case, the initial view/initial viewpoint related metadata can indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2d_roi_range_flag field and/or a 3d_roi_range_flag field. These two fields can indicate whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata can include a min_top_left_x field, a max_top_left_x field, a min_top_left_y field, a max_top_left_y field, a min_width field, a max_width field, a min_height field, a max_height field, a min_x field, a max_x field, a min_y field and/or a max_y field.

The min_top_left_x field, max_top_left_x field, min_top_left_y field, max_top_left_y field can represent minimum/maximum values of the coordinates of the left top end of the ROI. These fields can sequentially indicate a minimum x coordinate, a maximum x coordinate, a minimum y coordinate and a maximum y coordinate of the left top end.

The min_width field, max_width field, min_height field and max_height field can indicate minimum/maximum values of the width and height of the ROI. These fields can sequentially indicate a minimum value and a maximum value of the width and a minimum value and a maximum value of the height.

The min_x field, max_x field, min_y field and max_y field can indicate minimum and maximum values of coordinates in the ROI. These fields can sequentially indicate a minimum x coordinate, a maximum x coordinate, a minimum y coordinate and a maximum y coordinate of coordinates in the ROI. These fields can be omitted.

When ROI related metadata includes fields which indicate ROI on the basis of coordinates on a 3D rendering space, the ROI related metadata can include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field can indicate a region occupied by ROI on a 3D space using minimum/maximum values of yaw, pitch and roll. These fields can sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field can indicate minimum/maximum values of FOV of the corresponding 360 video data. FOV can refer to the range of view displayed at once when 360 video is reproduced. The min_field_of_view field and max_field_of_view field can indicate minimum and maximum values of FOV. These fields can be omitted. These fields may be included in FOV related metadata which will be described below.

The FOV related metadata can include the aforementioned FOV related information. The FOV related metadata can include a content_fov_flag field and/or a content_fov field. According to an embodiment, the FOV related metadata may further include additional information such as the aforementioned minimum/maximum value related information of FOV.

The content_fov_flag field can indicate whether corresponding 360 video includes information about FOV intended when the 360 video is produced. When this field value is 1, a content_fov field can be present.

The content_fov field can indicate information about FOV intended when the 360 video is produced. According to an embodiment, a region displayed to a user at once in the 360 video can be determined according to vertical or horizontal FOV of the 360 video reception apparatus. Alternatively, a region displayed to a user at once in the 360 video may be determined by reflecting FOV information of this field according to an embodiment.

Cropped region related metadata can include information about a region including 360 video data in an image frame. The image frame can include a 360 video data projected active video area and other areas. Here, the active video area can be called a cropped region or a default display region. The active video area is viewed as 360 video on an actual VR display and the 360 video reception apparatus or the VR display can proces/display only the active video area. For example, when the aspect ratio of the image frame is 4:3, only an area of the image frame other than an upper part and a lower part of the image frame can include 360 video data. This area can be called the active video area.

The cropped region related metadata can include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception apparatus or the VR display. That is, this field can indicate whether the entire image frame indicates an active video area. When only part of the image frame is an active video area, the following four fields may be added.

A cr_region_left_top_x field, a cr_region_left_top_y field, a cr_region_width field and a cr_region_height field can indicate an active video area in an image frame. These fields can indicate the x coordinate of the left top, the y coordinate of the left top, the width and the height of the active video area. The width and the height can be represented in units of pixel.

Figure 9:
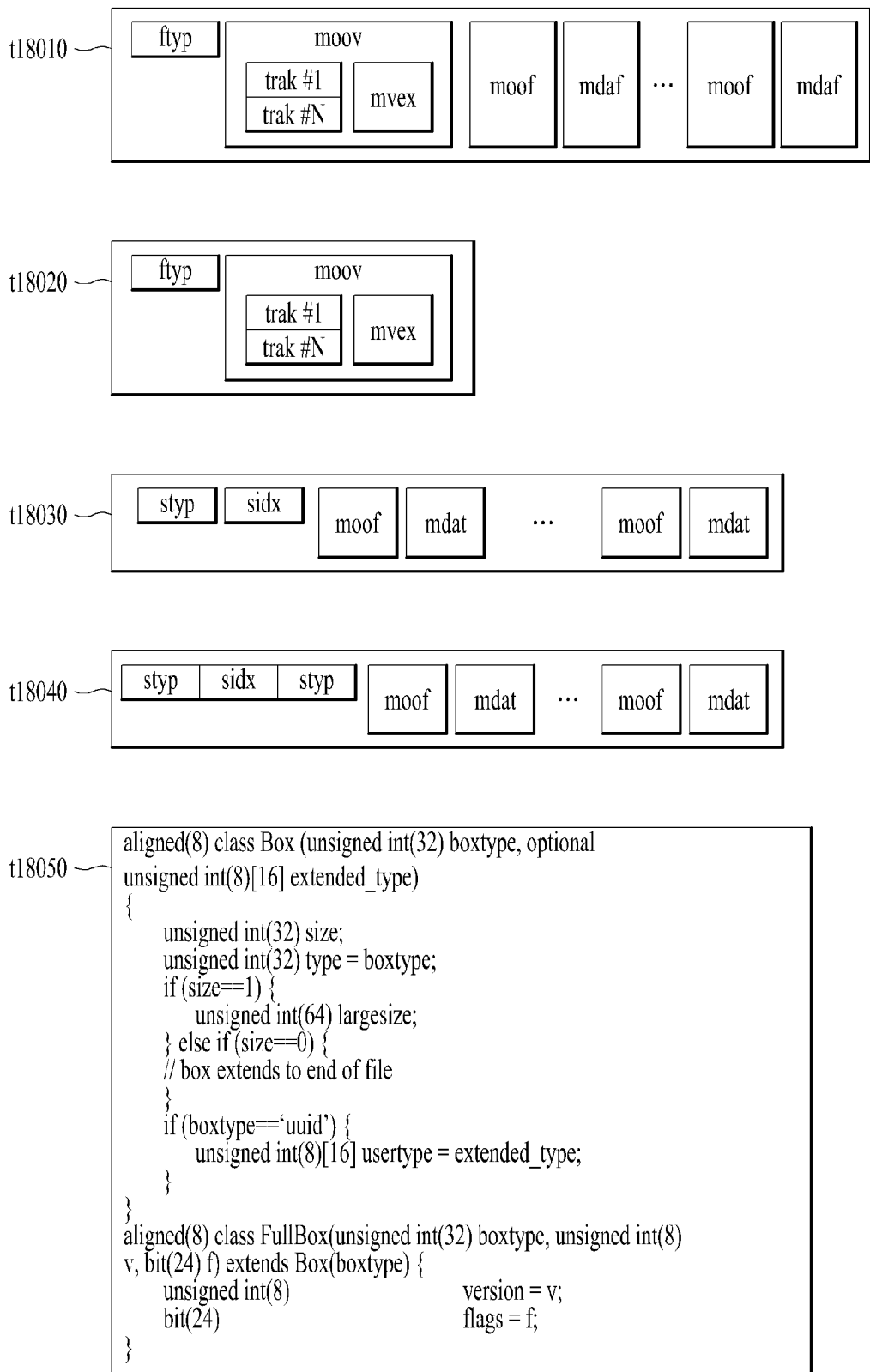
FIG. 9 illustrates a media file structure according to one embodiment of the present invention.

FIG. 9 illustrates a media file structure according to one embodiment of the present invention.

Figure 10:
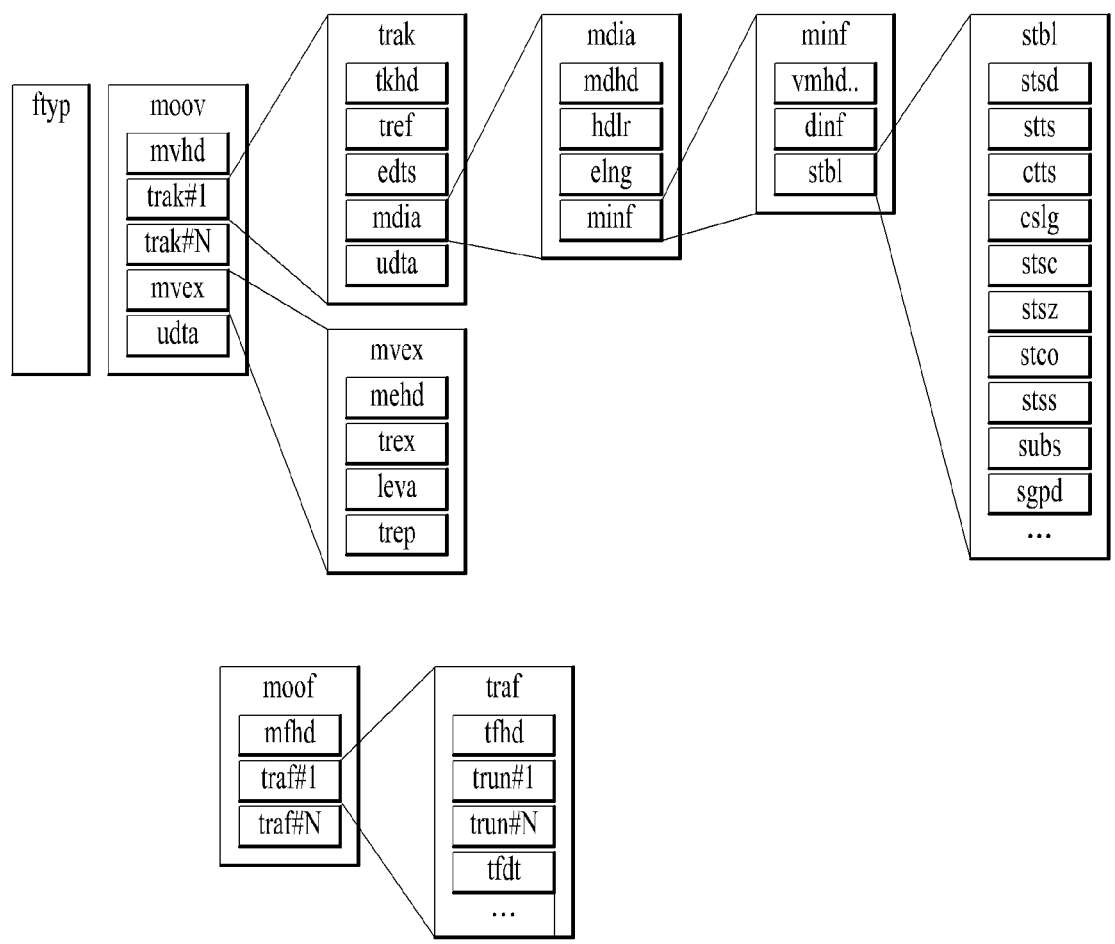
FIG. 10 illustrates a hierarchical structure of boxes in ISOBMFF according to one embodiment of the present invention.

FIG. 10 illustrates a hierarchical structure of boxes in ISOBMFF according to one embodiment of the present invention.

To store and transmit media data such as audio or video, a standardized media file format can be defined. According to an embodiment, a media file may have a file format based on ISO base media file format (ISOBMFF).

A media file according to the present invention may include at least one box. Here, a box may be a data block or an object including media data or metadata related to media data. Boxes may be arranged in a hierarchical structure, and thus data can be classified and a media file can take a form suitable for storage and/or transmission of media data. In addition, the media file may have a structure which facilitates accessing media information such as user moving to a specific point in media content.

The media file according to the present invention can include an ftyp box, a moov box and/or an mdat box.

The ftyp box (file type box) can provide information related to file type or compatibility of the corresponding media file. The ftyp box can include configuration version information about media data of the media file. A decoder can identify the corresponding media file with reference to the ftyp box.

The moov box (movie box) may include metadata about the media data of the media file. The moov box can serve as a container for all pieces of metadata. The moov box may be a box at the highest level among metadata related boxes. According to an embodiment, only one moov box may be included in the media file.

The mdat box (media data box) may contain actual media data of the corresponding media file. The media data can include audio samples and/or video samples and the mdat box can serve as a container for containing such media samples.

According to an embodiment, the moov box may include an mvhd box, a trak box and/or an mvex box as lower boxes.

The mvhd box (movie header box) can include media presentation related information of media data included in the corresponding media file. That is, the mvhd box can include information such as a media generation time, change time, time standard and period of corresponding media presentation.

The trak box (track box) can provide information related to a track of corresponding media data. The trak box can include information such as stream related information about an audio track or a video track, presentation related information, and access related information. A plurality of trak boxes may be provided depending on the number of tracks.

The trak box may include a tkhd box (track header box) as a lower box according to an embodiment. The tkhd box can include information about a track indicated by the trak box. The tkhd box can include information such as a generation time, change time and track identifier of the corresponding track.

The mvex box (movie extend box) can indicate that the corresponding media file may include a moof box which will be described below. Moov boxes may need to be scanned to recognize all media samples of a specific track.

The media file according to the present invention may be divided into a plurality of fragments according to an embodiment (t18010). Accordingly, the media file can be segmented and stored or transmitted. Media data (mdat box) of the media file is divided into a plurality of fragments and each fragment can include the moof box and divided mdat boxes. According to an embodiment, information of the ftyp box and/or the moov box may be necessary to use fragments.

The moof box (movie fragment box) can provide metadata about media data of a corresponding fragment. The moof box may be a box at the highest layer among boxes related to the metadata of the corresponding fragment.

The mdat box (media data box) can include actual media data as described above. The mdat box can include media samples of media data corresponding to each fragment.

According to an embodiment, the aforementioned moof box can include an mfhd box and/or a traf box as lower boxes.

The mfhd box (movie fragment header box) can include information related to correlation of divided fragments. The mfhd box can include a sequence number to indicate the order of the media data of the corresponding fragment. In addition, it is possible to check whether there is omitted data among divided data using the mfhd box.

The traf box (track fragment box) can include information about a corresponding track fragment. The traf box can provide metadata about a divided track fragment included in the corresponding fragment. The traf box can provide metadata for decoding/reproducing media samples in the corresponding track fragment. A plurality of traf boxes may be provided depending on the number of track fragments.

According to an embodiment, the aforementioned traf box may include a tfhd box and/or a trun box as lower boxes.

The tfhd box (track fragment header box) can include header information of the corresponding track fragment. The tfhd box can provide information such as a basic sample size, period, offset and identifier for media samples of the track fragment indicated by the aforementioned traf box.

The trun box (track fragment run box) can include information related to the corresponding track fragment. The trun box can include information such as a period, size and reproduction timing of each media sample.

The aforementioned media file and fragments of the media file can be processed into segments and transmitted. Segments may include an initialization segment and/or a media segment.

A file of an embodiment t18020 shown in the figure may be a file including information related to initialization of a media decoder except media data. This file can correspond to the aforementioned initialization segment. The initialization segment can include the aforementioned ftyp box and/or the moov box.

The file of an embodiment t18030 shown in the figure may be a file including the aforementioned fragments. For example, this file can correspond to the aforementioned media segment. The media segment can include the aforementioned moof box and/or mdat box. In addition, the media segment can further include a styp box and/or an sidx box.

The styp box (segment type box) can provide information for identifying media data of a divided fragment. The styp box can perform the same role as the aforementioned ftyp box for a divided fragment. According to an embodiment, the styp box can have the same format as the ftyp box.

The sidx box (segment index box) can provide information indicating an index for a divided fragment. Accordingly, the sidx box can indicate the order of the divided fragment.

An ssix box may be further provided according to an embodiment t18040. The ssix box (sub-segment index box) can provide information indicating indexes of sub-segments when a segment is divided into the sub-segments.

Boxes in a media file may further include extended information on the basis of a box as shown in an embodiment t18050 or a full box. In this embodiment, a size field and a largesize field can indicate the length of a corresponding box in bytes. A version field can indicate the version of a corresponding box format. A type field can indicate the type or identifier of the corresponding box. A flags field can indicate flags related to the corresponding box.

FIG. 11 illustrates overall operation of a DASH based adaptive streaming model according to an embodiment of the present invention.

A DASH based adaptive streaming model according to an embodiment t50010 shown in the figure describes operations between an HTTP server and a DASH client. Here, DASH (dynamic adaptive streaming over HTTP) is a protocol for supporting HTTP based adaptive streaming and can dynamically support streaming depending on network state. Accordingly, reproduction of AV content can be seamlessly provided.

First, the DASH client can acquire an MPD. The MPD can be delivered from a service provider such as the HTTP server. The DASH client can request segments described in the MPD from the server using information for accessing the segments. The request can be performed based on a network state.

The DASH client can acquire the segments, process the segments in a media engine and display the processed segments on a screen. The DASH client can request and acquire necessary segments by reflecting a presentation time and/or a network state in real time (adaptive streaming). Accordingly, content can be seamlessly presented.

The MPD (media presentation description)) is a file including detained information used for the DASH client to dynamically acquire segments and can be represented in XML.

A DASH client controller can generate a command for requesting the MPD and/or segments on the basis of a network state. In addition, the DASH client controller can control an internal block such as the media engine to use acquired information.

An MPD parser can parse the acquired MPD in real time. Accordingly, the DASH client controller can generate a command for acquiring necessary segments.

A segment parser can parse acquired segments in real time. Internal blocks such as the media engine can perform a specific operation according to information included in the segment.

An HTTP client can request a necessary MPD and/or segments from the HTTP server. In addition, the HTTP client can deliver the MPD and/or segments acquired from the server to the MPD parser or the segment parser.

The media engine can display content on the screen using media data included in segments. Here, information of the MPD can be used.

A DASH data model may have a hierarchical structure t50020. Media presentation can be described by the MPD. The MPD can describe a time sequence of a plurality of periods which forms media presentation. A period indicates one section of media content.

In one period, data can be included in adaptation sets. An adaptation set may be a set of media content components which can be exchanged. Adaption can include a set of representations. A representation can correspond to a media content component. In one representation, content can be temporally divided into a plurality of segments for appropriate accessibility and delivery. To access each segment, the URL of each segment may be provided.

The MPD can provide information related to media presentation and a period element, an adaptation set element and a representation element can describe a corresponding period, adaptation set and representation. A representation can be divided into sub-representations, and a sub-representation element can describe a corresponding sub-representation.

Here, common attribute/elements can be defined. The common attributes/elements can be applied to (included in) sub-representations. The common attributes/elements may include an essential property and/or a supplemental property.

The essential property may be information including elements regarded as mandatory elements in processing of corresponding media presentation related data. The supplemental property may be information including elements which may be used to process corresponding media presentation related data. In an embodiment, descriptors which will be described below may be defined in the essential property and/or the supplemental property and delivered through an MPD.

FIG. 12 is a diagram for describing metadata related to 360-degree subtitles according to an embodiment of the present invention when subtitles are rendered at a fixed position on a sphere.

According to another embodiment of 360-degree video related metadata according to the present invention, the 360-degree video related metadata may further include 360-degree subtitle related metadata. The 360-degree subtitle related metadata may refer to metadata for rendering (overlaying) subtitles on a 360-degree video (or stereoscopic 360-degree video) when a VR display provides the 360-degree video.

As described above, the 360-degree video related metadata and 360-degree subtitle related metadata may be included in an additional signaling table and transmitted, may be included in a DASH MPD and transmitted or may be included in a file format such as ISOBMFF in the form of a box and delivered. When the 360-degree subtitle related metadata is included in the form of a box, the 360-degree subtitle related metadata may be included in various levels such as a file, a fragment, a track, a sample entry and a sample and may contain metadata about data of corresponding levels.

In addition, the aforementioned 360-degree video related metadata and 360-degree subtitle related metadata may be delivered in the form of an SEI message. The SEI message defined in H.264/AVC/MPEG-4 Part 10 is additional information inserted into a video stream and can include information for supporting video related use cases for various purposes. The SEI message may be video level signaling delivered together with video data in a video stream.

In addition, the above-described 360-degree video related metadata or 360-degree subtitle related metadata may be transmitted together with the corresponding data in an audio stream and/or a subtitle/closed caption stream.

When the corresponding metadata is transferred in the audio stream, the corresponding metadata may be included in a data type table, a content kind table, or a preset kind table according to an embodiment. Herein, the data type table may be a table referenced to describe the characteristics of the object. The content kind table may be a table indicating the characteristics of an element. The preset kind table may be a table that provides preset relevant information. The information of the metadata that has been described above and will be described later may be respectively defined in the corresponding table.

When the metadata is delivered in the subtitle stream or the closed caption stream, the metadata may be added transmitted as metadata in the case of packetizing the closed caption stream of the TTML instead of the inside of the TTML.

The aforementioned metadata processor of the 360-degree video transmission device according to one aspect of the present invention can generate the SEI message including the aforementioned 360-degree subtitle related metadata. The 360-degree subtitle related metadata may be realized in various embodiments as will be described below. In addition, the aforementioned data encoder can insert the SEI message having the 360-degree subtitle related metadata according to various embodiments into a video stream. Accordingly, the SEI message having the 360-degree subtitle related metadata can be delivered to a receiving side together with 360-degree video data.

The aforementioned data decoder of the 360-degree video reception device according to one aspect of the present invention can extract the SEI message having the 360-degree subtitle related metadata from the video stream. In addition, the metadata parser can parse the SEI message to acquire the 360-degree subtitle related metadata. The 360-degree subtitle related metadata can be delivered to the renderer and used to provide subtitles for the 360-degree video.

Furthermore, the aforementioned 360-degree video related metadata and 360-degree subtitle related metadata may be included in signaling information such as an MMT, a PSI and DVB SI and delivered.

According to one embodiment of the present invention, the subtitles for the 360-degree video can be rendered at a fixed position on a 3D sphere. Here, the 3D sphere may be called 360-degree space and is assumed to be a sphere in the specification. Here, a position at which subtitles are rendered may be called a subtitle region. The subtitle region may be different from the aforementioned region.

In the present embodiment, the 360-degree subtitle related metadata can signal a subtitle region at a fixed position on the sphere. Since a viewport is not considered in the present embodiment, only part of subtitles or no subtitles may be viewed when a viewport which is viewed by a user changes.

The 360-degree subtitle related metadata can signal the subtitle region at a fixed position on the sphere through various methods. The 360-degree subtitle related metadata may designate ($\phi$, $\theta$) to indicate several points on the sphere and specify the subtitle region using the same. Here, $\phi$ can indicate a pitch angle and $\theta$ can refer to a yaw angle.

According to an embodiment, the 360-degree subtitle related metadata may specify the subtitle region by indicating the top-left point and the bottom-right point of the subtitle region (t12010). The 360-degree subtitle related metadata can signal the top-left point and the bottom-right point of the subtitle region as ($\phi_{Top-left}$, $\theta_{Top-left}$) and ($\phi_{Bottom-right}$, $\theta_{Bottom-right}$). The subtitle region having the two signaled points as the top-left point and the bottom-right point can be specified.

According to another embodiment, the 360-degree subtitle related metadata may specify the subtitle region by indicating a start point and an end point for rendering the subtitle region (t12020). Here, when a region which starts from the start point and ends at the end point is rendered, the region can be the subtitle region. The subtitle region can be specified as a region having an angular point as the start point and another angular point diagonally located from the angular point as the end point. The 360-degree subtitle related metadata may signal the start point and the end point as ($\phi_{start}$, $\theta_{start}$) and ($\phi_{end}$, $\theta_{end}$). Here, since the region is rendered on the sphere, a center point may need to be additionally signaled in order to specify a rendering direction. In this case, the 360-degree subtitle related metadata may further indicate a center point ($\phi_{middle}$, $\theta_{middle}$).

According to another embodiment, the 360-degree subtitle related metadata may specify the subtitle region using subtitle related information in TTML (t12030). In this case, the 360-degree subtitle related metadata can indicate only the top-left point ($\phi_{Top-left}$, $\theta_{Top-left}$). The subtitle region can be specified using only subtitle related information in the TTML and the indicated top-left point. The subtitle region related information in the TTML can indicate the width and height of a root container, such as tts:extent.

According to another embodiment, the 360-degree subtitle related metadata may specify the subtitle region using the subtitle related information in TTML in a two-dimensional space. The 360-degree subtitle related metadata can indicate the start point and the top-left point on the 3D sphere, as described above. The points may be mapped to a 2D image and represented as specific points on the 2D image. The subtitle region can be specified on the 2D image using the subtitle related information in the TTML, for example, width and height on the basis of the points.

According to another embodiment, the 360-degree subtitle related metadata may specify the subtitle region on a 2D image instead of the 3D sphere by mapping ($\phi$, $\theta$) on the 3D sphere given in the aforementioned embodiments to the 2D image (t12040). u and v coordinates on the 2D image can be calculated according to the shown expression (t12040).

For reference, t12050 shown in the figure can indicate a method of defining the shape of a subtitle region. The left part illustrates a 4 great circle method which specifies the shape of a subtitle region using four great circles having the same diameter as the sphere. The right part illustrates a 2 great circle/2 small circle method which specifies the shape of a subtitle region using two great circles having the same diameter as the sphere and two small circles having diameters decreasing along the latitude face of the sphere. Using this concept, the 360-degree subtitle related metadata can signal the shape of the subtitle region. When the 360-degree video is provided in 3D, disparity information on the 360-degree video may be signaled. The disparity information may be interpreted differently depending on the shape of the subtitle area. That is, according to the shape of the subtitle area, additional information about where the disparity reference point is may be further signaled. Details will be described later. Details will be described below.

FIG. 13 shows 360-degree subtitle related metadata according to an embodiment of the present invention represented in the form of a supplemental enhancement information (SEI) message when subtitles are rendered at a fixed position on a sphere.

The shown SEI message may include 360-degree subtitle related metadata which signals a subtitle region at a fixed position on the sphere as described above. The SEI message may be referred to as subtitle_overlay_info_1( ). The aforementioned 360-degree subtitle related metadata which signals a subtitle region at a fixed position may be represented in the form of a box, a DASH descriptor and various signaling tables in addition to the shown SEI message.

The SEI message according to the present embodiment may include a cancel_subtitle_overlay_info_1_flag field, a cancel_flag field, a cancel_region_id field, a subtitle_region_info_flag field, a shape_type field, a subtitle_id field, a region_id field, a theta_value_for_point_1 field, a phi_value_for_point_1 field, a theta_value_for_point_2 field, a phi_value_for_point_2 field and/or a timed_text( ) field.

The cancel_subtitle_overlay_info_1_flag field can be set to 1 when the SEI message is not used and set to 0 when the information of the SEI message is needed. Here, when this field is set to 1, all previous subtitle_overlay_info1( ) which are consecutive in output order can be canceled The cancel_flag field can signal whether subtitle_overlay_info_1( ) corresponding to a specific subtitle region is canceled. When this field is 1, subtitle_overlay_info_1( ) which has a region_id field having the same value as a cancel_region_id field value among previous subtitle_overlay_info_1( ) on the basis of output order can be canceled. The canceled subtitle_overlay_info_1( ) may be no more used.

The cancel_region_id field can identify a specific subtitle region to be canceled. subtitle_overlay_info_1( ) having a region_id having the same value as this field may be canceled and no longer used.

The subtitle_region_info_flag field can indicate whether information about a new subtitle field is included in the SEI message. According to an embodiment, the SEI message may deliver text of subtitles.

The shape_type field can signal the shape of a subtitle region. This field can signal a 4-great-circle shape when set to 0 and signal a 2-great-circle/2-small-circle shape when set to 1. The shapes have been described above.

The subtitle_id field can indicate the ID of corresponding subtitles. According to an embodiment, when one subtitle is rendered in one subtitle region, the region_id field can serve as the ID of the subtitle instead of the subtitle_id field. According to an embodiment, when one subtitle is rendered in a plurality of subtitle regions, the subtitle_id field can be used as the ID of the subtitle.

The region_id field can indicate the ID of a subtitle region in which subtitles are rendered. One subtitle may be rendered in a plurality of subtitle regions. The region_id field can be used to identify each subtitle region. According to an embodiment, the SEI message may signal the number of subtitle regions in which corresponding subtitles are rendered and specify the subtitle regions. This will be described below.

The theta_value_for_point_1 field and the phi_value_for_point_1 field can indicate one point on the sphere. These fields can indicate theta and phi values to specify a point defined by (theta, phi). This point can indicate the top-left point or the start point of a subtitle region according to the above-described embodiment.

The theta_value_for_point_2 field and the phi_value_for_point_2 field can indicate another point on the sphere. Similarly, these fields can indicate theta and phi values to specify a point defined by (theta, phi). This point can indicate the bottom-right point or the end point of a subtitle region according to the above-described embodiment. In an embodiment, the SEI message may further include a theta_value_for_point_3 field and a phi_value_for_point_3 field which indicate a middle point.

According to an embodiment, the SEI message may include pitch and yaw values, a horizontal field of view value and a vertical field of view value of the center point of a subtitle region instead of the theta_value_for_point_1 field, phi_value_for_point_1 field, theta_value_for_point_2 field, and phi_value_for_point_2 field to specify the subtitle region. This will be described below.

The timed_text( ) field can include text of subtitles rendered in the corresponding subtitle region. According to an embodiment, the SEI message may include an including_text_flag field to signal whether text of actual subtitles is included in the SEI message. When the SEI message includes text information of the subtitles, the including_text_flag field can be set to 1. When a bitmap based subtitle file is separately delivered, the including_text_flag field can be set to 0. According to an embodiment, the SEI message may further include a version_number field of subtitles when the text file of the subtitles is excessively large and thus is divided and delivered. The version_number field can increase in ascending order among SEI messages.

The aforementioned fields may be replaced by other fields or omitted. In addition, the SEI message may further include additional fields according to embodiments.

Furthermore, 360-degree subtitle related metadata of SEI messages defined in the present invention may be combined to configure a new SEI message. In this case, as many SEI messages as the number of combinations can be defined and the SEI messages are within the scope of the present invention.

FIG. 14 shows 360-degree subtitle related metadata according to another embodiment of the present invention represented in the form of an SEI message when subtitles are rendered at a fixed position on a sphere.

The shown SEI message may include 360-degree subtitle related metadata which signals a subtitle region at a fixed position on the sphere as described above. This SEI message may be referred to as subtitle_overlay_info_1_1( ). The SEI message according to the present embodiment can provide signaling information for rendering one subtitle in a plurality of fixed subtitle regions. According to the embodiment, the SEI message may be extended to provide signaling information for rendering N subtitles in M subtitle regions (M>N).

The SEI message according to the present embodiment may have a form extended to render one subtitle in a plurality of fixed subtitle regions.

A subtitle_id field can indicate the ID of a subtitle. When one subtitle is rendered in a plurality of subtitle regions, the subtitle_id field can be used as the ID of the subtitle.

The num_of_rendering_positions field can signal the number of positions at which one subtitle is simultaneously rendered on the sphere. That is, this field can indicate the number of subtitle regions in which the corresponding subtitle is rendered. Detailed information about the subtitle regions can be provided depending on the number of subtitle regions indicated by this field.

The rendering_position_id field can indicate the ID of a corresponding subtitle region. This field can indicate the ID of a corresponding subtitle region among the plurality of subtitle regions in which the subtitle is rendered. A plurality of subtitle region IDs may be allocated per subtitle ID. Alternatively, signaling may be extended such that N subtitle IDs are mapped to M subtitle region IDs as described above.

A theta_value_for_point_1 field, a phi_value_for_point_1 field, a theta_value_for_point_2 field and/or a phi_value_for_point_2 field can provide information for specifying a corresponding subtitle region. A detailed method of specifying a subtitle region has been described above.

The remaining fields can perform the same roles as the fields having the same names included in the SEI message according to the above-described embodiment.

FIG. 15 illustrates delivery of a SubtitleOverlayConfigBoxA class and 360-degree subtitle related metadata defined as the class in RegionOnSphereSampleEntry or RegionOnSphereSample( ).

As described above, the 360-degree subtitle related metadata may be configured in a form included in a file format based on ISOBMFF. Particularly, when subtitles are rendered at a fixed position on a sphere as described above, the 360-degree subtitle related metadata may take a box form defined as the SubtitleOverlayConfigBoxA class. In this case, signaling fields may be included in this box according to embodiments.

When 360-degree video data is stored and transmitted on the basis of a file format such as ISOBMFF or a common file format (CFF), 360-degree subtitle related metadata defined as the SubtitleOverlayConfigBoxA class can be included in each box of the ISOBMFF. The same applies to 360-degree subtitle related metadata defined as SubtitleOverlayConfigBoxB and SubtitleOverlayConfigBoxP classes which will be described below. In this manner, 360-degree subtitle related metadata can be stored and signaled along with 360-degree video data.

As described above, 360-degree subtitle related metadata defined as the SubtitleOverlayConfigBoxA, SubtitleOverlayConfigBoxB and SubtitleOverlayConfigBoxP classes can be included in various levels such as a file, a fragment, a track, a sample entry and a sample and delivered, and provide metadata about data of a corresponding level (a track, a stream, a sample group, a sample, a sample entry, etc.).

360-degree subtitle related metadata in the form of SubtitleOverlayConfigBoxA box can be included in a sample entry, that is, RegionOnSphereSampleEntry of a file format (t15010). The 360-degree subtitle related metadata included in the sample entry may be subtitle related metadata equally applied to samples in one video stream.

The fields in the box can perform the same roles as the corresponding fields of the aforementioned 360-degree subtitle related metadata in the form of an SEI message. Here, to set a representative value in the sample entry, the box may include a dynamic_flag field, a min_theta_value field, a min_phi_value field, a max_theta_value field and/or a max_phi_value field.

When the dynamic_flag field is set to 1, the min_theta_value field, the min_phi_value field, the max_theta_value field and/or the max_phi_value field can be included in the corresponding box. The min_theta_value field, the min_phi_value field, the max_theta_value field and/or the max_phi_value field can indicate the ranges of maximum/minimum values of theta and phi values defined in corresponding samples.

That is, the min_theta_value field, the min_phi_value field, the max_theta_value field and/or the max_phi_value field can respectively indicate a minimum theta value, a minimum phi value, a maximum theta value and a maximum phi value of samples.

Here, when one subtitle is rendered in only one subtitle region, the num_of_rendering_postions can be omitted or set to 1.

According to the embodiment, the 360-degree subtitle related metadata in the form of SubtitleOverlayConfigBoxA box may be included in Sample of the file format, that is, RegionOnSphereSample( ) (t15020). The 360-degree subtitle related metadata included in Sample may be subtitle related metadata applied to one sample. That is, 360-degree subtitle related metadata may be changed per sample. The fields in the corresponding box can perform the same roles as corresponding fields in the aforementioned 360-degree subtitle related metadata in the form of an SEI message.

Here, when one subtitle is rendered in only one subtitle region, the subtitle_id field may be replaced by the region_id field. Further, when one subtitle is rendered in only one subtitle region, the num_of_rendering_postions field may be omitted or set to 1.

A range to which the 360-degree subtitle related metadata is applied may change depending on the position of the box including the 360-degree subtitle related metadata. That is, 360-degree subtitle related metadata included in Sample Entry may be subtitle related metadata equally applied to samples in one video stream. 360-degree subtitle related metadata included in Sample may be subtitle related metadata applied to one sample.

FIG. 16 shows 360-degree subtitle related metadata according to an embodiment represented in the form of a DASH based descriptor when subtitles are rendered at a fixed position on a sphere.

The 360-degree subtitle related metadata of the above-described embodiments may be re-described in the form of a DASH based descriptor. When 360-degree video data is delivered according to DASH, 360-degree subtitle related metadata may be described in the form of a DASH descriptor, included in an MPD and delivered to a receiving side. Such descriptors may be delivered in the form of an essential property descriptor and/or a supplemental property descriptor. These descriptors may be included in the Period, Adaptation Set, Representation, Sub-representation, Content-Component, SegmentBase, EssentialProperty, SupplementaryProperty, Accessibility and Subset of the MPD and delivered.

As described above, meanings of values of theta_value_for_point_1, phi_value_for_point_1, theta_value_for_point_2 and phi_value_for_point_2 may change depending on where the corresponding descriptor is included. For example, when the descriptor is included in Segment, the fields can indicate the start point and the end point for specifying a subtitle region of a picture in the corresponding segment. If the descriptor is included in Representation, the fields can indicate the start point and the end point for specifying a subtitle region of a picture in a segment belonging to the corresponding representation. When the descriptor is included in AdaptaionSet, the fields can indicate the start point and the end point for specifying a subtitle region of a picture of a segment included in a representation while belonging to the corresponding AdaptationSet.

The DASH based descriptor can include @schemeIdUri, @value and/or @id fields. The @schemeIdUri field can provide a URI for identifying the scheme of the corresponding descriptor. The @value field can have values meanings of which are defined by the scheme indicated by the @schemeIdUri field. That is, the @value field can have values of descriptor elements according to the corresponding scheme, which can be called parameters. The parameters can be discriminated by ",". The @id field can indicate the ID of the corresponding descriptor. When descriptors have the same ID, they can include the same scheme ID, values and parameters.

Particularly, in the case of a descriptor which delivers 360-degree subtitle related metadata for signaling a subtitle region at a fixed position, as described above, the @schemeIdURI field can have a value of urn:mpeg:dash:subtitle:overlay1:201x. This may be a value identifying the corresponding descriptor as a descriptor delivering the 360-degree subtitle related metadata according to the above-described embodiment.

The @value field of this descriptor may have values of the shown embodiment. That is, parameters of @value which are discriminated by "," may correspond to fields of the aforementioned 360-degree subtitle related metadata. Although one of the above-described various embodiments of the 360-degree subtitle related metadata is described as parameters of @value in the shown embodiment, all the aforementioned embodiments of the 360-degree subtitle related metadata can be described as parameters of @value by replacing the signaling fields with the parameters. That is, the 360-degree subtitle related metadata according to all the above-described embodiments may be described in the form of a DASH based descriptor.

In the shown embodiment, each parameter can have the same meaning as the aforementioned signaling field having the same name. Here, M indicates that the corresponding parameter is mandatory, O indicates that the corresponding parameter is optional, and OD indicates that the corresponding parameter is optional and has a default value. When an OD parameter is not given, a predefined default value may be used as the parameter. In the shown embodiment, default values of OD parameters are shown in parentheses.

Similarly to the aforementioned case of the SEI message, the descriptor may further include a parameter for signaling a center point when the start point/end point is signaled. In addition, the descriptor may specify a subtitle region by including pitch and yaw values, a value of horizontal field of view and a value of vertical field of view of the center point of the subtitle region instead of signaling the start point/center point/end point or the top-left point/bottom-right point.

FIG. 17 is a diagram for illustrating 360-degree subtitle related metadata according to an embodiment of the present invention when subtitles are rendered at a position varying according to viewports.

According to one embodiment of the present invention, subtitles for 360-degree video may be rendered at a position varying according to viewports. In the present embodiment, the 360-degree subtitle related metadata can specify a subtitle region at a relative position of a viewport on the basis of the viewport. The viewport can refer to a region currently viewed by a user in 360-degree video as described above. For example, a subtitle region can be specified as a specific region in a viewport instead of a fixed position on a 3D sphere. Accordingly, a phenomenon that only part of subtitles or no subtitles are viewed may not occur even if the viewport is changed.

The 360-degree subtitle related metadata according to the present embodiment can specify a subtitle region by indicating the center point and a field of view (FOV) value of the subtitle region. Here, the 360-degree subtitle related metadata can indicate an offset value with respect to the center point of the viewport as the center point of the subtitle region. Accordingly, the 360-degree subtitle related metadata can specify the subtitle region at a relative position with respect to the viewport.

Specifically, the 360-degree subtitle related metadata can indicate the center of the subtitle region by designating yaw, pitch and roll offset values of the center point of the subtitle region with respect to the center point of the viewport. That is, the 360-degree subtitle related metadata can indicate a yaw center offset value of the subtitle region based on the yaw center of the current viewport, a pitch center offset value of the subtitle region based on the pitch center of the current viewport, and a roll center offset value of the subtitle region based on the roll center of the current viewport.

In addition, the 360-degree subtitle related metadata can indicate a horizontal FOV and/or a vertical FOV. Here, the horizontal FOV and the vertical FOV can indicate values of a horizontal range and a vertical range of the subtitle region from the indicated center point of the subtitle region. The horizontal range may be called a yaw range when the roll axis is not deviated. The vertical range may be called a pitch range when the roll axis is not deviated.

The subtitle region can be specified using the center point and the horizontal/vertical FOVs indicated by the 360-degree subtitle related metadata.

FIG. 18 shows the 360-degree subtitle related metadata according to an embodiment of the present invention represented in the form of an SEI message when subtitles are rendered at a position varying according to viewports.

SEI messages t18010 and t18020 shown in the figure may be SEI messages including 360-degree subtitle related metadata for signaling a subtitle region at a position varying according to viewports, as described above. The SEI messages may be called subtitle_overlay_info_2( ) and subtitle_overlay_info_2_1( ). The aforementioned 360-degree subtitle related metadata for signaling a subtitle region at a position varying according to viewports may be represented in the form of a box, a DASH descriptor and various signaling tables in addition to the SEI message.

In the SEI message t18010 according to the present embodiment, cancel_subtitle_overlay_info_2_flag, cancel_flag, cancel_region_id, subtitle_region_info_flag, shape_type, subtitle_id, region_id and timed_text( ) fields may have the same meanings as the aforementioned cancel_subtitle_overlay_info__1_flag, cancel_flag, cancel_region_id, subtitle_region_info_flag, shape_type, subtitle_id, region_id and timed_text( ) fields.

A yaw_pitch_roll_center_range_value_types field can indicate types of center point offset values of yaw, pitch and roll provided by the SEI message. That is, this field can indicate types in which yaw, pitch and roll offset values of the SEI message indicate the center of the subtitle region.

When this field is set to 0, the yaw, pitch and roll offset values of the SEI message can indicate an offset between the center point of the subtitle region and a viewport, as described above. When this field is 1, the yaw, pitch and roll offset values of the SEI message can indicate the percentage (ratio) of an area occupied by the subtitle region in the viewport. When this field is set to 2, the yaw, pitch and roll offset values of the SEI message can indicate an offset of the center point of the current subtitle region on the basis of the center of a subtitle region indicated by a previous SEI message.

A yaw_center_offset_for_subtitle_rendering_region field, a pitch_center_offset_for_subtitle_rendering_region field and/or a roll_center_offset_for_subtitle_rendering_region field can respectively indicate yaw, pitch and roll offset values of the subtitle region on the basis of the current viewport. The fields are center point offset values of yaw, pitch and roll provided by the aforementioned SEI message and may have different meanings depending on the value of the aforementioned yaw_pitch_roll_center_range_value_types field.

A horizontal_range_for_subtitle_rendering_region field can indicate a horizontal FOV, that is, a horizontal range on the basis of the center point of the subtitle region.

A vertical_range_for_subtitle_rendering_region field can indicate a vertical FOV, that is, a vertical range on the basis of the center point of the subtitle region.

The SEI message t18020 according to the present embodiment may be an extended form of the SEI message t18010. The SEI message t18020 according to the present embodiment may be an extended form for the purpose of rendering the same subtitles in a plurality of regions on a single viewport. This SEI message may be extended to provide signaling information for rendering N subtitles in M (M>N) subtitle regions varying according to viewports in an embodiment.

A num_of_rendering_positions field can signal the number of positions at which one subtitle is rendered. That is, this field can indicate the number of subtitle regions in which the corresponding subtitle is rendered. Detailed information about each subtitle region can be provided depending on the number of subtitle regions indicated by this field.

A rendering_position_id field can indicate the ID of a corresponding subtitle region. This field can indicate the ID of a corresponding subtitle region among a plurality of subtitle regions in which the corresponding subtitle is rendered. A plurality of subtitle region IDs may be allocated per subtitle ID. In addition, signaling may be extended such that N subtitle IDs are mapped to M subtitle region IDs as described above.

yaw_center_offset_for_subtitle_rendering_region, pitch_center_offset_for_subtitle_rendering_region, roll_center_offset_for_subtitle_rendering_region, horizontal_range_for_subtitle_rendering_region and/or vertical_range_for_subtitle_rendering_region fields can provide information for specifying a corresponding subtitle region. A specific method for specifying a corresponding subtitle region has been described above.

The position of a timed_text( ) field in the SEI message may change depending on a text information configuration form of the corresponding subtitle. For example, when the same subtitles are rendered in subtitle regions, the timed_text( ) field can be positioned outside a "for" sentence according to the num_of_rendering_positions field. Furthermore, when different subtitles are rendered in respective subtitle regions, for example, the timed_text( ) field can be positioned inside of the "for" sentence according to the num_of_rendering_positions field.

The remaining fields can perform the same roles as the fields in the same names in the SEI message according to the above-described embodiment.

An SEI message according to an embodiment which is not shown may further include a video_roi_flag field. The video_roi_flag field may be a flag indicating whether the aforementioned yaw_center_offset_for_subtitle_rendering_region, pitch_center_offset_for_subtitle_rendering_region and/or roll_center_offset_for_subtitle_rendering_region fields for specifying a subtitle region are offset information based on ROI. When this field is 1, the field can indicate an offset value from an ROI center point instead of an offset from the viewport center point. In the present embodiment, the remaining fields, for example, vertical/horizontal FOV related fields may be the same as the fields of the aforementioned SEI message.

FIG. 19 shows 360-degree subtitle related metadata according to another embodiment of the present invention represented in the form of an SEI message when subtitles are rendered at a fixed position on a sphere.

The shown SEI message may be one of the aforementioned SEI messages including 360-degree subtitle related metadata for signaling a subtitle region at a fixed position on a sphere. In the shown embodiment, the SEI message can signal a subtitle region at a fixed position on the sphere. In the present embodiment, the SEI message can specify a subtitle region by signaling the center point and vertical/horizontal FOV values of the subtitle region. In the present embodiment, the SEI message can indicate the center point of the subtitle region using yaw, pitch and roll values and indicate vertical/horizontal ranges based on the center point of the subtitle region. In the present embodiment, yaw, pitch and roll values are not offset values but may be values indicating a fixed point on the sphere.

The SEI message according to the present embodiment may be an extended form for rendering one subtitle in a plurality of subtitle regions. The SEI message according to the present embodiment can provide signaling information for rendering one subtitle in a plurality of fixed subtitle regions. According to an embodiment, the SEI message may be extended to provide signaling information for rendering N subtitles in M subtitle regions (M>N).

A num_of_rendering_positions field can signal the number of positions at which one subtitle is simultaneously rendered on the sphere. That is, this field can indicate the number of subtitle regions in which one subtitle is rendered. Detailed information about each subtitle region can be provided depending on the number of subtitle regions indicted by this field.

A rendering_position_id field can indicate the ID of a corresponding subtitle region. This field can indicate the ID of a corresponding subtitle region among a plurality of subtitle regions in which the corresponding subtitle is rendered. A plurality of subtitle region IDs may be allocated per subtitle ID. In addition, signaling may be extended such that N subtitle IDs are mapped to M subtitle region IDs as described above.

The yaw_center_offset_for_subtitle_rendering_region field, pitch_center_offset_for_subtitle_rendering_region field and/or the roll_center_offset_for_subtitle_rendering_region fields can indicate the center point of the subtitle region fixed on the sphere.

The horizontal_range_for_subtitle_rendering_region field and/or the vertical_range_for_subtitle_rendering_region field can indicate horizontal/vertical ranges based on the center point of the fixed subtitle region indicated by the aforementioned fields.

Each subtitle region can be specified using the indicated center point and horizontal/vertical ranges of the subtitle region. As described above, the position of the time_text( ) field can be changed in the SEI message depending on a text information configuration form of the corresponding subtitles.

The remaining fields can perform the same roles as the fields in the same names in the SEI message according to the above-described embodiment.

FIG. 20 illustrates delivery of a SubtitleOverlayConfigBoxB class and 360-degree subtitle related metadata defined as the class in RegionOnSphereSampleEntry or RegionOnSphereSample( ).

As described above, the 360-degree subtitle related metadata may be configured in a form included in a file format based on ISOBMFF. Particularly, when subtitles are rendered at a position varying according to viewports as described above, the 360-degree subtitle related metadata may take a box form defined as the SubtitleOverlayConfigBoxB class. In this case, signaling fields may be included in this box according to embodiments.

360-degree subtitle related metadata in the form of SubtitleOverlayConfigBoxB box can be included in a sample entry, that is, RegionOnSphereSampleEntry of a file format (t20010). The 360-degree subtitle related metadata included in the sample entry may be subtitle related metadata equally applied to samples in one video stream.

The fields in the box can perform the same roles as the corresponding fields of the aforementioned 360-degree subtitle related metadata in the form of an SEI message. Here, to set a representative value in the sample entry, the box may additionally include a dynamic_flag field, a yaw_center_offset_for_representative_value field, a pitch_center_offset_for_representative_value field, a roll_center_offset_for_representative_value field and/or a horizontal_range_for_representative_value field.

When the dynamic_flag field is 1, the yaw_center_offset_for_representative_value field, the pitch_center_offset_for_representative_value field, the roll_center_offset_for_representative_value field and/or the horizontal_range_for_representative_value field can be included in the box.

The yaw_center_offset_for_representative_value field, the pitch_center_offset_for_representative_value field, the roll_center_offset_for_representative_value field and/or the horizontal_range_for_representative_value field can respectively indicate yaw center, pitch center, roll center and horizontal/vertical range values for signaling a range including all subtitle regions defined in the corresponding sample entry.

Here, when one subtitle is rendered in only one subtitle region, the num_of_rendering_postions field can be omitted or set to 1.

According to the embodiment, the 360-degree subtitle related metadata in the form of SubtitleOverlayConfigBoxB box may be included in Sample of the file format, that is, RegionOnSphereSample( ) (t20020). The 360-degree subtitle related metadata included in Sample may be subtitle related metadata applied to one sample. That is, 360-degree subtitle related metadata may change for samples. The fields in the corresponding box can perform the same roles as corresponding fields in the aforementioned 360-degree subtitle related metadata in the form of an SEI message.

Here, when one subtitle is rendered in only one subtitle region, the subtitle_id field may be replaced by the region_id field. Further, when one subtitle is rendered in only one subtitle region, the num_of_rendering_postions field may be omitted or set to 1.

A range to which the 360-degree subtitle related metadata is applied may change depending on the position of the box including the 360-degree subtitle related metadata. That is, 360-degree subtitle related metadata included in Sample Entry may be subtitle related metadata equally applied to samples in one video stream. 360-degree subtitle related metadata included in Sample may be subtitle related metadata applied to one sample.

FIG. 21 illustrates delivery of a SubtitleOverlayConfigBoxP class and 360-degree subtitle related metadata defined as the class in RegionOnSphereSampleEntry or RegionOnSphereSample( ).

As described above, the 360-degree subtitle related metadata may be configured in a form included in a file format based on ISOBMFF. Particularly, when subtitles are rendered at a fixed position on a sphere as described above, the 360-degree subtitle related metadata which specifies a subtitle region using pitch, yaw and roll may take a box form defined as the SubtitleOverlayConfigBoxP class. In this case, signaling fields may be included in this box according to embodiments.

360-degree subtitle related metadata in the form of SubtitleOverlayConfigBoxP box can be included in a sample entry, that is, RegionOnSphereSampleEntry of a file format (t21010). The 360-degree subtitle related metadata included in the sample entry may be subtitle related metadata equally applied to samples in one video stream.

The fields in the box can perform the same roles as the corresponding fields of the aforementioned 360-degree subtitle related metadata in the form of an SEI message. Here, to set a representative value in the sample entry, the box may additionally include a dynamic_flag field, a yaw_center_offset_for_representative_value field, a pitch_center_offset_for_representative_value field, a roll_center_offset_for_representative_value field and/or a horizontal_range_for_representative_value field.

The dynamic_flag field, the yaw_center_offset_for_representative_value field, the pitch_center_offset_for_representative_value field, the roll_center_offset_for_representative_value field and/or the horizontal_range_for_representative_value field can be included in the box and may have the same meanings as the aforementioned fields of the SubtitleOverlayConfigBoxB box.

Here, when one subtitle is rendered in only one subtitle region, the num_of_rendering_postions field can be omitted or set to 1.

According to the embodiment, the 360-degree subtitle related metadata in the form of SubtitleOverlayConfigBoxP box may be included in Sample of the file format, that is, RegionOnSphereSample( ) (t21020). The 360-degree subtitle related metadata included in Sample may be subtitle related metadata applied to one sample. That is, 360-degree subtitle related metadata may change for samples. The fields in the corresponding box can perform the same roles as corresponding fields in the aforementioned 360-degree subtitle related metadata in the form of an SEI message.

Here, when one subtitle is rendered in only one subtitle region, the subtitle_id field may be replaced by the region_id field. Further, when one subtitle is rendered in only one subtitle region, the num_of_rendering_postions field may be omitted or set to 1.

A range to which the 360-degree subtitle related metadata is applied may change depending on the position of the box including the 360-degree subtitle related metadata. That is, 360-degree subtitle related metadata included in Sample Entry may be subtitle related metadata equally applied to samples in one video stream. 360-degree subtitle related metadata included in Sample may be subtitle related metadata applied to one sample.

FIG. 22 shows 360-degree subtitle related metadata according to another embodiment of the present invention which is represented in the form of a DASH based descriptor.

The 360-degree subtitle related metadata according to the above-described embodiments may be re-described in the form of a DASH based descriptor. The above description can be equally applied to the DASH based descriptor.

As described above, meanings of the values of the yaw_center_offset_for_subtitle_rendering_region field, the pitch_center_offset_for_subtitle_rendering_region field, the roll_center_offset_for_subtitle_rendering_region field, the horizontal_range_for_subtitle_rendering_region field and/or the vertical_range_for_subtitle_rendering_region field may change according to where the corresponding descriptor is included. For example, when the descriptor is included in a segment, the fields can indicate a subtitle region center point and vertical/horizontal ranges for specifying a subtitle region of a picture in the corresponding segment. When the descriptor is included in a representation, the fields can indicate a subtitle region center point and vertical/horizontal ranges for specifying a subtitle region of a picture in a segment belonging to the corresponding representation. Further, when the descriptor is included in an AdaptationSet, the fields can indicate a subtitle region center point and vertical/horizontal ranges for specifying a subtitle region of a picture of a segment included in a representation while belonging to the corresponding AdaptationSet.

As described above, in the case of a descriptor which delivers 360-degree subtitle related metadata for rendering subtitles at a position varying according to viewports or 360-degree subtitle related metadata for specifying a subtitle region at a fixed position using pitch, yaw and roll, the @schemeIdURI field can have a value of urn:mpeg:dash:subtitle:overlay2:201x. This may be a value identifying the descriptor as a descriptor for delivering 360-degree subtitle related metadata according to the above-described embodiment.

The @value field of this descriptor may have values of the shown embodiment. That is, parameters of @value which are discriminated by "," may correspond to fields of the aforementioned 360-degree subtitle related metadata. In the shown embodiment, the parameters may have the same meanings as the aforementioned signaling fields having the same names. That is, the 360-degree subtitle related metadata according to all of the above-described embodiments may be described in the form of a DASH based descriptor.

The shown descriptor has parameters for the 360-degree subtitle related metadata for rendering subtitles at a position varying according to viewports and parameters for the 360-degree subtitle related metadata for specifying a subtitle region at a fixed position using pitch, yaw and roll. According to an embodiment, the descriptor may have only the parameters for only one of the 360-degree subtitle related metadata.

FIG. 23 is a diagram for describing 360-degree subtitle related metadata according to an embodiment of the present invention when subtitles are rendered on the basis of an actual display screen.

According to one embodiment of the present invention, subtitles for 360-degree video may be rendered on the basis of an actual display screen. That is, the 360-degree subtitle related metadata according to the present embodiment can specify a subtitle region on the basis of a display on which subtitles are finally rendered (similar to OSD). In the present embodiment, the 360-degree subtitle related metadata can newly define a window which is a root container region for 360-degree video data and indicates absolute coordinates/relative coordinates on the basis of the defined window to specify a subtitle region. In this process, safe crop area related information can be additionally used.

In the conventional TTML, the root container region refers to the entire image. However, the concept of viewport is present in a VR environment providing 360-degree video, and thus it is necessary to define a new root container region. That is, a root container region newly defined on the basis of a viewport for 360-degree video can be called a window. The window may be referred to as an aspect radio, a resolution, a coordinate space and the like. The window may also be called a viewport based root container region.

In addition, in the conventional TTML, an image may be cropped due to a difference between the aspect ratio of video and the aspect ratio of a display device. Here, subtitles may also be cropped. To prevent this, an area that is not cropped, that is, a safe crop area can be defined and signaled. The safe crop area can be defined on the basis of the root container region of the conventional TTML. Accordingly, in the case of a 360-degree video environment, a new safe crop area in which subtitles can be safely displayed can also be calculated according to the newly defined window. This new safe crop area can be calculated through information in the TTML.

The root container region and the safe crop area in the conventional TTML are shown in the figure. The entire video image indicated by the solid line corresponds to the root container region and an area indicated by the dotted line is defined as the safe crop area (the center of the upper part). A presentation system can display the corresponding content. For example, the content can be presented on a 4:3 display.

Here, when the content is presented on the display with the safe crop area ignored (left of the lower part), the root container region can be presented with a central 4:3 portion thereof cropped. When the content is presented on the display in consideration of the safe crop area (right of the lower part), the root container region can be scaled to be adapted to a central 14:9 portion thereof and presented. Here, a black bar may be generated.

In a VR environment, the newly defined window may have different values from a displayed viewport. In this case, the newly defined window can be scaled up/down or cropped and thus the size thereof can be controlled. During a scale up/down and cropping process, information about the safe crop area in the TTML is used and thus the safe crop area can be considered. For reference, an active area is information about the smallest area to be viewed by a user.

Accordingly, the 360-degree subtitle related metadata according to the present embodiment can specify a window for 360-degree video data and specify a subtitle region on the basis of the signaled window. In this process, safe crop area related information can be additionally used.

Figure 24:
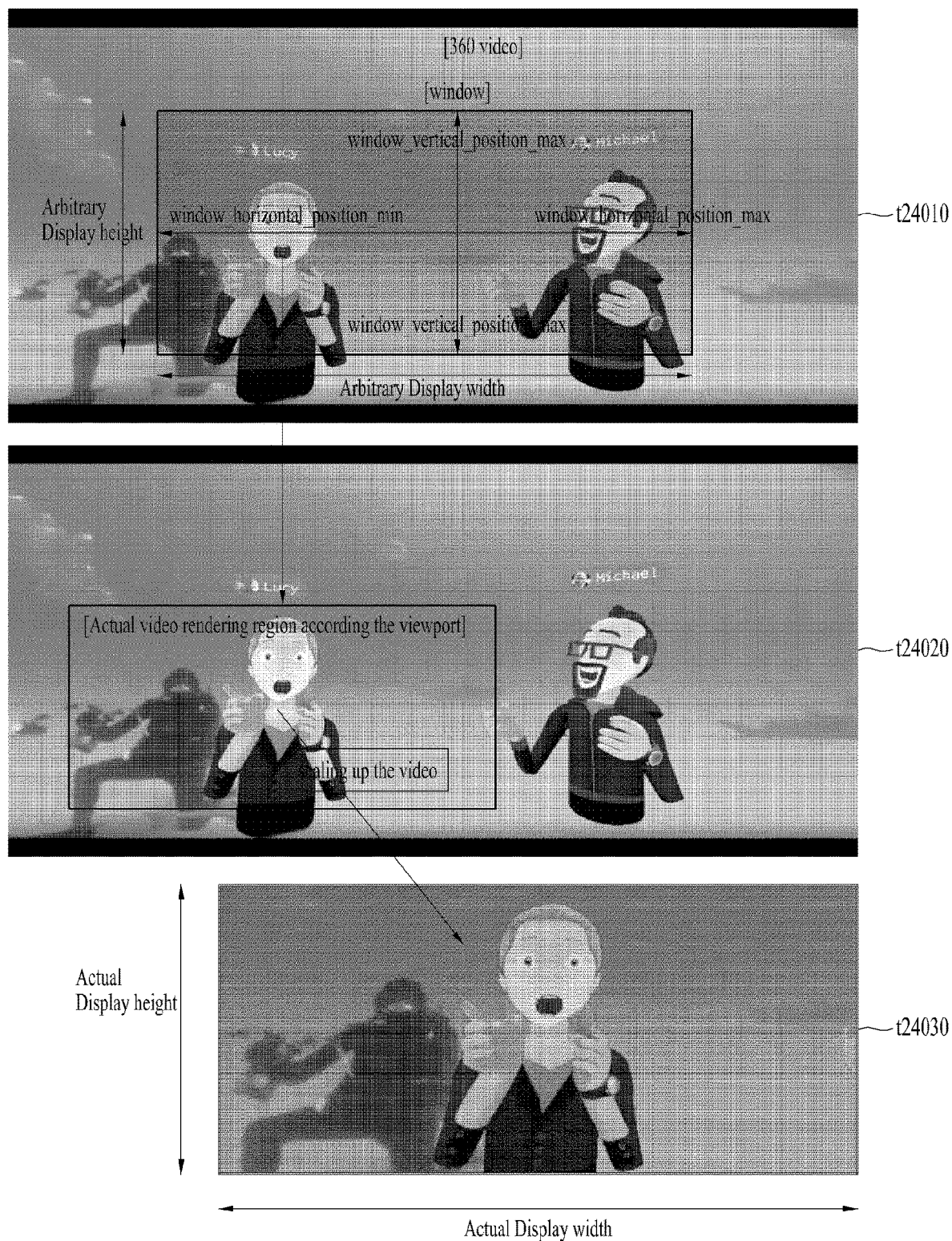
FIG. 24 is a diagram for describing 360-degree subtitle related metadata according to an embodiment of the present invention when subtitles are rendered on the basis of an actual display screen.

FIG. 24 is a diagram for describing 360-degree subtitle related metadata according to an embodiment of the present invention when subtitles are rendered on the basis of an actual display screen.

In t24010 shown in the figure, the entire image can correspond to the entire 360-degree video. Part of the image can be defined as a window (shaded area). This window can be specified by a window_vertical_position_min field, a window_horizontal_position_min field, a window_horizontal_position_max field and/or a window_vertical_position_max field. These fields will be described below.

Even when the window is defined as above, the actual viewport viewed by a user, that is, the actual rendering region may be larger or smaller than the window. In this case, it is possible to control the size of the window by scaling the window down or up. Here, when the aspect ratio of the viewport differs from the window, cropping can be performed to control the window. As described above, the safe crop area information in the TTML can be used during scaling/cropping such that a subtitle region is not cropped (t24020 and t24030).

In t24020 shown in the figure, a smaller area than the window defined in the above case t24010 needs to be actually displayed. Accordingly, video of the corresponding area can be scaled up and displayed (t24030).

FIG. 25 shows 360-degree subtitle related metadata according to an embodiment which is represented in the form of an SEI message when subtitles are rendered on the basis of an actual display screen.

The shown SEI message may be an SEI message including 360-degree subtitle related metadata when subtitles are rendered on the basis of an actual display screen. The SEI message may be called subtitle_overlay_info_3( ). The aforementioned 360-degree subtitle related metadata when subtitles are rendered on the basis of an actual display screen may be represented in the form of a box, a DASH descriptor and various signaling tables in addition to the shown SEI message.

In the SEI message according to the present embodiment, the cancel_subtitle_overlay_info_3_flag field, the subtitle_region_info_flag field, the timed_text( ) field and the region_id field may have the same meanings as the aforementioned cancel_subtitle_overlay_info_1_flag field, subtitle_region_info_flag field, timed_text( ) field and region_id field.

According to an embodiment, the aforementioned Subtitle_id field may be added to the SEI message or the aforementioned Subtitle_id field may be used as the region_id field.

Here, when the subtitle_region_info_flag field is set to 0, the SEI message can signal a window based subtitle region using subtitle region information (tts:extent or the like) in the timed_text( ) field.

The SEI message according to the present embodiment may include signaling information for specifying the window (t25010).

A window_flag field may be a flag indicating whether the SEI message includes information about the window. When this field is 1, the SEI message includes the information about the window. When this field is 0, the SEI message does not include the window related information.

A window_unit field can indicate a window specifying unit used for the entire 360-degree video. For example, this field can indicate that a unit such as a pixel or percentage is used.

A window_aspect_ratio field can indicate aspect ratio information of the window.

A window_horizontal_position_min field and a window_horizontal_position_max field can indicate horizontal minimum and maximum values of the corresponding window. These fields can indicate a horizontal area occupied by the window in the 360-degree video as described above.

A window_vertical_position_min field and a window_vertical_position_max field can indicate vertical minimum and maximum values of the corresponding window. These fields can indicate a vertical area occupied by the window in the 360-degree video as described above.

The aforementioned vertical/horizontal minimum/maximum values may be represented on the basis of pixels which are absolute coordinate values or on the basis of relative coordinate values with respect to the entire 360-degree VR image.

A num_of_regions field can indicate the number of subtitle regions included in the corresponding window. Information for specifying subtitle regions and text for subtitles may be further included in the SEI message for as many subtitle regions as the indicated number (t25020).

A subtitle_region_unit field can indicate a unit that specifies a corresponding subtitle region. The unit specifying a subtitle region may include a percentage, a cell and a pixel according to an embodiment.

The SEI message according to the present embodiment can provide a percentage value on the basis of the defined window according to an embodiment. In this case, a subtitle region width may be set in the range of 20 percent to 60 percent of the window width and a subtitle region height may be set in the range of 60 percent to 30 percent of the window height.

The SEI message according to the present embodiment can provide a cell resolution value on the basis of the defined window according to an embodiment. In this case, signaling information which defines a cell may be additionally required. For example, if the window has a width corresponding to 10 cells and a height corresponding to 20 cells, a subtitle region can be specified in units of cell on the basis of the window.

The SEI message according to the present embodiment can provide pixel based absolute coordinate values on the basis of the defined window according to an embodiment. In this case, the top-left point of the window is set to (0, 0) and the top-left point of a subtitle region can be indicated by (x, y). The subtitle region can be specified using the width and the height of the subtitle region on the basis of the top-left point of the subtitle region.

A subtitle_region_aspect_ratio field can indicate the aspect ratio of a corresponding subtitle region.

A subtitle_region_horizontal_position_min field, a subtitle_region_horizontal_position_max field, a subtitle_region_vertical_position_min field and a subtitle_region_vertical_position_max field may be information for specifying a subtitle region. These fields can indicate a horizontal minimum value, a horizontal maximum value, a vertical minimum value and a vertical maximum value.

As described above, information for specifying a subtitle region can be indicated through various methods. The SEI message may signal pixel based absolute coordinates on the basis of a window or signal relative coordinates such as percentage, cell resolution or the like instead of providing vertical/horizontal minimum/maximum values. The SEI message may further signal width and height information of a subtitle region in addition to points based on absolute coordinates/relative coordinates to specify the subtitle region.

The SEI message according to the present embodiment may further include a whole_video_horizontal_size field and a whole_video_vertical_size field according to an embodiment. These fields can indicate resolution of the entire 360-degree video image. The SEI message according to the present embodiment may further include aspect ratio information of the entire 360-degree video image according to an embodiment.

The aforementioned fields may be replaced by other fields or may be omitted. In addition, the SEI message may further include additional fields according to embodiments.

FIG. 26 illustrates delivery of a SubtitleOverlayConfigBoxC class and 360-degree subtitle related metadata defined as the class in RegionOnSphereSampleEntry according to an embodiment.

As described above, the 360-degree subtitle related metadata can be configured in a form included a file format based on ISOBMFF. Particularly, the aforementioned 360-degree subtitle related metadata when subtitles are rendered on the basis of an actual display screen may take a box form defined as the SubtitleOverlayConfigBoxC class. In this case, signaling fields can be included in this box according to embodiments.

The 360-degree subtitle related metadata in the form of a SubtitleOverlayConfigBoxC box can be included in Sample entry of the file format, that is, RegionOnSphereSampleEntry. The 360-degree subtitle related metadata included in the Sample Entry may be subtitle related metadata equally applied to samples in one video stream.

The fields in the corresponding box can perform the same roles as the fields of the aforementioned 360-degree subtitle related metadata in the form of an SEI message. Here, the following fields may be additionally included.

A window_horizontal_min_for_representative_value field and a window_horizontal_max_for_representative_value field can indicate minimum and maximum horizontal position values of a window defined in the corresponding sample entry.

A window_vertical_position_min_for_representative_value field and a window_vertical_position max_for_representative_value field can indicate minimum and maximum vertical position values of the window defined in the corresponding sample entry.

A subtitle_region_horizontal_min_for_representative_value field and a subtitle_region_horizontal_max_for_representative_value field can indicate minimum and maximum horizontal position values of a subtitle region defined in the corresponding sample entry.

A subtitle_region_vertical_max_for_representative_value field and a subtitle_region_vertical_max_for_representative_value field can indicate minimum and maximum vertical position values of the subtitle region defined in the corresponding sample entry.

FIG. 27 illustrates delivery of SubtitleOverlayInfoC( ) and 360-degree subtitle related metadata defined as SubtitleOverlayInfoC( ) in RegionOnSphereSample( ) according to an embodiment of the present invention.

According to the embodiment, the aforementioned 360-degree subtitle related metadata in the form of a SubtitleOverlayConfigBoxC box may be included in a sample of a file format, that is, RegionOnSphereSample( ). To deliver such metadata, SubtitleOverlayInfoC( ) can be defined and included in the sample. The 360-degree subtitle related metadata included in the Sample may be subtitle related metadata applied to one sample. That is, 360-degree subtitle related metadata may change for samples.

The fields in the corresponding box can perform the same roles as the fields of the aforementioned 360-degree subtitle related metadata in the form of an SEI message. Here, the following fields may be additionally included.

A window_horizontal_min_for_representative_value field and a window_horizontal_max_for_representative_value field can indicate minimum and maximum horizontal position values of a window defined in the corresponding sample.

A window_vertical_position_min_for_representative_value field and a window_vertical_position max_ for_representative_value field can indicate minimum and maximum vertical position values of the window defined in the corresponding sample.

A subtitle_region_horizontal_min_for_representative_value field and a subtitle_region_horizontal_max_for_representative_value field can indicate minimum and maximum horizontal position values of a subtitle region defined in the corresponding sample.

A subtitle_region_vertical_max_for_representative_value field and a subtitle_region_vertical_max_for_representative_value field can indicate minimum and maximum vertical position values of the subtitle region defined in the corresponding sample.

A range to which the 360-degree subtitle related metadata is applied may change depending on the position of the box including the 360-degree subtitle related metadata. That is, 360-degree subtitle related metadata included in a Sample Entry may be subtitle related metadata equally applied to samples in one video stream. 360-degree subtitle related metadata included in a Sample may be subtitle related metadata applied to one sample.

FIG. 28 shows 360-degree subtitle related metadata according to an embodiment of the present invention which is represented in the form of a DASH based descriptor when subtitles are rendered on the basis of an actual display screen.

The 360-degree subtitle related metadata according to the above-described embodiments may be re-described in the form of a DASH based descriptor. The above description can be equally applied to the DASH based descriptor.

As described above, the meanings of the values of window_horizontal_position_min, window_horizontal_position_max, window_vertical_position_min, window_vertical_position_max, subtitle_region_horizontal_position_min, subtitle_region_horizontal_position_max, subtitle_region_vertical_position_min, and subtitle_region_vertical_position_max may change depending on where the corresponding descriptor is included. For example, when the descriptor is included in a segment, the fields can indicate minimum/maximum horizontal/vertical position values of a window in a picture in the corresponding segment. If the descriptor is included in a representation, the fields can indicate minimum/maximum horizontal/vertical position values of a window in a picture in a segment belonging to the corresponding representation. If the descriptor is included in an AdaptationSet, the fields can indicate minimum/maximum horizontal/vertical position values of a window in a picture in a segment included in a representation while belonging to the corresponding AdaptationSet.

As described above, in the case of the descriptor which delivers 360-degree subtitle related metadata when subtitles are rendered on the basis of an actual display screen, the @schemeIdURI field may have a value of urn:mpeg:dash:subtitle:overlay3:201x. This may be a value identifying the corresponding descriptor as a descriptor delivering the 360-degree subtitle related metadata according to the above-described embodiment.

The @value field of the descriptor may have the same values as the shown embodiment. That is, parameters of @value which are discriminated by "," can correspond to the fields of the aforementioned 360-degree subtitle related metadata. In the shown embodiment, the parameters can have the same meanings as the aforementioned signaling fields having the same names. That is, the 360-degree subtitle related metadata according to all the above-described embodiments can be described in the form of a DASH based descriptor.

Figure 29:
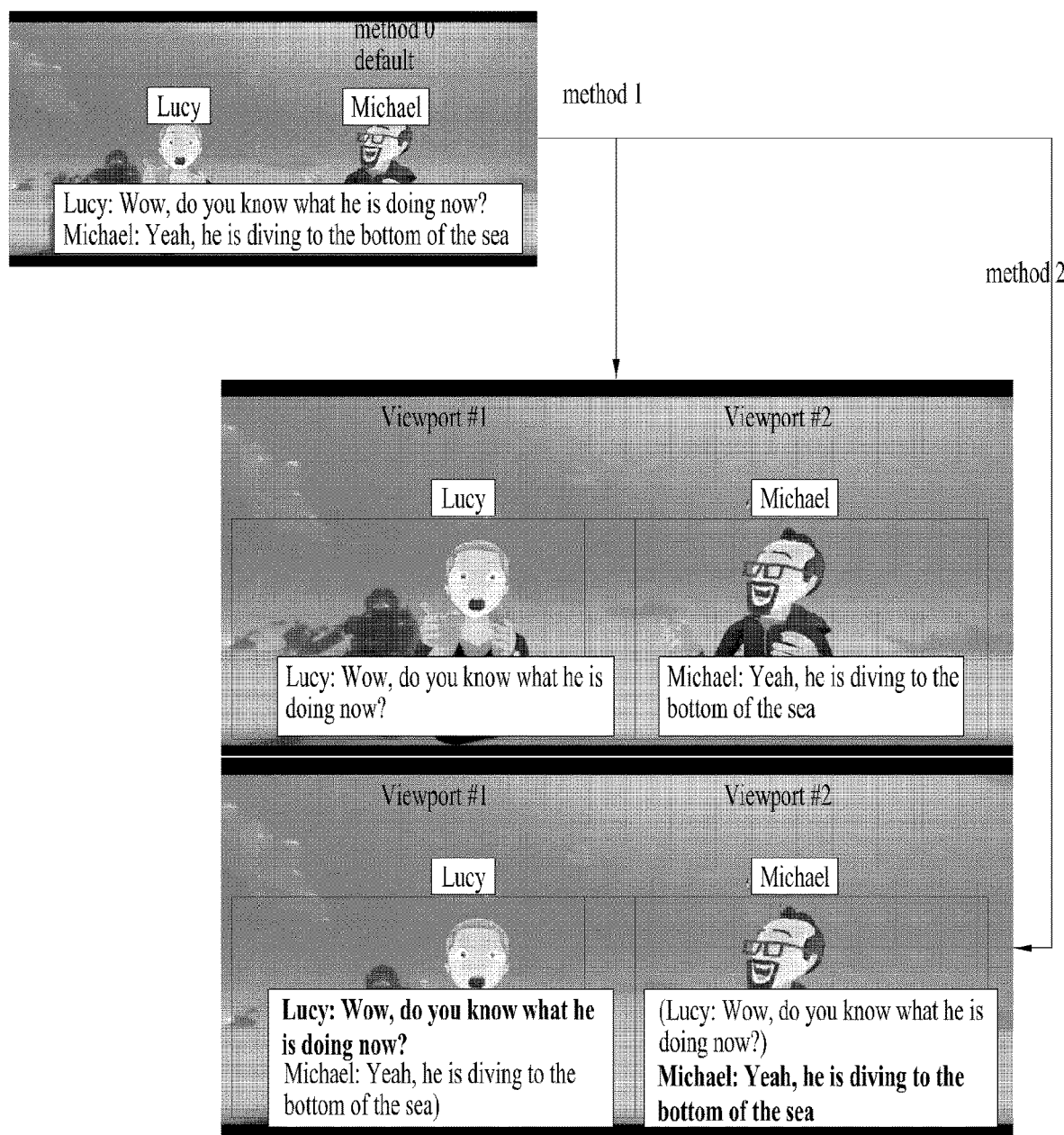
FIG. 29 is a diagram for describing 360-degree subtitle related metadata according to an embodiment of the present invention when subtitles are rendered on the basis of an audio object or a video object.

FIG. 29 is a diagram for describing 360-degree subtitle related metadata according to an embodiment of the present invention when subtitles are rendered on the basis of an audio object or a video object.

According to an embodiment of the present invention, subtitles for 360-degree video may be rendered on the basis of an audio object or a video object. Appropriate subtitles depending on the current viewport of a user can be rendered in consideration of position information of the audio object and the video object on a 3D sphere. That is, the current viewport of the user is considered and subtitles corresponding to an audio object or a video object according to the current viewport can be rendered. In the present embodiment, the 360-degree subtitle related metadata can provide signaling information in consideration of a viewport and the position of an audio object or a video object.

When audio is provided on the basis of an object in 360-degree content, position information about the audio object on a 3D sphere can be given. Here, audio provided to the user can be changed as the viewport of the user changes. Subtitles for the changed audio can be provided to the user and subtitles for an audio object irrespective of the current viewport may not be provided to the user. When audio is changed according to the viewport in this manner, a subtitle rendering method for the corresponding subtitles may also be changed.

Similarly, when video is provided on the basis of an object in 360-degree content, position information about the video object on a 3D sphere can be given. Here, a video object viewed in the viewport can be changed as the viewport of the user changes. Subtitles for audio generated from the changed video object and description related subtitles for the changed video object can be provided to the user. Here, subtitles for a video object irrespective of the current viewport may not be provided to the user. When video is changed according to the viewport in this manner, a subtitle rendering method for the corresponding subtitles may also be changed.

Methd#O shown in the figure indicates the entire 360-degree image. When the user views the entire image, audio related to all audio/video objects can be provided and all subtitles according thereto can be provided.

In method #1 shown in the figure, when the user views viewport #1, only subtitles for audio/video objects (Lucy) included in viewport #1 can be rendered. When the user views viewport #2, only subtitles for audio/video objects (Michael) included in viewport #2 can be rendered.

In method #2 shown in the figure, when the user views viewport #1, the subtitles for audio/video objects (Lucy) included in viewport #1 can be normally rendered. Here, subtitles for audio/video objects (Michael) which are not included in viewport #1 can be rendered through an additional process (parentheses, text color change or the like). It is possible to indicate subtitles for audio/video objects (Michael) which are not included in the current viewport through such a process.

FIG. 30 shows 360-degree subtitle related metadata according to an embodiment of the present invention which is represented in the form of an SEI message when subtitles are rendered on the basis of an audio object.

The shown SEI message may be an SEI message including 360-degree subtitle related metadata when subtitles are rendered on the basis of an audio object. This SEI message may be called subtitle_overlay_info_4( ). The aforementioned 360-degree subtitle related metadata when subtitles are rendered on the basis of an audio object may be represented in the form of a box, a DASH descriptor and various signaling tables in addition to the shown SEI message.

In the SEI message according to the present embodiment, the region_id field and the timed_text( ) field may have the same meanings as the aforementioned region_id field and timed_text( ) field.

A subtitle_type field can identify a type of a combination of the aforementioned subtitle rendering methods and the aforementioned method#1 and method#2. Here, the subtitle rendering methods may refer to all the above-described embodiments including the method of rendering subtitles at a fixed position, the method of rendering subtitles at a position varying according to viewports, the method of rendering subtitles on the basis of an actual display screen and the like. In addition, method#1 and method#2 may refer to the aforementioned method of rendering only subtitles for a corresponding object and the method of separately processing subtitles for objects, respectively. For example, it is possible to indicate whether the SEI message relates to a combination of the method of rendering subtitles at a fixed position and method #2 or a combination of the method of rendering subtitles at a position varying according to viewports and method #1 using a value of this field.

A num_of_objects field can indicate the number of audio objects that can be included in one subtitle region.

An audio_object_id field may be the ID of a corresponding object. Values of this field may be mapped to information of MPEG-H to connect the corresponding audio object to subtitles or to allow a position value of the corresponding audio object to be used. This field will be described below.

An audio_object_priority field can indicate priority information about a corresponding object. An object for which related subtitles will be rendered can be selected from a plurality of objects using a value of this field. This field will be described below.

A subtitle_id field may be an ID of subtitles separated on the basis of objects. Values of this field can be connected to IDs of subtitles separated on the basis of internal objects of TTML. According to an embodiment, TTML may include a new subtitle_id_for_object_audio_id value. In this case, the value can be connected to the ID of this field. According to an embodiment, a subtitle provider may separate <region xml:id . . . > or <p xml:id . . . >, create subtitles and use the corresponding information for subtitle rendering without new values defined in TTML.

A subtitle_position_info( ) field can indicate position information of a subtitle region in which subtitles corresponding to a corresponding audio object are rendered. That is, this field may include offset information of position_azimuth and position_elevation of the audio object and additionally include an offset value for subtitle rendering in addition to ei_azOffset and ei_elOffset values which vary according to user interaction in an embodiment. According to an embodiment, this field may include theta and phi values of the aforementioned subtitle_overlay_info_1( ), center values of yaw, pitch and roll of subtitle_overlay_info_2( ) and vertical/horizontal range values to indicate an object related subtitle region.

A font_size field may indicate a font size of corresponding subtitles. This field may replace tts:fontSize in TTML. In some cases, the offset value may be included in the tts:fontSize value inside the TTML. According to an embodiment, this field may indicate a change of a previous font size to a current font size in percentage.

A font_style field may indicate a font style of corresponding subtitles. For example, this field can indicate styles such as undefined, normal, italic, oblique, etc. This field may replace tts:fontStyle in TTML.

A font_weight field may indicate a font weight of corresponding subtitles. For example, this field can indicate undefined, normal, bold, etc.

A background_color field may indicate a background color of corresponding subtitles. The background color of the subtitles can be changed using the value of this field. This field may replace tts:backgroundColor in TTML.

A text_color field may indicate a text color of corresponding subtitles. The text color of the subtitles can be changed through this field. This field may replace tts:color in TTML.

An including_brackets_flag field may be a flag indicating whether corresponding subtitles include parentheses.

The aforementioned fields may be replaced by other fields or omitted. In addition, the SEI message may further include additional fields according to an embodiment.

FIGS. 31, 32 and 33 are diagrams for describing the audio_object_id field and the audio_object_priority field in 360-degree subtitle related metadata when subtitles are rendered on the basis of an audio object.

As described above, the audio_object_id field is the ID of a corresponding object. Values of this field can be mapped to MPEG-H information.

This field may have the same value as mae_metaDataElementID(+offset) of mae_audioSceneInfo of MPEG-H and thus can connect the corresponding audio object to corresponding subtitles. Here, information about mae_audioSceneInfo object based audio can be provided.

According to an embodiment, a position value of an audio object can be used for subtitle rendering. Subtitles related to the audio object can be rendered depending on the position value of the audio object. Here, the position value of the audio object can be calculated according to position_azimuth and position_elevation values included in intracoded_object_metadata_efficient( ) of MPEG-H.

Here, position_azimuth indicates an azimuth and may correspond to φ (longitude, −180 to 180) and yaw in the case of 360-degree video.

In addition, position_elevation refers to altitude and may correspond to θ (latitude, −90 to 90) and pitch.

In this manner, the position value of the audio object is associated with corresponding subtitle information through the audio object ID, and thus subtitle rendering depending on audio object position can be performed as described above.

In addition, variation according to user interaction may be reflected in subtitle rendering according to an embodiment. The position of an audio object can be changed according to user interaction in a 3D sphere. In this case, the changed audio object can be newly rendered according to values of ei_azOffset[grp] and ei_elOffset[grp] included in ei_GroupInteractivityStatus( ). Further, subtitle rendering depending on the changed audio object position value can be performed using the values. In addition, an offset value for subtitle rendering at the object position can be additionally included in the 360-degree subtitle related metadata.

Variations of azimuth and elevation according to user interaction can be indicated using the values of ei_azOffset and ei_elOffset shown in the figure. eI_GroupnteractivityStatus( ) signals variation of an object position or sound information instead of signaling changed position information or changed sound information when the object position is changed or sound information is changed according to user interaction.

That is, an audio object suitable for a viewport can be selected using information (position/sound level information) of audio objects and subtitles suitable therefor can be rendered.

This operation can be performed according to association of audio object related information with corresponding subtitle information through the aforementioned audio object ID.

As described above, the audio_object_priority field can indicate priority information about a corresponding object. An object for which related subtitles will be rendered can be selected from a plurality of objects using this field.

To this end, dynamic_object_priority included in intracoded_object_metadata_efficient( ) of MPEG-H can be used. dynamic_object_priority can indicate audio priority of the corresponding object. This field can have values of 0 to 7. A value closer to 0 indicates higher priority and a value closer to 7 indicates lower priority.

Audio for which subtitles need to be rendered can be selected from a plurality of object based audio tracks using priority information of objects and subtitle information related thereto.

That is, position information of audio objects is obtained through position_azimuth and position_elevation and an audio object suitable for a viewport can be selected using the position information. When a plurality of audio objects is present, appropriate subtitles can be selected in consideration of dynamic_object_priority.

FIG. 34 shows a SubtitleOverlayConfigBoxD class delivered through RegionOnSphereSampleEntry and SubtitleOverlayInfoD delivered through RegionOnSphereSample( ) according to an embodiment of the present invention.

As described above, 360-degree subtitle related metadata can be configured in a form included in a file format based on ISOBMFF. Particularly, when subtitles are rendered on the basis of an audio object, 360-degree subtitle related metadata can take a box form defined as a SubtitleOverlayConfigBoxD class. In this case, signaling fields can be included in this box according to embodiments.

The 360-degree subtitle related metadata in the form of a SubtitleOverlayConfigBoxD box can be included in a Sample Entry of the file format, that is, RegionOnSphereSampleEntry (t34010). The 360-degree subtitle related metadata included in the Sample Entry may be subtitle related metadata equally applied to samples in one video stream.

Fields in the box can perform the same roles as the fields of the aforementioned 360-degree subtitle related metadata in the form of an SEI message. Here, the box may additionally include a min_font_size field and/or a max_font_size field.

The min_font_size field and/or the max_font_size field indicate minimum and maximum values of a font size range of all samples included in the corresponding sample entry.

The aforementioned 360-degree subtitle related metadata in the form of a SubtitleOverlayConfigBoxD box can be included in a sample of the file format, that is, RegionOnSphereSample( ). To deliver the metadata, SubtitleOverlayInfoD( ) can be defined and included in samples. The 360-degree subtitle related metadata included in the sample may be subtitle related metadata applied to one sample. That is, 360-degree subtitle related metadata may be changed per sample.

The fields in the corresponding box can perform the same roles as the fields of the aforementioned 360-degree subtitle related metadata in the form of an SEI message.

A range to which the 360-degree subtitle related metadata is applied may change depending on the position of the box including the 360-degree subtitle related metadata. That is, 360-degree subtitle related metadata included in a Sample Entry may be subtitle related metadata equally applied to samples in one video stream. 360-degree subtitle related metadata included in a sample may be subtitle related metadata applied to one sample.

FIG. 35 shows 360-degree subtitle related metadata according to an embodiment of the present invention which is represented in the form of an SEI message when subtitles are rendered on the basis of a video object.

The shown SEI message may be an SEI message including 360-degree subtitle related metadata when subtitles are rendered on the basis of a video object. This SEI message may be called subtitle_overlay_info_4_1( ). The aforementioned 360-degree subtitle related metadata when subtitles are rendered on the basis of a video object may be represented in the form of a box, a DASH descriptor and various signaling tables in addition to the shown SEI message.

In the SEI message according to the present embodiment, fields may have the same meanings as the fields in the aforementioned 360-degree subtitle related metadata for subtitle rendering on the basis of an audio object. However, the following fields differ from the 360-degree subtitle related metadata for subtitle rendering on the basis of an audio object.

A visual_object_id field is the ID of a visual object. This field may identify the type of the visual object. Here, a visual object may refer to an object included in the current viewport and actually viewed by a user. A character A appears in a viewport, the character A can correspond to a visual object. A value for identifying a visual object may be newly defined in timed metadata of OMAF and connected to the value of this field. That is, both can have the same value.

A visual_object_priority field can indicate priority among visual objects. When a viewport includes a plurality of visual objects, this field can indicate priority of the objects. In addition, a value for indicating priority of visual objects may be newly defined in time metadata of OMAF and connected to the value of this field. That is, both can have the same value.

A subtitle_position_info( ) field can indicate position information of a subtitle region in which subtitles corresponding to a video object are rendered. That is, this field can include position information (center_yaw, center_pitch and center_roll) of a subtitle region included in the timed metadata of OMAF in the form of an offset value. In addition, this field may include range information of each subtitle region in the form of an offset value on the basis of information (hor_range and ver_range) corresponding to viewport range information. This field may include yaw, pitch and roll values and horizontal/vertical range values of the center point of a subtitle region instead of offset information according to an embodiment.

FIG. 36 shows a SubtitleOverlayConfigBoxE class and a SubtitlePositionConfigBox class delivered through RegionOnSphereSampleEntry according to an embodiment of the present invention.

As described above, 360-degree subtitle related metadata can be configured in a form included in a file format based on ISOBMFF. Particularly, when subtitles are rendered on the basis of a video object, 360-degree subtitle related metadata can take a box form defined as a SubtitleOverlayConfigBoxE class. In this case, signaling fields can be included in this box according to embodiments.

The 360-degree subtitle related metadata in the form of a SubtitleOverlayConfigBoxE box can be included in a Sample Entry of the file format, that is, RegionOnSphere-SampleEntry. The 360-degree subtitle related metadata included in the Sample Entry may be subtitle related metadata equally applied to samples in one video stream.

Fields in the box can perform the same roles as the fields of the aforementioned 360-degree subtitle related metadata in the form of an SEI message. Here, the box may additionally include a min_font_size field and/or a max_font_size field.

The min_font_size field and/or the max_font_size field indicate minimum and maximum values of a font size range of all samples included in the corresponding sample entry.

FIG. 37 shows SubtitlePositionInfo( ) and SubtitleOverlayInfoE( ) delivered through RegionOnSphereSample( ) according to an embodiment of the present invention.

The aforementioned 360-degree subtitle related metadata in the form of a SubtitleOverlayConfigBoxE box can be included in a sample of the file format, that is, RegionOnSphereSample( ). To deliver the metadata, SubtitleOverlayInfoE( ) can be defined and included in samples. The 360-degree subtitle related metadata included in the sample may be subtitle related metadata applied to one sample. That is, 360-degree subtitle related metadata may be changed per sample.

The fields in the corresponding box can perform the same roles as the fields of the aforementioned 360-degree subtitle related metadata in the form of an SEI message.

A range to which the 360-degree subtitle related metadata is applied may change depending on the position of the box including the 360-degree subtitle related metadata. That is, 360-degree subtitle related metadata included in a Sample Entry may be subtitle related metadata equally applied to samples in one video stream. 360-degree subtitle related metadata included in a sample may be subtitle related metadata applied to one sample.

FIG. 38 shows 360-degree subtitle related metadata according to an embodiment of the present invention which is represented in the form of a DASH based descriptor when subtitles are rendered on the basis of an audio object or a video object.

The 360-degree subtitle related metadata according to the above-described embodiments may be re-described in the form of a DASH based descriptor. The above description can be equally applied to the DASH based descriptor. As described above, the meanings of values in the descriptor can be changed depending on where the descriptor is included.

As described above, in the case of the descriptor which delivers 360-degree subtitle related metadata when subtitles are rendered on the basis of an audio object or a video object, the @schemeIdURI field may have a value of urn:mpeg:dash:subtitle:overlay4:201x. This may be a value identifying the corresponding descriptor as a descriptor delivering the 360-degree subtitle related metadata according to the above-described embodiment.

The @value field of the descriptor may have the same values as the shown embodiment. That is, parameters of @value which are discriminated by "," can correspond to the fields of the aforementioned 360-degree subtitle related metadata. In the shown embodiment, the parameters can have the same meanings as the aforementioned signaling fields having the same names. That is, the 360-degree subtitle related metadata according to all of the above-described embodiments can be described in the form of a DASH based descriptor.

The shown descriptor has parameters with respect to the 360-degree subtitle related metadata for rendering subtitles on the basis of an audio object and parameters with respect to the 360-degree subtitle related metadata for rendering subtitles on the basis of a video object. According to an embodiment, the descriptor may have only the parameters for only one of the 360-degree subtitle related metadata.

FIG. 39 shows 360-degree subtitle related metadata according to an embodiment of the present invention which is represented in the form of an SEI message in the case of stereoscopic subtitles.

According to one embodiment of the present invention, 3D subtitles for 3D video may be provided. That is, when stereoscopic subtitles are provided, the 360-degree subtitle related metadata according to the present embodiment can provide information for providing the subtitles through 3D services. In the present embodiment, the 360-degree subtitle related metadata can provide information about a target view on which generation of the subtitles is based, disparity information and the like. According to an embodiment, the 360-degree subtitle related metadata may provide depth information on the subtitle in place of the disparity information. Here, the depth information may be represented by a Z-axis value. In addition, in the present embodiment, the 360-degree subtitle related metadata can provide subtitle correction information for provision of the subtitles as 3D subtitles according to the intention of the subtitle provider. For example, the subtitles can be rendered at the same position for the target view when the subtitles are provided as 2D subtitles or 3D subtitles, but may not rendered according to the intention of the subtitle provider if not. To eliminate this difference, the subtitle correction information can be included in the 360-degree subtitle related metadata.

The SEI message may be called subtitle_overlay_info_5( ). The 360-degree subtitle related metadata according to the present embodiment may be represented in the form of a box, a DASH descriptor and various signaling tables in addition to the shown SEI message.

A cancel_flag field indicates that all of previous subtitle_overlay_info_5( ) SEI messages in output order are canceled when set to 1. This field indicates that 3D subtitle related information such as a target view, disparity and the like follows the SEI message when set to 0.

A 3D_flag field indicates whether the SEI message includes a value for displaying the subtitles as 3D subtitles when 360-degree video is provided as 3D video. When this field is 1, the SEI message can additionally include information related to the 3D subtitles.

A target_view field indicates whether the subtitles are for left view or right view. That is, this field can indicate the target view of the subtitles. The subtitles may be for left view when this field is 0 and may be for right view when this field is 1.

The target_point_x and target_point_y fields are reference points for disparity_for_subtitle to be applied. If this subtitle is for left view or right view, this field may indicate a reference point for applying disparity of this subtitle. The receiver may apply the disparity information using this reference point information and render the corresponding subtitle in 3D.

A disparity_forsubtitle field signals disparity for the subtitles. When the subtitles are for left view or right view, this field can indicate disparity therefor. A receiver can render the subtitles as 3D subtitles using such disparity information.

A calibration_position_flag_for_3D field indicates whether the SEI message includes information for calibration of the subtitles. When the subtitles are provided as 3D subtitles, the rendering position of the subtitles may change from the rendering position when the subtitles are provided as 2D subtitles. Accordingly, a value for calibrating the rendering position according to the intention of the subtitle provider may be needed. The SEI message enables calibration of the subtitles through an offset value when this field is 1 and the SEI message may not provide calibration information when this field is 0. According to an embodiment, the SEI message may signal a rendering position of the subtitles on the basis of 3D left or right view and may provide an offset value such that calibration is performed when the subtitles are provided as 2D subtitles.

An x_sign field and a y_sign field indicate x-axis and y-axis directions in which an offset is applied to the subtitles when calibration is applied thereto. The offset can be applied in minus x-axis and y-axis directions when this field is 0 and applied in plus x-axis and y-axis directions when this field is 1.

An x_offset field and a y_offset field indicate x and y offset values used when calibration is applied.

The aforementioned fields provide signaling information for calibration on the basis of two dimensions. However, the information may be provided on the basis of three dimensions according to embodiments. For example, when a subtitle region on a 3D sphere is signaled, offset values with respect to changes of yaw, pitch and roll of the center point of the subtitle region can be signaled to control the subtitle region. Further, a point (φ, θ) shifted from a reference point constituting the subtitle region may be signaled or an offset value of (φ, θ) changed from the reference point may be signaled according to an embodiment. In the case of rendering in the form of a three-dimensional sphere, information on shape_type may be additionally included. Further, a value of a reference point of disparity, which is the target_point_x and target_point_y defined above, may also be represented by a three-dimensional value and may include a target_point_yaw_center value, a target_point_pitch_center value, and a target_point_roll_center value.

The timed_text( ) field has been described above.

The aforementioned fields may be replaced by other fields or omitted. In addition, the SEI message may further include additional fields according to an embodiment.

FIG. 40 shows a SubtitleOverlayConfigBoxF class delivered through RegionOnSphereSampleEntry and SubtitleOverlayInfoF( ) delivered through RegionOnSphereSample( ) according to an embodiment of the present invention.

As described above, 360-degree subtitle related metadata can be configured in a form included in a file format based on ISOBMFF. Particularly, when stereoscopic subtitles are provided, 360-degree subtitle related metadata can take a box form defined as a SubtitleOverlayConfigBoxF class (t40010). In this case, signaling fields can be included in this box according to embodiments.

The 360-degree subtitle related metadata in the form of a SubtitleOverlayConfigBoxF box can be included in a Sample Entry of the file format, that is, RegionOnSphereSampleEntry. The 360-degree subtitle related metadata included in the Sample Entry may be subtitle related metadata equally applied to samples in one video stream.

Fields in the box can perform the same roles as the fields of the aforementioned 360-degree subtitle related metadata in the form of an SEI message. Here, the box may additionally include a min_font_size field and/or a max_font_size field.

The min_font_size field and/or the max_font_size field indicate minimum and maximum values of a font size range of all samples included in the corresponding sample entry. Here, the corresponding box may additionally include a dynamic_flag field and x_offset_min/y_offset_min/x_et_max/y_x/yoffset_max fields.

When the dynamic_flag field is 1, the x_offset_min/y_offset_min/x_offset_max/y_offset_max fields can be included in the corresponding box. These fields indicate a minimum x offset value, a minimum y offset value, a maximum x offset value and a maximum y offset value which are applied in corresponding samples. These fields can indicate the entire range of offset of the corresponding samples.

For reference, the target_point_x and target_point_y fields are reference points for disparity_for_subtitle to be applied. If this subtitle is for left view or right view, these fields may indicate a reference point for applying disparity of the subtitle. The receiver may apply the disparity information using this reference point information and render the corresponding subtitle in 3D.

In the case of rendering in the form of a three-dimensional sphere, information on shape_type may be additionally included. Further, a value of a reference point of disparity, which is the target_point_x and target_point_y defined above, may also be represented by a three-dimensional value and may include a target_point_yaw_center value, a target_point_pitch_center value, and a target_point_roll_center value.

The aforementioned 360-degree subtitle related metadata in the form of a SubtitleOverlayConfigBoxF box can be included in a sample of the file format, that is, RegionOnSphereSample( ). To deliver the metadata, SubtitleOverlayInfoE( ) can be defined and included in samples (t40010). The 360-degree subtitle related metadata included in the sample may be subtitle related metadata applied to one sample. That is, 360-degree subtitle related metadata may be changed per sample.

The fields in the corresponding box can perform the same roles as the fields of the aforementioned 360-degree subtitle related metadata in the form of an SEI message.

A range to which the 360-degree subtitle related metadata is applied may change depending on the position of the box including the 360-degree subtitle related metadata. That is, 360-degree subtitle related metadata included in a Sample Entry may be subtitle related metadata equally applied to samples in one video stream. 360-degree subtitle related metadata included in a sample may be subtitle related metadata applied to one sample.

FIG. 41 shows 360-degree subtitle related metadata according to an embodiment of the present invention which is represented in the form of a DASH based descriptor.

The 360-degree subtitle related metadata according to the above-described embodiments may be re-described in the form of a DASH based descriptor. The above description can be equally applied to the DASH based descriptor. As described above, the meanings of values in the descriptor can be changed depending on where the descriptor is included.

As described above, in the case of a descriptor which delivers 360-degree subtitle related metadata when stereoscopic subtitles are provided, the @schemeIdURI field may have a value of urn:mpeg:dash:subtitle:overlay5:201x. This may be a value identifying the corresponding descriptor as a descriptor delivering the 360-degree subtitle related metadata according to the above-described embodiment.

The @value field of the descriptor may have the same values as the shown embodiment. That is, parameters of @value which are discriminated by "," can correspond to the fields of the aforementioned 360-degree subtitle related metadata. In the shown embodiment, the parameters can have the same meanings as the aforementioned signaling fields in the same names. That is, the 360-degree subtitle related metadata according to all the above-described embodiments can be described in the form of a DASH based descriptor.

The target_point_x and target_point_y fields are reference points for disparity_for_subtitle to be applied. If this subtitle is for left view or right view, these fields may indicate a reference point for applying disparity of the subtitle. The receiver may apply the disparity information using this reference point information and render the corresponding subtitle in 3D.

In the case of rendering in the form of a three-dimensional sphere, information on shape_type may be additionally included. Further, a value of a reference point of disparity, which is the target_point_x and target_point_y defined above, may also be represented by a three-dimensional value and may include a target_point_yaw_center value, a target_point_pitch_center value, and a target_point_roll_center value.

Figure 42:
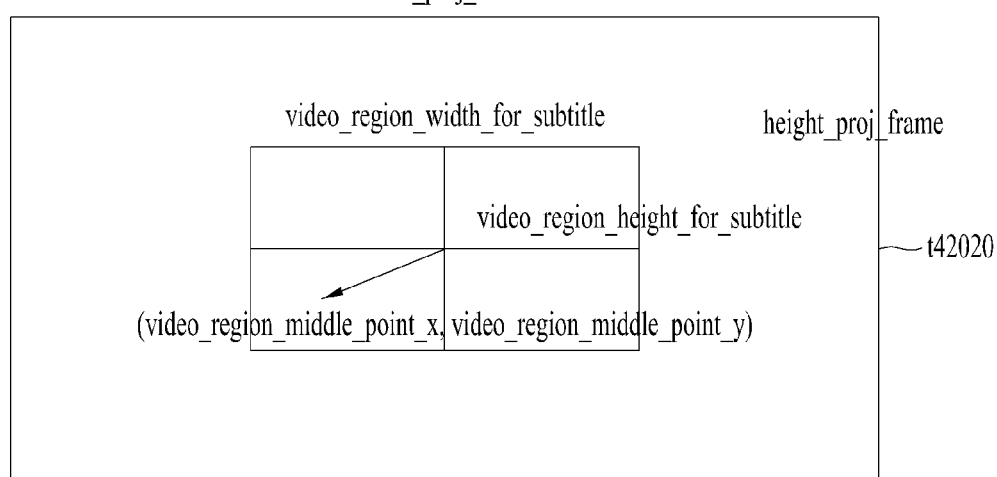
FIG. 42 shows 360-degree subtitle related metadata, which is represented in the form of an SEI message in a case in which subtitle rendering is interrupted when video is zoomed in by a specific level or more, according to an embodiment of the present invention.

FIG. 42 shows 360-degree subtitle related metadata, which is represented in the form of an SEI message in a case in which subtitle rendering is interrupted when video is zoomed in by a specific level or more, according to an embodiment of the present invention.

According to an embodiment of the present invention, rendering of subtitles for 360-degree video can be interrupted when the video is zoomed in by a specific level or more. In an embodiment of the present invention, when the 360-degree video is zoomed in and thus the size of a subtitle region decreases to a specific level or more, rendering of the subtitles can be interrupted. According to an embodiment, rendering of the subtitles may be interrupted when the size of the subtitle region increases to a specific level or more.

The 360-degree subtitle related metadata according to the present embodiment may provide signaling information for performing the aforementioned operation. The SEI message according to the present embodiment may be called subtitle_overlay_info_6 ( ) (t42010).

A cancel_flag field can be set to 1 when signaling information of the SEI message has been changed from previously provided signaling information, like the aforementioned cancel_flag field.

A unit_basis_type field indicates a type of information about regions provided by the SEI message. For example, region related information can be provided as a percentage when this field is set to 0, provided as a cell when set to 1, provided as a pixel when set to 2, and reserved for future use when set to 3.

A width_proj_frame field and a height_proj_frame field indicate the width and height of the entire area of 360-degree video. The entire area may be based on the aforementioned projected frame.

A subtitle_off_region_info_flag field may be a flag indicating whether information related to the aforementioned subtitle rendering interruption operation is included in the SEI message. As described above, when 360-degree video is zoomed in by a specific level or more or zoomed out by a specific level or more and thus only part of the 360-degree video is cropped and rendered, subtitle rendering can be interrupted. Subtitle rendering can be interrupted when this field is 1. This operation may be needed when a video region which does not require subtitles is rendered.

A video_region_middle_point_x field, a video_region_middle_point_y field, a video_regionregion_width field and a video_region_region_height field indicate x and y values of the center point of a region that requires rendering and the width and height of the region on the basis of the center point. When the subtitle region decreases to be smaller than the region indicated by these fields, rendering of the corresponding subtitles can be interrupted (t42020).

According to an embodiment, the SEI message may signal only width and height information of a reference region. When the width and height of the subtitle region decrease below a signaled width and height, rendering of the corresponding subtitles can be interrupted. That is, information about a middle point (x, y) may not be needed. In this case, the video_region_middle_point_x and video_region_middle_point_y fields may have larger values than the width_proj_frame and height_proj_frame fields.

The aforementioned fields provide signaling information for subtitle rendering interruption on the basis of two dimensions. However, the corresponding information may be provided on the basis of three dimensions according to an embodiment. For example, a reference region on a 3D sphere can be signaled. The reference region for subtitle rendering interruption can be specified by signaling the center point thereof as yaw, pitch and roll values and signaling yaw/pitch range values.

The aforementioned fields may be replaced by other fields or omitted. In addition, the SEI message may further include additional fields according to an embodiment.

FIG. 43 shows a SubtitleOverlayConfigBoxG class delivered through RegionOnSphereSampleEntry and SubtitleOverlayInfoG( ) delivered through RegionOnSphereSample( ) according to an embodiment of the present invention.

As described above, 360-degree subtitle related metadata can be configured in a form included in a file format based on ISOBMFF. Particularly, in a case in which subtitle rendering is interrupted when video is zoomed in by a specific level or more, 360-degree subtitle related metadata can take a box form defined as a SubtitleOverlayConfigBoxG class (t43010). In this case, signaling fields can be included in this box according to embodiments.

The 360-degree subtitle related metadata in the form of a SubtitleOverlayConfigBoxG box can be included in a Sample Entry of the file format, that is, RegionOnSphereSampleEntry. The 360-degree subtitle related metadata included in the Sample Entry may be subtitle related metadata equally applied to samples in one video stream.

Fields in the box can perform the same roles as the fields of the aforementioned 360-degree subtitle related metadata in the form of an SEI message. Here, when the dynamic_flag field is 1, the box may additionally include a video_region_middle_point_x_for_representative_point field, a video_region_middle_point_y_for_representative_point field, a min_width_for_subtitle_for_representative_point field, a min_height_for_subtitle_for_representative_point field, a max_width_for_subtitle_for_representative_point field and/or a max_height_for_subtitle_for_representative_point field.

The fields can signal representative values and minimum/maximum width/height values of center points of reference regions applied to corresponding samples.

According to an embodiment, the aforementioned 360-degree subtitle related metadata in the form of a SubtitleOverlayConfigBoxG box can be included in a sample of the file format, that is, RegionOnSphereSample( ). To deliver the metadata, SubtitleOverlayInfoG( ) can be defined and included in samples (t43020). The 360-degree subtitle related metadata included in the sample may be subtitle related metadata applied to one sample. That is, 360-degree subtitle related metadata may be changed per sample.

The fields in the corresponding box can perform the same roles as the fields of the aforementioned 360-degree subtitle related metadata in the form of an SEI message.

A range to which the 360-degree subtitle related metadata is applied may change depending on the position of the box including the 360-degree subtitle related metadata. That is, 360-degree subtitle related metadata included in a Sample Entry may be subtitle related metadata equally applied to samples in one video stream. 360-degree subtitle related metadata included in a sample may be subtitle related metadata applied to one sample.

FIG. 44 shows 360-degree subtitle related metadata according to an embodiment of the present invention which is represented in the form of a DASH based descriptor in a case in which subtitle rendering is interrupted when video is zoomed in by a specific level or more.

Similarly, the 360-degree subtitle related metadata according to the above-described embodiments may be re-described in the form of a DASH based descriptor. The above description can be equally applied to the DASH based descriptor. As described above, the meanings of values in the descriptor can be changed depending on where the descriptor is included.

As described above, in the case of a descriptor which delivers 360-degree subtitle related metadata in a case in which subtitle rendering is interrupted when the video is zoomed in by a specific level or more, the @schemeIdURI field may have a value of urn:mpeg:dash:subtitle:overlay6: 201x. This may be a value identifying the corresponding descriptor as a descriptor delivering the 360-degree subtitle related metadata according to the above-described embodiment.

The @value field of the descriptor may have the same values as the shown embodiment. That is, parameters of @value which are discriminated by "," can correspond to the fields of the aforementioned 360-degree subtitle related metadata. In the shown embodiment, the parameters can have the same meanings as the aforementioned signaling fields having the same names. That is, the 360-degree subtitle related metadata according to all of the above-described embodiments can be described in the form of a DASH based descriptor.

FIG. 45 shows 360-degree subtitle related metadata according to an embodiment of the present invention which is represented in the form of an SEI message when a viewport recommended per subtitle or audio object is signaled.

According to an embodiment of the present invention, when there is a viewport recommended per subtitle or audio object, 360-degree subtitle related metadata can signal presence of the recommended viewport. An SEI message including the 360-degree subtitle related metadata according to the present embodiment may be called sutitle_overlay_info_7( ) (t45020).

In an embodiment (t45010) of the present invention, a user who is viewing viewport #1 may view specific subtitles with respect to an audio object (Lucy). Here, the SEI message according to the present embodiment may include signaling information for signaling a recommended viewport connected to the subtitles to the user. That is, when there is a viewport recommended per subtitle or object based audio, the SEI message according to the present embodiment can signal the recommended viewport.

The shown SEI message subtitle_overlay_info_7( ) will be described blow (t45020).

An audio_object_id, subtitle_id field may be the same as the aforementioned field in the same name.

A recommended_viewport_id field can provide the ID of a recommended viewport related to video associated with corresponding subtitles, that is, subtitles identified by subtitle_id such that the user can view the video. This field can signal a viewport ID mapped to subtitle_id.

A viewport_id_info( ) field indicates viewport_id_info_for_plane( ) which specifies a corresponding recommended viewport on a 2D plane or viewport_id_info_for_sphere( ) which specifies the corresponding recommended viewport on a 3D sphere. Here, the 2D plane can refer to the aforementioned projected frame or packed frame.

The viewport_id_info_for_plane( ) can specify a recommended viewport on the 2D plane (t45020) as described above. Fields included in the viewport_id_info_for_plane( ) will be described below.

A viewport_center_point_x field and a viewport_center_point_y field can specify the center point of a recommended viewport as (x, y) coordinates. That is, these fields can specify the center point of a rendering region on the 2D plane for a recommended video region.

A viewport_width field and a viewport_height field can specify the width and the height of the recommended viewport on the basis of the center point of the recommended viewport. The recommended viewport can be specified on the 2D plane using the width and the height on the basis of the center point of the recommended viewport indicated by the aforementioned fields.

The viewport_id_info_for_sphere( ) can specify the recommended viewport on the 3D sphere (t45020) as described above. Fields included in the viewport_id_info_for_sphere( ) will be described below.

A shape_type field can perform the same roles as shape_type of the aforementioned subtitle_overlay_info_1( ).

Yaw_center, pitch_center, roll_center, yaw_range and pitch_range fields can provide values for specifying the recommended viewport on the 3D sphere. These fields can provide information related to the center point and FOV of the recommended viewport. That is, the fields can indicate yaw, pitch and roll values of the center point of the recommended viewport, and yaw and pitch ranges based on the center point, respectively. The recommended viewport can be specified on the 3D sphere using these values.

FIG. 46 shows a SubtitleOverlayConfigBoxH class delivered through RegionOnSphereSampleEntry and SubtitleOverlayInfoH( ) delivered through RegionOnSphereSample( ) according to an embodiment of the present invention.

As described above, 360-degree subtitle related metadata can be configured in a form included in a file format based on ISOBMFF. Particularly, when a viewport recommended per subtitle or audio object is signaled as described above, 360-degree subtitle related metadata can take a box form defined as a SubtitleOverlayConfigBoxH class. In this case, signaling fields can be included in this box according to embodiments.

The 360-degree subtitle related metadata in the form of a SubtitleOverlayConfigBoxH box can be included in a Sample Entry of the file format, that is, RegionOnSphereSampleEntry (t46010). The 360-degree subtitle related metadata included in the Sample Entry may be subtitle related metadata equally applied to samples in one video stream.

Fields in the box can perform the same roles as the fields of the aforementioned 360-degree subtitle related metadata in the form of an SEI message.

Here, the corresponding box may further include a sphere_flag field. This field can be used to discriminate signaling for specifying a recommended viewport on the 2D plane from signaling for specifying the recommended viewport on the 3D sphere in one box.

In addition, the corresponding box may further include a dynamic_flag field. According to the value of this field, the box can designate a range of values applied to all samples of a corresponding sample entry or provide fixed values applied to all samples of the sample entry.

When dynamic_flag=1, RecommendedViewportIDConfigBox can signal a range including all values related to corresponding recommended viewports applied to samples of a corresponding sample entry. Specifically, when recommended viewports on the 3D sphere are signaled, RecommendedViewportIDConfigBox can signal a range including all of yaw, pitch and roll values and vertical/horizontal range values with respect to the center points of the recommended viewports for samples of the corresponding sample entry. Further, when recommended viewports on the 2D plane are signaled, RecommendedViewportIDConfigBox can signal a range including all of x and y values and vertical/horizontal range values with respect to the center points of the recommended viewports for samples of the corresponding sample entry.

When dynamic_flag=0, RecommendedViewportIDConfigBox can signal fixed values related to recommended viewports applied to all samples of a corresponding sample entry. Specifically, when recommended viewports on the 3D sphere are signaled, RecommendedViewportIDConfigBox can signal yaw, pitch and roll values and vertical/horizontal range values with respect to the center points of recommended viewports applied to samples of the corresponding sample entry. Further, when recommended viewports on the 2D plane are signaled, RecommendedViewportIDConfigBox can signal x and y values and vertical/horizontal range values with respect to the center points of recommended viewports applied to samples of the corresponding sample entry.

RecommendedViewportIDConfigBox when dynamic_flag=0 can refer to recommended_viewport_id_info( ) when subtitle_overlay_info_7( ) is applied to sample entries.

According to an embodiment, the aforementioned 360-degree subtitle related metadata in the form of a SubtitleOverlayConfigBoxH box can be included in a sample of the file format, that is, RegionOnSphereSample( ) (t46020). The 360-degree subtitle related metadata included in the sample may be subtitle related metadata applied to one sample. That is, 360-degree subtitle related metadata may be changed per sample. The fields in the corresponding box can perform the same roles as the fields of the aforementioned 360-degree subtitle related metadata in the form of an SEI message.

A range to which the 360-degree subtitle related metadata is applied may change depending on the position of the box including the 360-degree subtitle related metadata. That is, 360-degree subtitle related metadata included in a Sample Entry may be subtitle related metadata equally applied to samples in one video stream. 360-degree subtitle related metadata included in a sample may be subtitle related metadata applied to one sample.

FIG. 47 shows 360-degree subtitle related metadata according to an embodiment of the present invention which is represented in the form of a DASH based descriptor when a viewport recommended per subtitle or audio object is signaled.

Similarly, when a viewport recommended per subtitle or audio object is signaled, the 360-degree subtitle related metadata according to the above-described embodiments may be re-described in the form of a DASH based descriptor. The above description can be equally applied to the DASH based descriptor.

As described above, the meanings of field values can be changed depending on where the descriptor is included.

As described above, in the case of a descriptor which delivers 360-degree subtitle related metadata when a viewport recommended per subtitle or audio object is signaled, the @ schemeIdURI field may have a value of urn:mpeg:dash:subtitle:overlay7:201x. This may be a value identifying the corresponding descriptor as a descriptor delivering the 360-degree subtitle related metadata according to the above-described embodiment.

The @value field of the descriptor may have the same values as the shown embodiment. That is, parameters of @value which are discriminated by "," can correspond to the fields of the aforementioned 360-degree subtitle related metadata. In the shown embodiment, the parameters can have the same meanings as the aforementioned signaling fields having the same names. That is, the 360-degree subtitle related metadata according to all of the above-described embodiments can be described in the form of a DASH based descriptor.

FIG. 48 shows 360-degree subtitle related metadata according to an embodiment of the present invention which is represented in the form of an SEI message when a depth or disparity value of subtitles is controlled depending on a depth or disparity value of a viewport.

According to an embodiment of the present invention, a depth or disparity value of subtitles can be controlled depending on a depth or disparity value of a viewport.

According to an embodiment, stereoscopic 360-degree video can be provided. To provide the stereoscopic 360-degree video, depth or disparity information about the 360-degree video can be signaled. Depth or disparity information about subtitles for the 360-degree video can also be signaled.

However, if only a 360-degree video corresponding to a viewport is rendered, the 3D effect thereof may depend on the viewport. Depth/disparity of subtitles provided in the viewport can be adaptively controlled according to depth/disparity of the 360-degree video which depends on the viewport.

Although a depth/disparity value of subtitles may be included in the subtitles (e.g., tts:disparity), the 3D effect may be changed according to viewports, and thus the depth/disparity value of the subtitles may need to be signaled according to the depth/disparity value depending on a corresponding viewport. When the subtitle area is rendered on a sphere, information indicating a reference point for application of the disparity and the disparity value of the reference value may be further signaled depending on the shape of the subtitle area (shape_type). Accordingly, the 3D effect can be improved and eye fatigue can be reduced.

When subtitles for stereoscopic video are provided, a depth map for left images or right images may be provided along with the subtitles according to an embodiment. The depth map may be provided by being included along with left/right images in video data, provided by being included in corresponding 360-degree subtitle related metadata, or provided by being included in additional signaling information. According to an embodiment, depth maps for both left images and right images may be provided.

According to an embodiment, a depth map/disparity map indicating depth/disparity may be delivered to signal a depth according to viewport. That is, a depth map or a disparity map may be delivered using only minimum data through subsampling.

According to an embodiment, a receiver may calculate and use disparity using only stereo images.

The 360-degree subtitle related metadata according to the present embodiment may further include signaling information for changing a window size and a subtitle font size according to change in the depth/disparity of subtitles.

When the depth/disparity of subtitles is controlled and the subtitles are rendered, the size of the window including the subtitles and the font size of the subtitles may need to be changed. Here, the window refers to a root container region newly defined in consideration of a viewport as described above. When the window size and the subtitle font size are changed together, enhanced 3D effect of the subtitles can be provided.

For example, when minus disparity is applied to subtitles, the size of the window including the subtitles and the text size of the subtitles may need to be increased.

The 360-degree subtitle related metadata according to the present embodiment can define signaling information included in the current stereoscopic video. When a depth map or a disparity map is used, all or some of the metadata may be included in the depth map or the disparity map.

The shown SEI message may be an SEI message including 360-degree subtitle related metadata in a case in which a depth or disparity value of subtitles is controlled depending on a depth or disparity value of a viewport as described above. The SEI message may be called subtitle_overlay_info_8( ). The aforementioned 360-degree subtitle related metadata in a case in which a depth or disparity value of subtitles is controlled depending on a depth or disparity value of a viewport may be represented in the form of a box, a DASH descriptor and various signaling tables in addition to the shown SEI message.

A 3D_stereo_service_flag field may be a flag indicating whether corresponding subtitles are used for a 3D stereo service. This field can indicate that the corresponding subtitles are used for the 3D or stereo service when set to 1. This field can indicate that the corresponding subtitles are used for a 2D service when set to 0.

An adaptive_subtitle_overlay_flag field may be a flag indicating whether corresponding subtitles are adaptively overlaid (rendered) according to viewport. This field can indicate whether the aforementioned method of controlling disparity of the subtitles depending on the viewport is used.

A cancel_flag field indicates that all previous subtitle_overlay_info_8( ) SEI messages in output order are canceled when set to 1.

An including_depth_map_flag field may be a flag indicating whether a depth map of the corresponding video as well as left/right images are provided. When this field is 1, the depth map is provided. When this field is 0, the depth map is not provided. The depth map may be provided by being included in video data along with left/right images, provided by being included in corresponding 360-degree subtitle related metadata or provided by being included in additional signaling information.

An including_disparity_map_flag field may be a flag indicating whether a disparity map for the corresponding video is provided. When this field is 1, the disparity is provided. When this field is 0, the disparity map is not provided. The disparity map may be provided by being included in video data along with left/right images, provided by being included in corresponding 360-degree subtitle related metadata or provided by being included additional signaling information. When this field is 0, a receiver may calculate disparity information using left/right images.

A subtitle_id field may be an ID for identifying corresponding subtitles. This field may be an ID for identifying corresponding subtitles among all subtitles (which may be a TTML document).

This field may be used differently according to subtitle service scenarios. This field may be used to identify subtitles according to audio of an object. Further, this field may be used as an ID for subtitle rendering according to an embodiment.

When a service scenario identifies subtitles according to audio object, this field can identify corresponding subtitles by associating the same with an audio object. For example, subtitles connected to an audio object having an audio object ID of 0 can be identified when this field is 0, and subtitles connected to an audio object having an audio object ID of 1 can be identified when this field is 1.

A depth_or_disparity_map_id field can indicate the ID of a depth map or a disparity map connected to corresponding subtitles (subtitles identified by subtitle_id). This field may have the same value as the ID of a delivered depth map or disparity map. According to an embodiment, subtitle_overlay_info_8( ) may include a disparity map or a depth map.

A depth_or_disparity_map_type field can indicate whether a depth map or a disparity map associated with corresponding subtitles has a 3D sphere form or a 2D form. The depth map has a 3D form when this field is 0 and has a 2D ERP form when this field is 1. 2D forms may include a cube in addition to ERP.

A downsampling_flag field can indicate whether a depth map or a disparity map associated with corresponding subtitles has been downsampled compared to resolution of left/right images. When the depth map or disparity map has not been downsampled, the depth map or disparity map can conform to the resolution of the left/right images.

According to an embodiment, when a depth/disparity map has different resolution from left/right images, this field can signal a downsampling rate. In this case, the resolution of the depth/disparity map can be additionally signaled.

When a depth/disparity map is 2D, the SEI message may include a downsampling_rate_for_width field and a downsampling_rate_for_height field. These fields can indicate downsampling rates of the width and height of the depth/disparity map. Here, the fields can indicate the aforementioned downsampling rates on the basis of the width and the height of left/right images. According to an embodiment, the fields may signal the actual width and height of the depth/disparity map.

When the depth/disparity map is 3D, the SEI message may include a shape_type field, a downsampling_point_for_yaw_center field, a downsampling_point_for_pitch_center field, a downsampling_point_for_roll_center field, a downsampling_rate_for horizontal_range field and a downsampling_rate_for_vertical_range field.

Here, the shape_type field can perform the same role as shape_type of the aforementioned subtitle_overlay_info_1( ).

The downsampling_point_for_yaw_center, downsampling_point_for_pitch_center and downsampling_point_for_roll_center fields can signal the center point of a downsampled depth/disparity map as yaw, pitch and roll values.

The downsampling_rate_for_horizontal_range and downsampling_rate_for_vertical_range fields can indicate downsampling rates for horizontal and vertical ranges of the downsampled depth/disparity map. Here, these fields can indicate the aforementioned downsampling rates on the basis of horizontal/vertical ranges of left/right images. According to an embodiment, these fields may signal actual horizontal and vertical ranges of the downsampled depth/disparity map.

A left_depth_map_flag field can indicate whether the corresponding depth map is a depth map for left images or a depth map for right images. This field can indicate that the corresponding depth map is a depth map for right images when set to 0, indicate that the corresponding depth map is a depth map for left images when set to 1 and indicate that the corresponding depth map is a depth map for an intermediate image between a left image and a right image when set to 2.

According to an embodiment, this field can signal which view is associated with a corresponding depth map in an environment in which multi-view images are provided. In this case, this field can have a number indicating the view associated with the corresponding depth map as a value thereof.

According to an embodiment, this field may be extended to signal presence or absence of a depth map for all views of a multi-view image. In this case, a num_of_depth_maps field which indicates the number of views may be additionally included in the SEI message. This field may indicate which depth map corresponds to a view. Here, a depth_map_id field may be added in order to identify a depth map.

An offset_unit field can indicate the unit of an offset value of a corresponding depth/disparity map. When this field is 0, offset of the depth/disparity map can use the unit of the actual depth/disparity. When this field is 1, a percentage based value can be used. When this field is 2, the offset of the depth/disparity can be signaled through a method of indicating a value corresponding to the exponent when the offset is expressed by exponentiation of 2.

A sign_of_offset_for_subtitle field and an offset_value_for_subtitle field can signal a sign value and an offset value for determining depth/disparity of subtitles. When a depth/disparity map of video is provided, a minimum depth/disparity value of the depth/disparity map may be a criterion for determining depth/disparity of subtitles. The depth/disparity of the subtitles can be calculated in consideration of an offset value and a sign value provided by the fields in addition to the minimum depth/disparity value. A receiver can calculate the depth/disparity of subtitles in this manner and render the subtitles. Here, tts:disparity defined in the conventional subtitle document can be ignored.

A font_size_unit field, a sign_font_size field and a font_size_offset field can indicate a font size unit, a sign and an offset value for changing a font size. When a depth or disparity value is changed according to viewport as described above, the font size may need to be changed. To this end, these fields can signal the aforementioned values. Here, the font size offset value may be an offset value based on tts:fontSize. The font size unit may need to be consistent with the font size defined in the conventional TTML. The font size unit may be a cell, a pixel or the like.

A window_size_unit field, a sign_window_size field and a window_size_offset field can indicate a window size unit, a sign and an offset value for changing a window size. When a depth or disparity value is changed according to viewport as described above, the window size may need to be changed. To this end, the fields can signal the aforementioned values. Here, when only one of font_size and window_size is changed, the other may be changed in proportion to the changed value. Here, a window offset may be based on a window size value defined in subtitle_overlay_info_3( ).

An including_disparity_values field can indicate whether the SEI message includes a disparity value or a depth value for each region of video when the video is divided into predetermined regions. A disparity value of a corresponding region can be provided when this field is 1 and a depth value of the corresponding region can be provided when this field is 0. Here, when video is divided into predetermined regions, the video may be divided on the basis of depth or divided using tile information according to an embodiment. Further, video may be divided on the basis of cells or divided through various other methods according to embodiments.

A num_of_regions field can indicate the number of divided regions.

A region_id field may be an ID for identifying a divided region.

A region_info( ) field can include information for specifying divided regions. For example, this field can specify each region through width/height information (in the case of a 2D plane) or through yaw_center, pitch_center, roll_center, horizontal_range and vertical_range information (in the case of a 3D sphere).

A left_flag field can indicate a view associated with a depth value when the SEI message includes the depth value. The depth value can be a depth value for left images when this field is 1 and can be a depth value for right images when this field is 0.

A value_unit field can indicate the unit of depth/disparity offset.

The target_point_yaw_center, target_point_pitch_center, and target_point_roll_center fields indicate the reference point for disparity_depth_value_of_target_point to be applied. The receiver may apply the disparity information using the reference point information and render the corresponding subtitle in 3D.

The disparity_depth_value_of_target_point field may represent a disparity/depth value at the reference point.

A min_value_in_region_of_video/max_value_in_region_of_video field can signal a minimum/maximum depth value or a minimum/maximum disparity value in each divided region. Here, minimum values for divided regions are mandatory but maximum values therefor may not be mandatory for subtitle rendering.

A font_size_unit-in_region field, a sign_font_size_in_region field, a font_size_offset_in_region field, a window_size_unit_in_region field, a sign_window_size_in_region field and a window_size_offset_in_region field can perform the same roles as the aforementioned font_size_unit, sign_font_size, font_size_offset, window_size_unit, sign_window_size and window_size_offset fields for each divided region.

A timed_text( ) field has been described above.

The SEI message may further include an intrinsic camera parameter in acquisition of 3D video. The intrinsic camera parameter may further include focal length, principal point and skew coefficient. The focal length may be represented as fx and fy values and displayed in units of pixel. When a cell spacing between centers of physical cameras has the same value in the horizontal and vertical directions, only fx or fy can be displayed. The principal point can be represented as cx and cy values and refer to the center of a camera lens. The skew coefficient can be represented as skew_c=tanα.

FIG. 49 illustrates delivery of 360-degree subtitle related metadata defined as SubtitleOverlayInfoI through RegionOnSphereSample( ).

As described above, 360-degree subtitle related metadata can be configured in a form included in a file format based on ISOBMFF. Particularly, when a depth or disparity value of subtitles is controlled according to a depth or disparity value of a viewport as described above, 360-degree subtitle related metadata can be defined as SubtitleOverlayInfoI and included in a sample of the file format, that is, RegionOnSphereSample( ). In this case, signaling fields can be included in SubtitleOverlayInfoI.

The 360-degree subtitle related metadata included in the sample may be subtitle related metadata applied to one sample. That is, 360-degree subtitle related metadata may be changed per sample. The fields in the corresponding box can perform the same roles as the fields of the aforementioned 360-degree subtitle related metadata in the form of an SEI message.

Here, RecommendedViewportIDInfo( ) may be the same as the aforementioned RecommendedViewportIDInfo( ) and may be the same as region_info( ) of subtitle_overlay_info_8( ).

As described above, the 360-degree subtitle related metadata may be defined as a box and included in a sample entry of a file format, that is, RegionOnSphereSampleEntry. In this case, fields for indicating a representative value and a range of ample entries may be newly included. These fields can signal a minimum depth/disparity value and a maximum depth/disparity value among all samples of sample entry. The 360-degree subtitle related metadata included in the sample entry may be subtitle related metadata equally applied to samples in one video stream.

The fields in the corresponding box can perform the same roles as the fields of the aforementioned 360-degree subtitle related metadata in the form of an SEI message.

A range to which the 360-degree subtitle related metadata is applied may change depending on the position of the box including the 360-degree subtitle related metadata. That is, 360-degree subtitle related metadata included in a sample entry may be subtitle related metadata equally applied to samples in one video stream. 360-degree subtitle related metadata included in a sample may be subtitle related metadata applied to one sample.

FIG. 50 shows 360-degree subtitle related metadata according to an embodiment of the present invention which is represented in the form of a DASH based descriptor when a depth or disparity value of subtitles is controlled according to a depth or disparity value of a viewport.

Similarly, when a viewport recommended per subtitle or audio object is signaled, the 360-degree subtitle related metadata according to the above-described embodiments may be re-described in the form of a DASH based descriptor. The above description can be equally applied to the DASH based descriptor. As described above, the meanings of field values can be changed depending on where the descriptor is included.

For example, when min_value_in_region_of_video/max_value_in_region_of_video fields are included in a segment, these fields can indicate minimum/maximum depth/disparity values of divided regions of a picture in the segment. When the fields are included in a representation, the fields can indicate minimum/maximum depth/disparity values of divided regions of a picture in a segment belonging to the representation. In addition, when the fields are included in AdaptationSet, the fields can indicate minimum/maximum depth/disparity values of divided regions of a picture in a segment included in a representation while belonging to the AdaptationSet.

As described above, in the case of a descriptor which delivers 360-degree subtitle related metadata when a depth or disparity value of subtitles is controlled according to a depth or disparity value of a viewport, the @schemeIdURI field may have a value of urn:mpeg:dash:subtitle:overlay8:201x. This may be a value identifying the corresponding descriptor as a descriptor delivering the 360-degree subtitle related metadata according to the above-described embodiment.

The @value field of the descriptor may have the same values as the shown embodiment. That is, parameters of @value which are discriminated by "," can correspond to the fields of the aforementioned 360-degree subtitle related metadata. In the shown embodiment, the parameters can have the same meanings as the aforementioned signaling fields having the same names. That is, the 360-degree subtitle related metadata according to all of the above-described embodiments can be described in the form of a DASH based descriptor.

Figure 51:
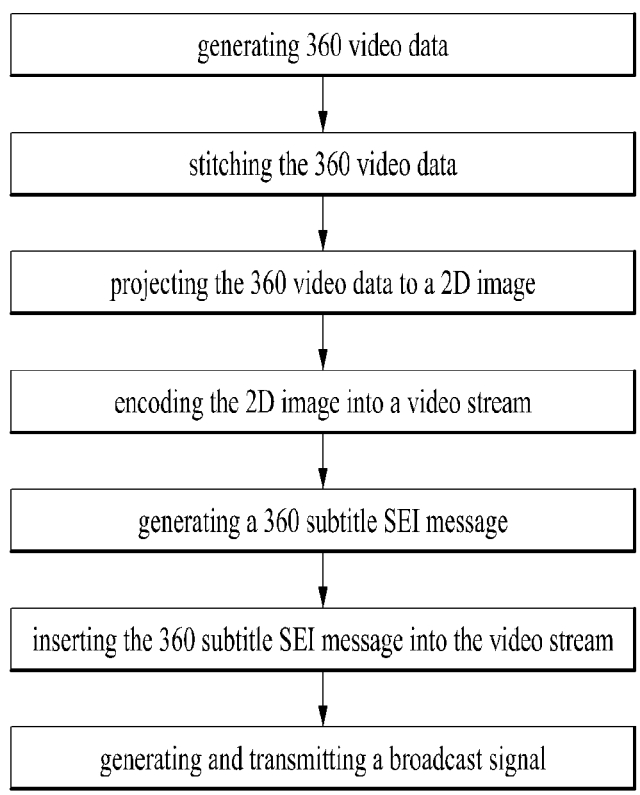
FIG. 51 is a diagram showing a method of providing a subtitle for 360-degree content (on the transmitting side) according to an embodiment of the present invention.

FIG. 51 is a diagram showing a method of providing a subtitle for 360-degree content (on the transmitting side) according to an embodiment of the present invention.

The method of providing a subtitle for 360-degree content (on the transmitting side) according to an embodiment of the present invention includes: generating 360-degree video; stitching the 360-degree video; projecting 360-degree video onto a 2D image; encoding the 2D image into a video stream; generating a 360-degree subtitle SEI message; inserting the 360-degree subtitle SEI message into the video stream; and/or generating a broadcast signal and transmitting the broadcast signal.

The method of providing a subtitle for 360-degree content (on the transmitting side) according to an embodiment of the present invention may be performed by the 360-degree video transmission device described above.

The 360-degree video transmission device described above may further include a processor. The processor may generate 360-degree video data based on an image/video captured by at least one camera. In the embodiment of the 360-degree video transmission device described above, it is illustrated that the processor serving to perform this operation exists outside the apparatus and the 360-degree video transmission device receives the 360-degree video data. However, in some embodiments, the 360-degree video transmission device may contain the processor.

The stitcher of the 360-degree video transmission device described above may stitch the 360-degree video data. The projection processor of the 360-degree video transmission device described above may project the 360-degree video data onto a 2D image. The data encoder of the 360-degree video transmission device described above may encode the 2D image into a video stream. The metadata processor of the 360-degree video transmission device described above may generate the 360-degree subtitle SEI message described above. Here, the 360-degree subtitle SEI message may be a 360-degree subtitle SEI message according to the above-described embodiments. The 360-degree subtitle SEI message may signal a subtitle for 360-degree content. The data encoder described above may insert the 360-degree subtitle SEI message into the video stream. The transmission processor of the 360-degree video transmission device described above may generate a broadcast signal using the video stream. The transmitter of the 360-degree video transmission device described above may transmit the broadcast signal. Each of the components of the 360-degree video transmission device described above is configured as described above.

In the method of providing a subtitle for 360-degree content (on the transmitting side) according to this embodiment, the 360-degree subtitle SEI message may contain a subtitle ID for identifying the subtitle, a region ID for identifying a subtitle region in which the subtitle is overlaid on the 360-degree space and/or subtitle region information for specifying the subtitle region within the 360-degree space.

Here, the subtitle region information may be fixed region information or offset region information. Here, the fixed region information may be information for specifying a fixed region when the subtitle region is present in the fixed region within the 360-degree space. The offset region information may be information for specifying a region which varies within the 300-degree space according to a viewport when the subtitle region is present in the varying region. This information has been described above.

In a method of providing a subtitle for 360-degree content (on the transmitting side) according to another embodiment of the present invention, the fixed region information may include first information indicating the upper left end point of the subtitle region and/or second information indicating the lower right end point of the subtitle region.

In a method of providing a subtitle for 360-degree content (on the transmitting side) according to another embodiment of the present invention, the fixed region information may include first, second and third information indicating a start point, an end point and/or an intermediate point of the subtitle region. The first information may indicate the start point that is a diagonal vertex of the subtitle region. The second information may indicate the end point that is diagonally located on the opposite side with respect to the vertex indicated by the first information. The third information may indicate an intermediate point for specifying the position of the subtitle region in the 360-degree space.

In a method of providing a subtitle for 360-degree content (on the transmitting side) according to another embodiment of the present invention, the fixed region information may include center point information indicating a center point of the subtitle region and/or the vertical/horizontal range of the subtitle region with respect to the center point. Here, the center point information may indicate the center point of the subtitle region through the values of yaw, pitch, and roll.

In a method of providing a subtitle for 360-degree content (on the transmitting side) according to another embodiment of the present invention, the offset region information may include offset center point information, range information, and/or type information indicating the center point of the subtitle region. The offset center point information may indicate the center point of the subtitle region using the offset values of yaw, pitch, and roll. The range information may include range information indicating a vertical/horizontal range of the subtitle region with respect to the center point. The type information may indicate the type of the offset center point information, i.e., how the offset center point information indicates the center point.

In a method of providing a subtitle for 360-degree content (on the transmitting side) according to another embodiment of the present invention, when the type information indicates a first type, the offset center point information may indicate that an offset from the center point of the subtitle region to the center point of the viewport is being used. The offset center point information may indicate the difference between the two center points as offset values of yaw, pitch, and roll.

In a method of providing a subtitle for 360-degree content (on the transmitting side) according to another embodiment of the present invention, when the type information indicates a second type, the offset center point information may indicate an offset from the center point of the subtitle region to the center point of the previous subtitle region specified by the previous 360-degree subtitle SEI message. The offset center point information may indicate the difference between the two center points with offset values of yaw, pitch, and roll.

In a method of providing a subtitle for 360-degree content (on the transmitting side) according to another embodiment of the present invention, the 360-degree subtitle SEI message may include number information and a plurality of region ID-subtitle region information sets. The number information may indicate the number of subtitle regions in which the same subtitle identified by the subtitle ID is overlaid within the 360-degree space. As many ID-subtitle region information sets as indicated by the number information may be included in the 360-degree subtitle SEI message to provide information on each subtitle region. The region ID may identify the corresponding subtitle region. The subtitle region information may specify the subtitle regions where the subtitle is overlaid.

Hereinafter, description will be given of a method of providing a subtitle for 360-degree content (on the receiving side) according to an embodiment of the present invention. This method is not illustrated in the drawings.

According to an embodiment, the method of providing a subtitle for 360-degree content (on the receiving side) may include receiving a broadcast signal, pressing the broadcast signal and acquiring a video stream, decoding the video stream and acquiring a 360-degree subtitle SEI message, re-projecting 360-degree video data into a 3D space, and providing a 360-degree subtitle to the 360-degree content using the 360-degree subtitle SEI message.

The method of providing a subtitle for 360-degree content (on the receiving side) according to an embodiment may be performed by the 360-degree video reception device described above.

The methods of providing a subtitle for 360-degree content (on the receiving side) according to the embodiments of the present invention may correspond to the methods of providing a subtitle for 360-degree content (on the transmitting side) according to the embodiments of the present invention described above. The methods of providing a subtitle for 360-degree content (on the receiving side) may be performed by hardware modules corresponding to the components (e.g., the receiver, the reception processor, the data decoder, the metadata parser, the renderer, and the like) used for the method of providing a subtitle for 360-degree content (on the transmitting side). The method of providing a subtitle for 360-degree content (on the receiving side) may have embodiments corresponding to the embodiments of the method of providing a subtitle for 360-degree content (on the transmitting side).

The steps described above may be omitted or replaced by other steps of performing the same/similar operations according to embodiments.

A device for transmitting a broadcast signal according to an embodiment of the present invention is illustrated. This device is not shown in the drawings.

The device for transmitting a broadcast signal according to an embodiment of the present invention may include a processor, a stitcher, a projection processor, a data encoder, a metadata processor, a transmission processor, and/or a transmitter. Each of the blocks or modules is configured as described above.

The device for transmitting a broadcast signal and the internal modules/blocks thereof according to an embodiment of the present invention may implement the method of providing a subtitle for 360-degree content (on the transmitting side) of the present invention described above.

Hereinafter, a description will be given of a device for receiving a broadcast signal according to an embodiment of the present invention. This device is not shown in the drawings.

The device for receiving a broadcast signal may include the receiver, the reception processor, the data decoder, the metadata parser, and the renderer as described above. Each of the blocks and modules is configured as described above.

The device for receiving a broadcast signal and the internal modules/blocks thereof according to an embodiment of the present invention may implement embodiments of the method of providing a subtitle for 360-degree content (on the receiving side).

The internal blocks/modules and the like of the device described above may be processors for executing the sequential processes stored in the memory, or may be hardware elements located inside/outside the device depending on embodiments.

The modules described above may be omitted or replaced by other modules configured to perform the same/similar operations according to an embodiment.

The module or unit may be one or more processors designed to execute a series of execution steps stored in the memory (or the storage unit). Each step described in the above-mentioned embodiments may be implemented by hardware and/or processors. Each module, each block, and/or each unit described in the above-mentioned embodiments may be realized by hardware or a processor. In addition, the above-mentioned methods of the present invention may be realized by code written in recoding media configured to be read by a processor so that the code can be read by the processor provided by the apparatus.

Although the description of the present invention is explained with reference to each of the accompanying drawings for clarity, it is possible to design new embodiment(s) by merging the embodiments shown in the accompanying drawings with each other. If a recording medium readable by a computer, in which programs for executing the embodiments mentioned in the foregoing description are recorded, is designed by those skilled in the art, it may be within the scope of the appended claims and their equivalents.

An apparatus and method according to the present invention may be non-limited by the configurations and methods of the embodiments mentioned in the foregoing description. The embodiments mentioned in the foregoing description can be configured in a manner of being selectively combined with one another entirely or in part to enable various modifications.

In addition, a method according to the present invention can be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like for example and also include such a carrier-wave type implementation such as transmission over the Internet. Furthermore, as the processor-readable recording medium is distributed to a computer system connected via a network, processor-readable code can be saved and executed according to a distributed system.

It will be appreciated by those skilled in the art that various modifications and variations can be made in the present invention without departing from the spirit or scope of the invention. Thus, it is intended that the present invention cover the modifications and variations of this invention provided they come within the scope of the appended claims and their equivalents.

Both apparatus and method inventions are mentioned in this specification and descriptions of both of the apparatus and method inventions may be complementarily applied to each other.

MODE FOR INVENTION

Various embodiments have been described in the best mode for carrying out the invention.

INDUSTRIAL APPLICABILITY

The present invention is applicable to VR related fields.

It will be apparent to those skilled in the art that various modifications and variations can be made in the present invention without departing from the spirit or scope of the inventions. Thus, it is intended that the present invention cover the modifications and variations of the invention provided they come within the scope of the appended claims and their equivalents.

What is claimed is:

1. A digital receiver for providing at least one subtitle for a VR (virtual reality) service, the digital receiver comprising:
   a controller configured to:
   extract bitstreams for audio data and video data;
   parse metadata related to the VR service;
   decode the audio data and the video data based on the metadata related to the VR service;
   render the audio data and the video data based on a user's viewport detected by a head or eye tracking component;
   a display configured to:
   display the video data in a display module and outputting the audio data in a speaker or a headphone;
   display a first subtitle for a first object and a second subtitle for a second object when the displayed video data includes the first and second objects depending on the user's viewport;
   display the first subtitle without rendering the second subtitle when the displayed video data includes the first object and does not include the second object depending on the user's viewport; and
   display the second subtitle without rendering the first subtitle when the displayed video data includes the second object and does not include the first object depending on the user's viewport.

2. The digital receiver of claim 1, further comprising:
   a network interface configured to send feedback information about the user's viewport to a streaming server, wherein the feedback information is used for the streaming server to determine a next sending data.

3. The digital receiver of claim 1, wherein the metadata related to the VR service corresponds to a SEI message, further the SEI message includes a subtitle ID for identifying the at least one subtitle, a region ID for identifying a subtitle region where the at least one subtitle is overlaid in a 360-degree space, and subtitle region information being fixed region information for specifying the subtitle region fixed in the 360-degree space or offset region information for specifying the subtitle region changing in the 360-degree space based on the user's viewport.

4. The digital receiver of claim 3, wherein the fixed region information includes center information indicating yaw, pitch and roll values of a center point of the subtitle region, and range information indicating horizontal and vertical ranges of the subtitle region from the center point.

5. The digital receiver of claim 3, wherein the offset region information includes offset center information indicating yaw, pitch and roll offsets for a center point of the subtitle region, range information indicating horizontal and vertical ranges of the subtitle region from the center point, and type information for indicating a type of the offset center information.

6. A digital receiver for providing at least one subtitle for a VR (virtual reality) service, the digital receiver comprising:
a controller configured to:
extract bitstreams for audio data and video data;
parse metadata related to the VR service;
decode the audio data and the video data based on the metadata related to the VR service;
render the audio data and the video data based on a user's viewport detected by a head or eye tracking component;
a display configured to:
display the video data in a display module and outputting the audio data in a speaker or a headphone;
display a first subtitle for a first object and a second subtitle for a second object when the displayed video data includes the first and second objects depending on the user's viewport; and
continue to display the first subtitle and the second subtitle by rendering the first and the second subtitles even when the displayed video data includes either the first object or the second object depending on the user's viewport.

7. The digital receiver of claim 6, wherein a style of the displayed first subtitle is different from a style of the displayed second subtitle when the displayed video data includes either the first object or the second object depending on the user's viewport.

8. The digital receiver of claim 6, further comprising:
a network interface configured to send feedback information about the user's viewport to a streaming server, wherein the feedback information is used for the streaming server to determine a next sending data.

9. The digital receiver of claim 6, wherein the metadata related to the VR service corresponds to a SEI message, further the SEI message includes a subtitle ID for identifying the at least one subtitle, a region ID for identifying a subtitle region where the at least one subtitle is overlaid in a 360-degree space, and subtitle region information being fixed region information for specifying the subtitle region fixed in the 360-degree space or offset region information for specifying the subtitle region changing in the 360-degree space based on the user's viewport.

10. The digital receiver of claim 9, wherein the fixed region information includes center information indicating yaw, pitch and roll values of a center point of the subtitle region, and range information indicating horizontal and vertical ranges of the subtitle region from the center point, wherein the offset region information includes offset center information indicating yaw, pitch and roll offsets for a center point of the subtitle region, range information indicating horizontal and vertical ranges of the subtitle region from the center point, and type information for indicating a type of the offset center information.

11. A method of providing at least one subtitle for a VR (virtual reality) service in a receiver, the method comprising:
extracting bitstreams for audio data and video data;
parsing metadata related to the VR service;
decoding the audio data and the video data based on the metadata related to the VR service;
rendering the audio data and the video data based on a user's viewport detected by a head or eye tracking component;
displaying the video data in a display module and outputting the audio data in a speaker or a headphone;
displaying a first subtitle for a first object and a second subtitle for a second object when the displayed video data includes the first and second objects depending on the user's viewport;
displaying the first subtitle without rendering the second subtitle when the displayed video data includes the first object and does not include the second object depending on the user's viewport; and
displaying the second subtitle without rendering the first subtitle when the displayed video data includes the second object and does not include the first object depending on the user's viewport.

12. The method of claim 11, further comprising:
sending feedback information about the user's viewport to a streaming server, wherein the feedback information is used for the streaming server to determine a next sending data.

13. The method of claim 11, wherein the metadata related to the VR service corresponds to a SEI message, further the SEI message includes a subtitle ID for identifying the at least one subtitle, a region ID for identifying a subtitle region where the at least one subtitle is overlaid in a 360-degree space, and subtitle region information being fixed region information for specifying the subtitle region fixed in the 360-degree space or offset region information for specifying the subtitle region changing in the 360-degree space based on the user's viewport.

14. The method of claim 13, wherein the fixed region information includes center information indicating yaw, pitch and roll values of a center point of the subtitle region, and range information indicating horizontal and vertical ranges of the subtitle region from the center point.

15. The method of claim 13, wherein the offset region information includes offset center information indicating yaw, pitch and roll offsets for a center point of the subtitle region, range information indicating horizontal and vertical ranges of the subtitle region from the center point, and type information for indicating a type of the offset center information.

16. A method of providing at least one subtitle for a VR (virtual reality) service in a receiver, the method comprising:
extracting bitstreams for audio data and video data;
parsing metadata related to the VR service;
decoding the audio data and the video data based on the metadata related to the VR service;
rendering the audio data and the video data based on a user's viewport detected by a head or eye tracking component;
displaying the video data in a display module and outputting the audio data in a speaker or a headphone;

displaying a first subtitle for a first object and a second subtitle for a second object when the displayed video data includes the first and second objects depending on the user's viewport;

continuing to display the first subtitle and the second subtitle by rendering the first and the second subtitles even when the displayed video data includes either the first object or the second object depending on the user's viewport.

17. The method of claim 16, wherein a style of the displayed first subtitle is different from a style of the displayed second subtitle when the displayed video data includes either the first object or the second object depending on the user's viewport.

18. The method of claim 16, further comprising:

sending feedback information about the user's viewport to a streaming server, wherein the feedback information is used for the streaming server to determine a next sending data.

19. The method of claim 16, wherein the metadata related to the VR service corresponds to a SEI message, further the SEI message includes a subtitle ID for identifying the at least one subtitle, a region ID for identifying a subtitle region where the at least one subtitle is overlaid in a 360-degree space, and subtitle region information being fixed region information for specifying the subtitle region fixed in the 360-degree space or offset region information for specifying the subtitle region changing in the 360-degree space based on the user's viewport.

20. The method of claim 19, wherein the fixed region information includes center information indicating yaw, pitch and roll values of a center point of the subtitle region, and range information indicating horizontal and vertical ranges of the subtitle region from the center point, wherein the offset region information includes offset center information indicating yaw, pitch and roll offsets for a center point of the subtitle region, range information indicating horizontal and vertical ranges of the subtitle region from the center point, and type information for indicating a type of the offset center information.

* * * * *